US012659651B2

(12) United States Patent
Zhang et al.

(10) Patent No.: US 12,659,651 B2
(45) Date of Patent: Jun. 16, 2026

(54) OPEN EARPHONES

(71) Applicant: SHENZHEN SHOKZ CO., LTD., Shenzhen (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 212 days.

(21) Appl. No.: 18/355,407

(22) Filed: Jul. 19, 2023

(65) Prior Publication Data

US 2024/0147109 A1 May 2, 2024

Related U.S. Application Data

(63) Continuation of application No. PCT/CN2023/079411, filed on Mar. 2, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)
*H04R 1/02* (2006.01)
*H04R 1/28* (2006.01)

(52) U.S. Cl.
CPC .......... *H04R 1/1008* (2013.01); *H04R 1/021* (2013.01); *H04R 1/2811* (2013.01)

(58) Field of Classification Search
CPC .... H04R 1/1008; H04R 1/105; H04R 1/1083; H04R 1/1066; H04R 1/1041;
(Continued)

(56) References Cited

U.S. PATENT DOCUMENTS

2007/0009133 A1 1/2007 Gerkinsmeyer
2010/0086167 A1* 4/2010 Akihiko ................ H04R 1/105 381/381
(Continued)

FOREIGN PATENT DOCUMENTS

CN 209201336 U 8/2019
CN 212909891 U 4/2021
(Continued)

OTHER PUBLICATIONS

The Notice of Reasons for Refusal in Japanese Application No. 2024-550873 mailed on May 27, 2025, 9 pages.
(Continued)

*Primary Examiner* — Carolyn R Edwards
*Assistant Examiner* — Julie X Dang
(74) *Attorney, Agent, or Firm* — METIS IP LLC

(57) ABSTRACT

The present disclosure provides an open earphone, including: a sound production component including: a transducer including a diaphragm configured to generate a sound; and a housing forming a cavity used to accommodate the transducer, wherein in a wearing state, the housing is provided with a sound guiding hole on an inner side surface toward an auricle of a user for guiding a sound generated by a front side of the diaphragm out of the housing and into an ear canal, and at least two pressure relief holes are provided on one or more other side surfaces of the housing, the at least two pressure relief holes including a first pressure relief hole away from the ear canal and a second pressure relief hole near the ear canal, and a sound pressure at the first pressure
(Continued)

relief hole being greater than a sound pressure at the second pressure relief hole.

20 Claims, 25 Drawing Sheets

(58) Field of Classification Search
CPC ...... H04R 1/1091; H04R 1/1016; H04R 9/06; H04R 1/2888; H04R 1/22; H04R 1/345; H04R 9/066; H04R 25/606; H04R 1/2826; H04R 1/2811; H04R 9/045; H04R 31/003; H04R 1/023; H04R 1/406; H04R 1/1075; H04R 7/12; H04R 23/02; H04R 9/025; H04R 1/2849; H04R 2460/11; H04R 5/0335; Y02E 60/10
See application file for complete search history.

(56) References Cited

U.S. PATENT DOCUMENTS

| | | | | |
|---|---|---|---|---|
| 2018/0054670 A1 | 2/2018 | Struzik et al. | | |
| 2021/0067857 A1* | 3/2021 | Struzik | .................. | H04R 1/345 |
| 2021/0306738 A1* | 9/2021 | Nilsen | .................... | H04R 1/023 |
| 2022/0053259 A1* | 2/2022 | Daley | .................. | H04R 1/1066 |
| 2023/0276166 A1 | 8/2023 | Zhang et al. | | |
| 2025/0119680 A1 | 4/2025 | Zhang et al. | | |

FOREIGN PATENT DOCUMENTS

| | | | | |
|---|---|---|---|---|
| CN | 113573215 A | 10/2021 | | |
| CN | 113810813 A | 12/2021 | | |
| CN | 114286228 A | 4/2022 | | |
| CN | 115175069 A | 10/2022 | | |
| CN | 115209264 A * | 10/2022 | ............... | H04R 1/10 |
| CN | 115209267 A | 10/2022 | | |
| CN | 115209268 A | 10/2022 | | |
| CN | 115209285 A | 10/2022 | | |
| EP | 4187918 A1 | 5/2023 | | |

OTHER PUBLICATIONS

Notice of Preliminary Rejection in Korean Application No. 10-2024-7028111 mailed on Aug. 18, 2025, 12 pages.
The Extended European Search Report in European Application No. 23881047.7 mailed on Apr. 2, 2025, 9 pages.

* cited by examiner

OPEN EARPHONES

CROSS-REFERENCE TO RELATED APPLICATIONS

This application is a continuation of International Application No. PCT/CN2023/079411, filed on Mar. 2, 2023, which claims priority of Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022, the entire contents of each of which are hereby incorporated by reference.

TECHNICAL FIELD

The present disclosure relates to the field of acoustics technology, and in particular, to an open earphone.

BACKGROUND

With the development of acoustic output technology, earphones have been widely used in people's daily lives, and can be used in conjunction with electronic devices such as cell phones and computers to provide users with an auditory feast. According to the way users wear them, the acoustic devices may include head-mounted, ear-hook, and in-ear types. The output of the earphones has a significant impact on the user's comfort.

Therefore, it is desirable to provide an open earphone to improve the output performance of open earphones.

SUMMARY

Embodiments of the present disclosure provide an open earphone, including a sound production component including: a transducer including a diaphragm configured to generate a sound under an action of an excitation signal; and a housing, the housing forming a cavity used to accommodate the transducer, wherein in a wearing state, the housing may be provided with a sound guiding hole on an inner side surface toward an auricle of a user for guiding a sound generated by a front side of the diaphragm out of the housing and into an ear canal of the user, and at least two pressure relief holes may be provided on one or more other side surfaces of the housing, the at least two pressure relief holes including a first pressure relief hole away from the ear canal and a second pressure relief hole near the ear canal, and a sound pressure at the first pressure relief hole being greater than a sound pressure at the second pressure relief hole.

In some embodiments, the first pressure relief hole and the second pressure relief hole may be respectively located on different side surfaces of the housing.

In some embodiments, a ratio of an area of the first pressure relief hole to an area of the second pressure relief hole may be in a range of 1 to 5.

In some embodiments, a ratio of a long axis dimension to a short axis dimension of the first pressure relief hole may be in a range of 1.3 to 8.

In some embodiments, a ratio of a long axis dimension to a short axis dimension of the second pressure relief hole may be in a range of 1 to 6.

In some embodiments, a ratio of a length to a width of a cross-section of the first pressure relief hole may be greater than a ratio of a length to a width of a cross-section of the second pressure relief hole.

In some embodiments, a ratio of a length to a width of a cross-section of the first pressure relief hole may be smaller than a ratio of a length to a width of a cross-section of the second pressure relief hole.

In some embodiments, a ratio of a length to a width of a cross-section of the first pressure relief hole may be equal to a ratio of a length to a width of a cross-section of the second pressure relief hole.

In some embodiments, a ratio of an area of the sound guiding hole to a total area of the first pressure relief hole and the second pressure relief hole may be in a range of 0.1 to 0.99.

In some embodiments, the diaphragm may divide the cavity into a front cavity and a rear cavity corresponding to the front side and a rear side of the diaphragm, respectively, wherein a ratio of a volume of the rear cavity to a volume of the front cavity may be in a range of 0.1 to 10.

In some embodiments, the diaphragm may divide the cavity into a front cavity and a rear cavity corresponding to the front side and a rear side of the diaphragm, respectively, wherein a ratio of a resonance frequency of the front cavity to a resonance frequency of the rear cavity may be in a range of 0.1 to 5.

In some embodiments, a ratio of an area of the sound guiding hole to a total area of the first pressure relief hole and the second pressure relief hole may be in a range of 1 to 10.

In some embodiments, the diaphragm may divide the cavity into a front cavity and a rear cavity corresponding to the front side and a rear side of the diaphragm, respectively, wherein a ratio of a volume of the rear cavity to a volume of the front cavity may be in a range of 0.1 to 10.

In some embodiments, the diaphragm may divide the cavity into a front cavity and a rear cavity corresponding to the front side and the rear side of the diaphragm, respectively, wherein a ratio of a resonance frequency of the front cavity to a resonance frequency of the rear cavity may be in a range of 0.5 to 10.

In some embodiments, a ratio of an area of the sound guiding hole to a square of a depth of the sound guiding hole may be in a range of 0.31 to 512.2.

In some embodiments, a ratio of a long axis dimension to a short axis dimension of the sound guiding hole may be in a range of 1 to 10.

In some embodiments, in a range of 3.5 kHz to 4.5 kHz, a ratio of a sound pressure at the sound guiding hole to a total sound pressure at the first pressure relief hole and the second pressure relief hole may be in a range of 0.4 to 0.6.

In some embodiments, in a range of 3.5 kHz to 4.5 kHz, a ratio of a sound pressure at the sound guiding hole to the sound pressure at the first pressure relief hole may be in a range of 0.9 to 1.1.

In some embodiments, in a range 3.5 kHz to 4.5 kHz, a ratio of a sound pressure at the sound guiding hole to the sound pressure at the second pressure relief hole may be in a range 0.9 to 1.1.

In some embodiments, acoustic resistance nets may be provided at the sound guiding hole and at the at least two pressure relief holes, respectively.

In some embodiments, an acoustic resistance net at the sound guiding hole and acoustic resistance nets at the at least two pressure relief holes may have a same acoustic impedance rate.

In some embodiments, an acoustic resistance net at the sound guiding hole may have a different acoustic impedance rate from acoustic resistance nets at the at least two pressure relief holes.

In some embodiments, the acoustic resistance nets provided at the sound guiding hole or the at the at least two pressure relief holes may include a gauze mesh or a steel mesh.

In some embodiments, the acoustic resistance net at the sound guiding hole may include a gauze mesh and an etched steel mesh.

In some embodiments, an acoustic impedance rate of the gauze mesh may be in a range of 2 MKS rayls to 50 MKS rayls.

In some embodiments, an acoustic impedance rate of the steel mesh may be in a range of 0.1 MKS rayls to 10 MKS rayls.

In some embodiments, a distance between an upper surface of the acoustic resistance net at the first pressure relief hole towards an exterior of the housing and an outer surface of the housing may be in a range of 0.8 mm to 0.9 mm.

In some embodiments, a distance between an upper surface of the acoustic resistance net at the second pressure relief hole towards an exterior of the housing and an outer surface of the housing may be in a range of 0.7 mm to 0.8 mm.

In some embodiments, thicknesses of the acoustic resistance nets at the at least two pressure relief holes may be in a range of 40 μm to 150 μm.

BRIEF DESCRIPTION OF THE DRAWINGS

The present disclosure is further illustrated in terms of exemplary embodiments. These exemplary embodiments are described in detail with reference to the drawings. These embodiments are not restrictive, in which the same numbering indicates the same structure, wherein.

DETAILED DESCRIPTION

Figure 1:
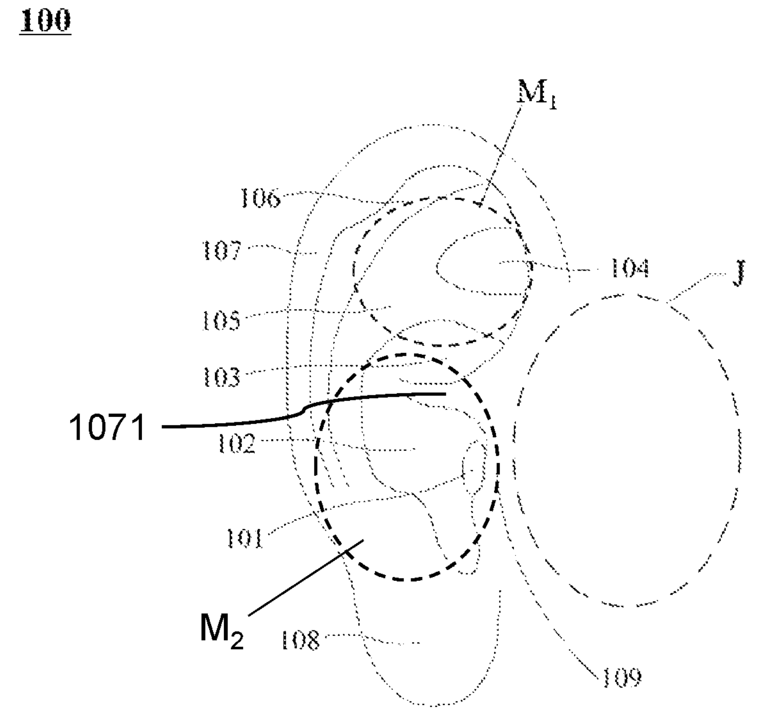
FIG. 1 is a schematic diagram illustrating an exemplary ear according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, and those skilled in the art may further apply the present disclosure to other similar scenarios. Unless obviously obtained from the context or the context illustrates otherwise, the same numeral in the drawings refers to the same structure or operation.

It should be understood that “system,” “device,” “unit,” and/or “module” as used herein is a method for distinguishing different assemblies, elements, components, parts or portions of different levels. However, if other words serve the same purpose, the words may be replaced by other expressions.

As used in the disclosure and the appended claims, the singular forms “a,” “an,” and “the” include plural referents unless the content clearly dictates otherwise. In general, the terms “comprise” and “include” imply the inclusion only of clearly identified steps and elements that do not constitute an exclusive listing. A method or equipment may also include other steps or elements.

The flowcharts used in the present disclosure illustrate operations that the system implements according to the embodiment of the present disclosure. It should be understood that the preceding or following operations may not be accurately implemented in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary ear according to some embodiments of the present disclosure. Referring to FIG. 1, the ear 100 (also referred to as an auricle) may include an external ear canal 101, an concha cavity 102, a cymba conchae 103, a triangular fossa 104, an antihelix 105, a scapha 106, a helix 107, an earlobe 108, a tragus 109, and a crus of helix 1071. In some embodiments, one or more parts of the ear 100 may be used to support an acoustic device to achieve stable wearing of the acoustic device. In some embodiments, parts of the ear 100 such as the external ear canal 101, the concha cavity 102, the cymba conchae 103, the triangular fossa 104, etc., have a certain depth and volume in the three-dimensional space, which may be used to achieve the wearing requirements of the acoustic device. For example, the acoustic device (e.g., an in-ear earphone) may be worn in the external ear canal 101. In some embodiments, the wearing of the acoustic device (e.g., an open earphone) may be achieved with the aid of other parts of the ear 100 other than the external ear canal 101. For example, the wearing of the acoustic device may be achieved with the aid of the cymba conchae 103, the triangular fossa 104, the antihelix 105, the scapha 106, the helix 107, etc., or any combination thereof. In some embodiments, the earlobe 108 and other parts of the user’s ear may also be used to improve the comfort and reliability of the acoustic device in wearing. By utilizing parts of the ear 100 other than the external ear canal 101 for the wearing of the acoustic device and the transmission of sound, the external ear canal 101 of the user may be “liberated.” When the user wears the acoustic device (e.g., an open earphone), the acoustic device may not block the external ear canal 101 (or the ear canal or ear canal opening) of the user, and the user may receive sound from the acoustic device and sound from the environment (e.g., horn sounds, car bells, surrounding voices, traffic commands, etc.), thereby reducing the probability of traffic accidents. In some embodiments, the acoustic device may be configured to adapt to the ear 100 according to the construction of the ear 100 to enable a sound production component of the acoustic device to be worn at various positions of the ear. For example, when the acoustic device is an open earphone, the open earphone may include a suspension structure (e.g., an ear hook) and a sound production component. The sound production component is physically connected to the suspension structure, which may be adapted to the shape of the ear to place the whole or part of the structure of the sound production component at a front side of the tragus 109 (e.g., a region J enclosed by the dotted line in FIG. 1). As another example, the whole or part of the structure of the sound production component may be in contact with an upper portion of the external ear canal 101 (e.g., where one or more parts such as the cymba conchae 103, the triangular fossa 104, the antihelix 105, the scapha 106, the helix 107, the crus of helix 1071, etc., are located) while the user is wearing the open earphone. As another example, when the user wears the open earphone, the whole or part of the structure of the sound production component may be located within a cavity formed by one or more parts of the ear 100 (e.g., the concha cavity 102, the cymba conchae 103, the triangular fossa 104, etc.) (e.g., a region M1 enclosed by the dotted line in FIG. 1 containing at least the cymba conchae 103, the triangular fossa 104 and a region M2 containing at least the concha cavity 102).

Different users may have individual differences, resulting in different shapes, dimensions, etc., of ears. For the convenience of description and understanding, unless otherwise specified, the present disclosure mainly takes an ear model with a "standard" shape and size for reference, and further describes how the acoustic device in different embodiments is worn on the ear model. For example, a simulator (e.g., GRAS 45BC KEMAR) containing a head and (left and right) ears produced based on standards of ANSI: 53.36, 53.25 and IEC: 60318-7 may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a size of the projection of the auricle on the sagittal plane in a sagittal axis direction may be in a range of 36.6 mm-55 mm. Thus, in the present disclosure, the descriptions such as "worn by the user," "in the wearing state," and "under the wearing state" may refer to the acoustic device described in the present disclosure being worn on the ear of the aforementioned simulator. Of course, considering the individual differences of different users, structures, shapes, dimensions, thicknesses, etc., of one or more parts of the ear 100 may be somewhat different. To meet the needs of different users, the acoustic device may be designed differently, and these differential designs may be manifested as feature parameters of one or more parts of the acoustic device (e.g., a sound production component, an ear hook, etc. in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, observing the ear of the above simulator in a direction along the coronal axis of the human body, a schematic diagram illustrating the front side of the ear as shown in FIG. 1 is obtained.

Figure 2:
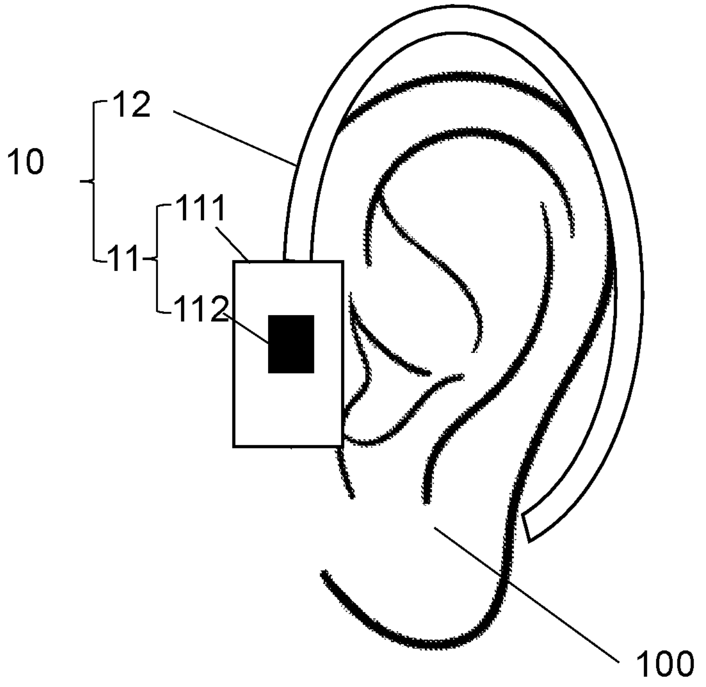
FIG. 2 is a structural diagram illustrating an exemplary open earphone according to some embodiments of the present disclosure.
Figure 3:
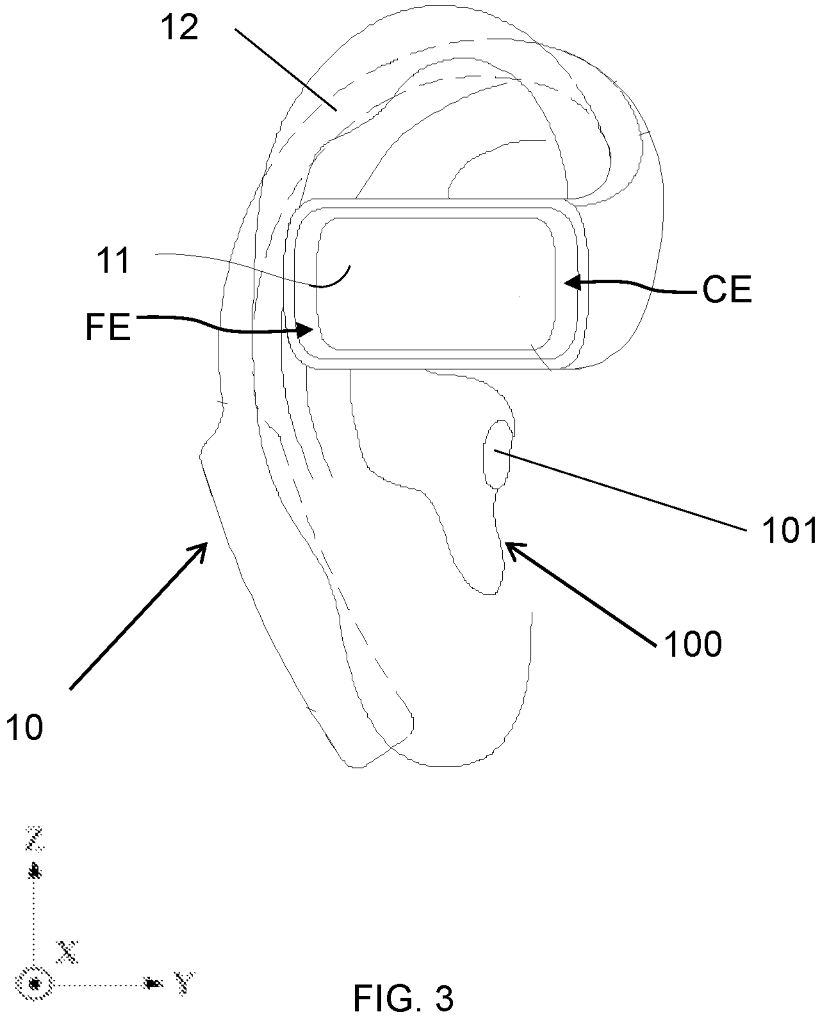
FIG. 3 is a schematic diagram illustrating an exemplary wearing state of an open earphone according to some embodiments of the present disclosure.
Figure 4:
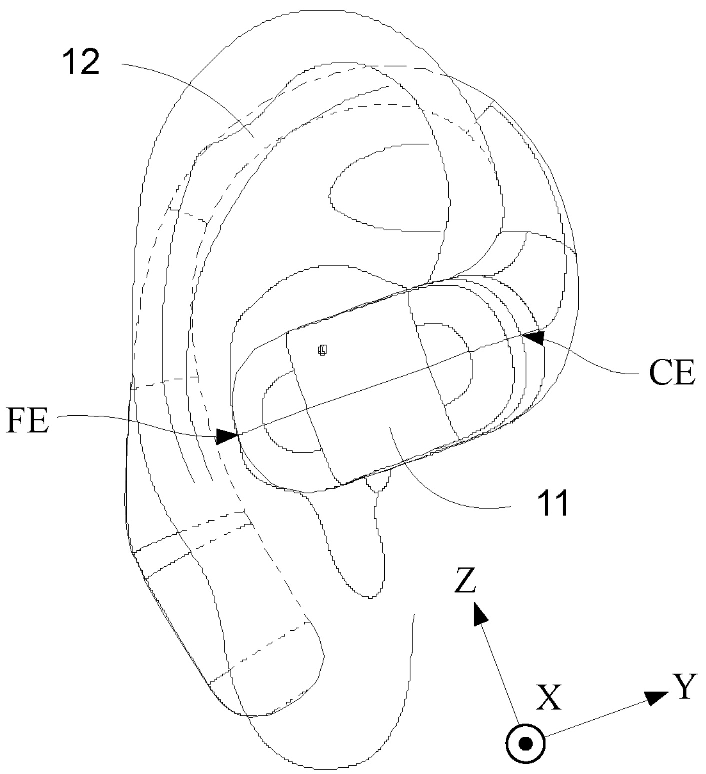
FIG. 4 is a diagram illustrating an exemplary wearing state of another open earphone according to some embodiments of the present disclosure.

FIG. 2 is a structural diagram illustrating an exemplary open earphone according to some embodiments of the present disclosure; FIG. 3 is a schematic diagram illustrating an exemplary wearing state of an open earphone according to some embodiments of the present disclosure; FIG. 4 is a diagram illustrating an exemplary wearing state of another open earphone according to some embodiments of the present disclosure. As shown in FIG. 2-FIG. 4, the open earphone 10 may include a sound production component 11 and an ear hook 12. In some embodiments, the sound production component 11 of the open earphone 10 may be worn on the user's body (e.g., the head, neck, or upper torso of the human body) through the ear hook 12.

In some embodiments, the open earphone 10 may be worn with a first portion of the ear hook 12 placed between the user's auricle and head and a second portion extending towards a side of the auricle away from the head and connected to the sound production component 11. In such cases, the sound production component 11 may be placed near the ear canal without blocking the ear canal. In some embodiments, the ear hook 12 may be a curved structure adapted to the user's auricle such that the ear hook 12 may be suspended at the user's upper auricle. In some embodiments, the ear hook 12 may also include a clamping structure adapted to the user's auricle such that the ear hook 12 may be clamped at the user's auricle. In some embodiments, the ear hook 12 may include, but is not limited to, an ear hook, an elastic band, etc., such that the open earphone 10 may be better placed on the user's body, which may prevent the open earphone 10 from falling during use.

In some embodiments, to improve the stability of the open earphone 10 in the wearing state, the open earphone 10 may be used in any one or a combination of the following modes. First, the ear hook 12 is at least partially configured as a profiled structure that fits at least one of the back of the ear and the head, so as to increase a contact area between the ear hook 12 and the ear and/or the head, thereby increasing a resistance preventing the open earphone 10 from falling off from the ear. Second, the ear hook 12 is at least partially configured as an elastic structure such that the ear hook 12 may have a certain deformation in the wearing state, so as to increase a positive pressure of the ear hook 12 on the ear and/or the head, thereby increasing the resistance preventing the open earphone 10 from falling off from the ear. Third, the ear hook 12 is at least partially configured to lean against the ear and/or the head in the wearing state such that the ear hook 12 forms a reaction force that presses the ear, making the sound production component 11 press on the front side of the ear, thereby increasing the resistance preventing the open earphone 10 from falling off from the ear. Fourth, the sound production component 11 and the ear hook 12 may be configured to clamp the antihelix region, the region where the concha cavity is located, etc. from the front side and the rear side of the auricle in the wearing state, thereby increasing the resistance preventing the open earphone 10 from falling off from the ear. Fifth, at least a portion of the sound production component 11 or a structure connected thereto is configured to protrude into physiological parts such as the concha cavity 102, the cymba conchae 103, the triangular fossa 104, the scapha 106, etc., thereby increasing the resistance preventing the open earphone 10 from falling off from the ear.

Figure 6:
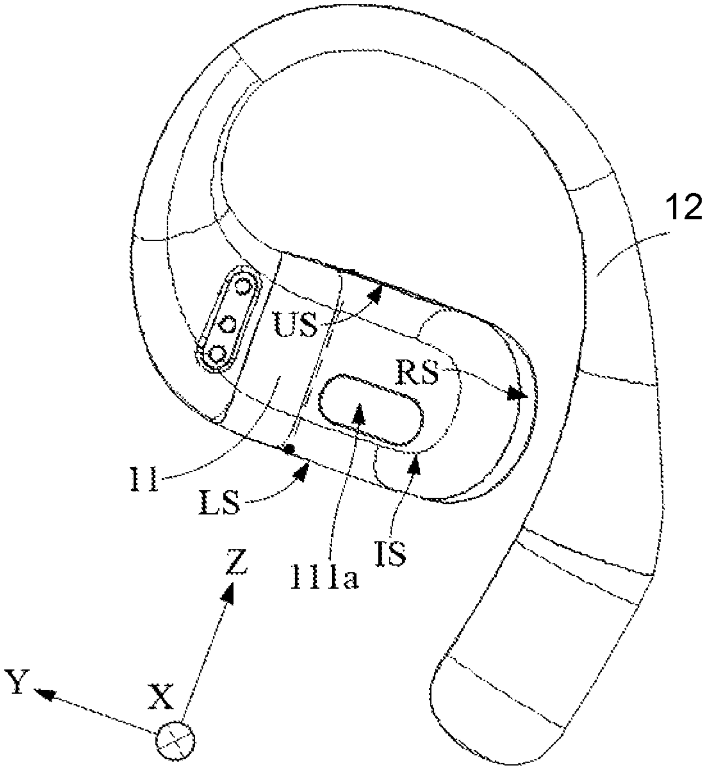
FIG. 6 is a schematic diagram illustrating another exemplary external outline of the open earphone shown in FIG. 4.

In some embodiments, as shown in FIG. 2, the sound production component 11 may be placed on the user's body and configured to generate sound transmitted into the user's ear 100. In some embodiments, the sound production component 11 may include a transducer 112. The transducer 112 may include a diaphragm (for example, a diaphragm 1121 shown in FIG. 11) for generating sound in response to an excitation signal. In some embodiments, the sound production component 11 may include a housing 111. The housing 111 may form a cavity for accommodating the transducer 112. In some embodiments, an inner side surface of the housing 111 towards the auricle (e.g., an inner side surface IS shown in FIG. 6) may include a sound guiding hole (e.g., a sound guiding hole 111*a* shown in FIG. 6) configured to guide a sound generated by a front side of the diaphragm out of the housing 111 and into the ear canal. In some embodiments, other side surfaces of the housing 111 may include at least two pressure relief holes configured to guide sounds generated by a rear side of the diaphragm out of the housing 111 to cancel the sound (e.g., far-field sound) guided by the sound guiding hole 111*a*. For example, the sound production component 11 may emit sounds with a phase difference (e.g., an opposite phase) through the sound guiding hole and the two pressure relief holes, the sounds with the phase difference may interfere with each other in the far field, thereby reducing a sound leakage. In some embodiments, the at least two pressure relief holes may include a first pressure relief hole (e.g., first pressure relief hole 111*c* shown in FIG. 12) and a second pressure relief hole (e.g., second pressure relief hole 111*d* shown in FIG. 12). When the user wears the open earphone 10, the second pressure relief hole may be closer to the ear canal than the first pressure relief hole. In some embodiments, compared with the first pressure relief hole relatively away from the ear canal, a sound wave propagating from the second pressure relief hole close to the ear canal may be more likely to cancel a sound wave propagating from the sound guiding hole in the near field (e.g., the ear canal). Therefore, a sound pressure of the second pressure relief hole may be lower than a sound pressure of the first pressure relief hole to reduce the interference of the sound propagating from the second pressure relief hole with the sound propagating from the sound guiding hole in the near field, thereby improving the listening effect of the open earphone 10.

In some embodiments, the open earphone 10 may be combined with products such as glasses, a headset, a head-mounted display device, an AR/VR headset, etc. In such cases, the sound production component 11 may be placed near the user's ear 100 through a hanging or clamping manner. In some embodiments, the sound production component 11 may have a housing structure with a shape adapted to the user's ear 100 such as circular, elliptical, polygonal (regular or irregular), U-shaped, V-shaped, semi-circular, etc. such that the sound production component 11 may be placed directly at the user's ear 100. In some embodiments, the sound production component 11 may have a long-axis direction Y and a short-axis (or width) direction Z (also referred to as a Z-direction) that are perpendicular to a thickness direction X and orthogonal to each other. The long-axis direction Y may be defined as a direction having the largest extension dimension in shapes of two-dimensional projections (e.g., a projection of the sound production component 11 on a plane where the outer side surface is located, or a projection on a sagittal plane) of the sound production component 11. The short-axis direction Z may be defined as a direction perpendicular to the long-axis direction Y in a shape of a two-dimensional projection of the sound production component 11 (for example, when the shape of the projection is rectangular or approximately rectangular, the short-axis direction is a width direction of the rectangle or approximately rectangle). The thickness direction X may be defined as a direction perpendicular to the two-dimensional projection (e.g., in a same direction as the coronal axis, both pointing to the left and right direction of the body). In some embodiments, when the sound production component 11 is horizontal in the wearing state, the long-axis direction Y may be consistent with or approximately consistent with a direction of the sagittal axis, both pointing to a front and rear direction of the body, and the short-axis direction Z may be consistent with or approximately consistent with a direction of the vertical axis, both pointing in an up and down direction of the body, as shown in FIG. 3. In some embodiments, when the sound production component 11 is inclined in the wearing state, the long-axis direction Y and the short-axis direction Z may remain parallel or approximately parallel to the sagittal plane, the long-axis direction Y may have a certain angle with the direction of the sagittal axis, i.e. the long-axis direction Y may be inclined accordingly, and the short-axis direction Z may have a certain angle with the direction of the vertical axis, i.e. the short-axis direction Z may be inclined, as shown in FIG. 4.

In some embodiments, when the user wears the open earphone 10, the sound production component 11 may be located above, below, on a front side of the user's ear 100 (e.g., on a front side of the tragus) or within the auricle (e.g., in the concha cavity).

In some embodiments, the open earphone 10 may include, but not limited to, an air conduction earphone, a bone air conduction earphone, etc. In some embodiments, in the wearing state, the open earphone 10 may not block the external ear canal 101 of the user, as shown in FIGS. 3 and 4. In some embodiments, the projection of the open earphone 10 on the user's ear plane may partially cover or cover the user's external ear canal 101 with blocking the external ear canal 101, as shown in FIG. 4. In some embodiments, the projection of the open earphone 10 in the user's ear plane may not cover the user's external ear canal 101, as shown in FIG. 3.

The open earphone 10 shown in FIG. 4 is described in detail below as an example of the open earphone 10. It should be noted that the structure of the open earphone 10 of FIG. 4 and corresponding parameters thereof may also be applied to other configurations of open earphones mentioned above, without departing from the corresponding acoustic principles.

Referring to FIGS. 3 and 4, in some embodiments, the sound production component 11 may include a connection end CE that is connected to the ear hook 12 and a free end FE that is not connected to the ear hook 12. In some embodiments, as shown in FIG. 4, at least a portion of the free end FE of the sound production component 11 may protrude into the concha cavity in the wearing state. In the wearing state, when viewed in the direction of the coronal axis, the connection end CE may be closer to the top of the head (as shown in FIG. 4 and FIG. 6) compared to the free end FE to facilitate the extension of the free end FE into the concha cavity. In some embodiments, as shown in FIG. 3, the free end FE of the sound production component 11 may not protrude into the concha cavity in the wearing state. In the wearing state, when viewed in the direction in which the coronal axis, a distance between the connection end CE and the top of the head may be approximately equal to a distance between the free end FE and the top of the head, for example, a line connecting the connection end CE and the free end FE may be parallel to the horizontal plane (as in FIG. 3). In some embodiments, in the wearing state, the free end FE of the sound production component 11 may not protrude into the concha cavity and when viewed in the direction of the coronal axis, the connection end CE may be farther away from the top of the head than the free end FE to prevent the sound production component 11 from blocking the user's external ear canal and the concha cavity.

In some embodiments, the sound production component 11 and the ear hook 12 may jointly clamp an ear region corresponding to the concha cavity from both front and rear sides of the ear region, thereby increasing the resistance preventing the open earphone 10 from falling off the ear and improving the stability of the open earphone 10 in the wearing state. For example, the free end FE of the sound production component 11 may be pressed and held in the concha cavity in the thickness direction Z. As another example, the free end FE may be pressed against the concha cavity in the long-axis direction X and in the short-axis direction Y. It should be noted that, in the wearing state, the free end FE of the sound production component 11, in addition to protruding into the concha cavity, may be projected orthogonally onto the antihelix, or may be projected orthogonally on the left and right sides of the head and on the front side of the ear in the sagittal axis of the body. In other words, the ear hook 12 may support the sound production component 11 to be placed in the concha cavity, on the antihelix, on the front side of the ear, or other wearing positions.

Figure 5:
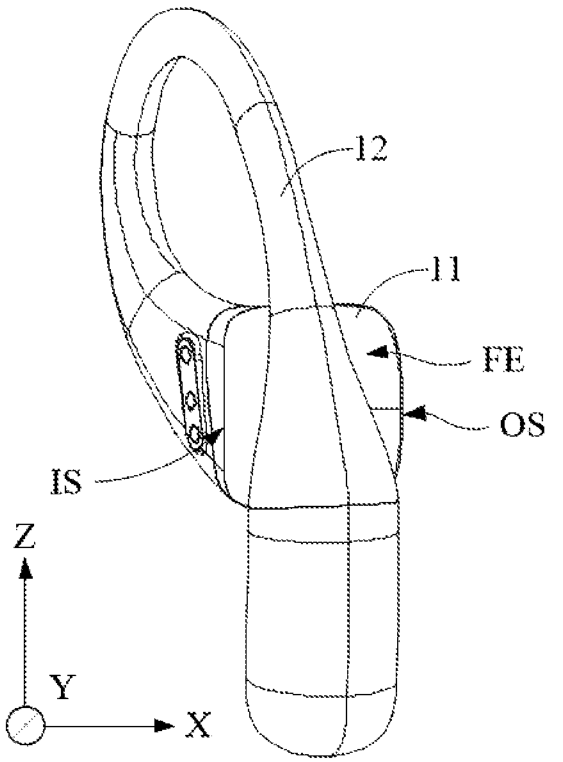
FIG. 5 is a schematic diagram illustrating another exemplary external outline of the open earphone shown in FIG. 4.
Figure 7:
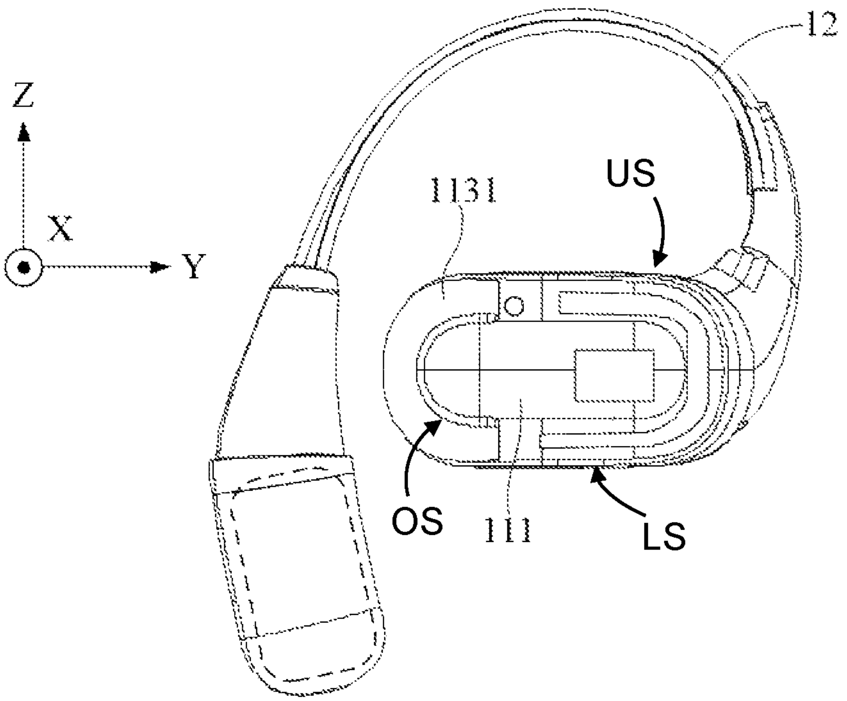
FIG. 7 is a schematic diagram illustrating another exemplary external outline of the open earphone shown in FIG. 4.

FIG. 5 is a schematic diagram illustrating another exemplary external outline of the open earphone shown in FIG. 4; FIG. 6 is a schematic diagram illustrating another exemplary external outline of the open earphone shown in FIG. 4; FIG. 7 is a schematic diagram illustrating another exemplary external outline of the open earphone shown in FIG. 4.

As shown in FIG. 4-FIG. 7, in some embodiments, in the wearing state, the sound production component 11 may include an inner side surface IS facing the ear along the thickness direction X, an outer side surface OS facing away from the ear, and a connection surface connecting the inner side surface IS and the outer side surface OS. In the wearing state, when viewed along the direction of the coronal axis (i.e., in the thickness direction X), the sound production component 11 may have a shape of a circle, an oval, a rounded square, a rounded rectangle, etc. When the sound production component 11 has the shape of a circle, ellipse, etc., the connection surface may refer to a curved side of the sound production component 11. When the sound production component 11 has the shape of a rounded square, a rounded rectangle, etc., the connection surface may include a lower side surface LS, an upper side surface US. and a rear side surface RS as mentioned hereinafter. Therefore, for description, this embodiment is illustrated with the sound production component 11 having a rounded rectangular shape as an example. In some embodiments, the sound production component 11 may include an upper side surface US and a lower side surface LS provided along the short-axis direction Z, and a rear side surface RS connecting the upper side surface US and the lower side surface LS. In the wearing state, the upper side surface US may be located at an end of the short-axis direction Z towards the top of the head, the rear side surface RS may be located at an end of the long-axis direction Y towards the rear of the head, and the free end FE may be located on the rear side surface RS. In some embodiments, a positive direction of the long-axis direction Y may point to the free end FE, a positive direction of the short-axis direction Z may point to the upper side surface US, and a positive direction of the thickness direction X may point to the outer side surface OS. In some embodiments, the inner side surface IS of the housing 111 towards the ear in the wearing state may include the sound guiding hole 111*a* through which a sound wave generated by the transducer 112 propagates out and is transmitted into the external ear canal 101. It should be noted that the sound guiding hole 111*a* may be disposed on the lower side surface LS of the housing 111, or at a corner between the inner side surface IS and the lower side surface LS.

In some embodiments, the first pressure relief hole and the second pressure relief hole may be provided on different sides of the housing 111. For example, in the Z-direction, the first pressure relief hole may be provided on the upper side surface US of the housing 111 and the second pressure relief hole may be provided on the lower side surface LS of the housing 111. The first pressure relief hole and the second pressure relief hole may be configured to destroy standing waves in a rear cavity (i.e. a cavity corresponding to the rear side of the diaphragm) such that a resonance frequency of the sound guided by the two pressure relief holes to the outside of the housing 111 may be as high as possible. In such cases, a frequency response of the rear cavity may have a wide flat region (e.g., a region before a resonance peak) and a better sound reduction effect in a medium and high frequency range (e.g. 2 kHz-6 kHz) may be obtained.

Since the concha cavity has a certain volume and depth, when the free end FE protrudes into the concha cavity, a certain distance may be between the inner side surface IS of the sound production component 11 and the concha cavity. In other words, in the wearing state, the sound production component 11 and the concha cavity may form a cavity-like structure in communication with the external ear canal. The sound guiding hole on the housing 111 may be at least partially located within the cavity-like structure, and the first pressure relief hole and the second pressure relief hole may be located outside the cavity-like structure. In such cases, the sound wave produced by the diaphragm of the transducer 112 and propagated through the sound guiding hole may be limited by the cavity-like structure, i.e., the cavity-like structure may gather the sound waves and allow them to propagate into the external ear canal, which improves the volume and sound quality of the sound heard by the user in the near field, thereby improving acoustic effect of the open earphone 10. Further, since the sound production component 11 may be configured such that the external ear canal is not blocked in the wearing state, the cavity-like structure may be in a semi-open state. In such cases, the sound wave generated by the transducer 112 and transmitted through the sound guiding hole may be transmitted to an outside of the open earphone 10 and an outside of the ear through a gap between the sound production component 11 and the ear (for example, a portion of the concha cavity not covered by the sound production component 11), which may form a first sound leakage in the far field. In addition, the sound wave(s) propagating by the first pressure relief hole and/or the second pressure relief hole on the housing 111 may form a second sound leakage in the far field. A phase of the first sound leakage may be opposite or approximately opposite to a phase of the second sound leakage such that the first sound leakage and the second sound leakage may cancel each other, which reduces the sound leakage of the open earphone 10 in the far field.

Figure 8:
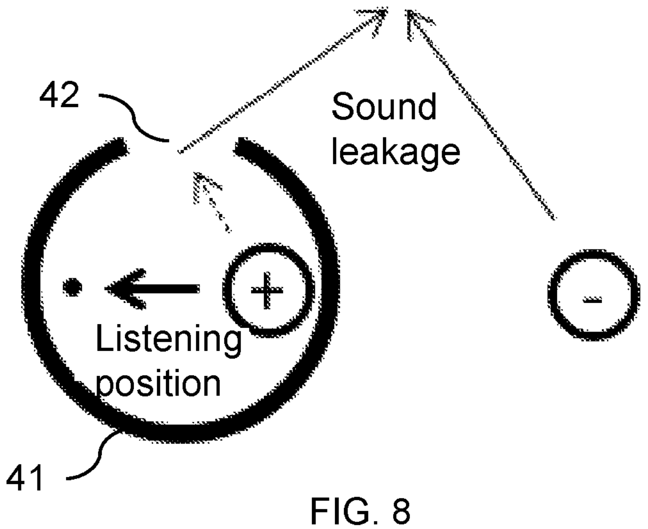
FIG. 8 is a schematic diagram illustrating a cavity structure around one sound source of a dipole sound source according to some embodiments of the present disclosure.

FIG. 8 is a schematic diagram illustrating a cavity structure around one sound source of a dipole sound source according to some embodiments of the present disclosure. As shown in FIG. 8, a cavity structure 41 is provided between two sound sources of a dipole sound source such that one of the sound sources and a listening position is inside the cavity structure 41 and the other sound source is outside the cavity structure 41. In the present disclosure, the "cavity structure" may be understood as a semi-enclosed structure enclosed by a side wall of the sound production component 11 and the concha cavity. The interior of the cavity structure is not completely airtight and isolated from the external environment, but has a leaking structure 42 (e.g., an opening, a gap, a pipe, etc.) acoustically communicated with the external environment. Exemplary leaking structures may include, but are not limited to, an opening, a gap, a pipe, etc., or any combination thereof.

In some embodiments, the cavity structure 41 may include a listening position and at least one sound source. Here, "include" refers to that at least one of the listening position and the sound source is inside a cavity of the cavity structure 41, or that at least one of the listening position and the sound source is at an edge inside the cavity. In some embodiments, the listening position may be an opening of an ear canal or an acoustic reference point of the ear.

Figure 9:
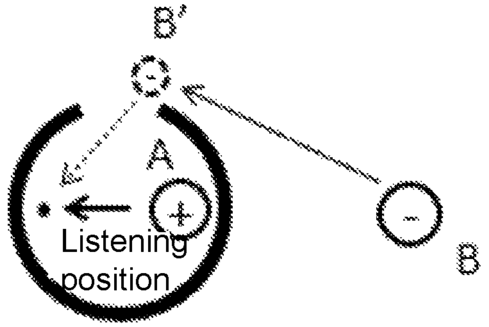
FIG. 9 is a schematic diagram illustrating a listening principle of a dipole sound source and a cavity structure around one sound source of the dipole sound source according to some embodiments of the present disclosure.
Figure 10:
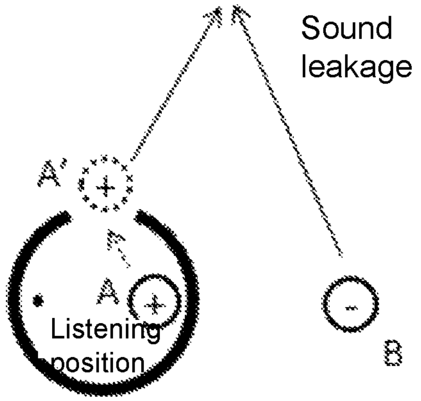
FIG. 10 is a schematic diagram illustrating a sound leakage principle of a dipole sound source structure and a cavity structure around one sound source of the dipole sound source according to some embodiments of the present disclosure.

FIG. 9 is a schematic diagram illustrating a listening principle of a dipole sound source and a cavity structure around one sound source of the dipole sound source according to some embodiments of the present disclosure. FIG. 10 is a schematic diagram illustrating a sound leakage principle of a dipole sound source structure and a cavity structure around one sound source of the dipole sound source according to some embodiments of the present disclosure.

For the listening sound in the near field, as a dipole with a cavity structure around one of the sound sources shown in FIG. 9, and since one sound source A of the sound sources is wrapped by the cavity structure, most of the sound radiated from the sound source A may reach the listening position in a direct emission or reflection manner. In contrast, in a case without the cavity structure, most of the sound radiated from the sound source A may not reach the listening position. Therefore, the cavity structure significantly increases the volume of sound reaching the listening position. In addition, only a small portion of a sound with an opposite phase radiated from an opposite-phase source B outside the cavity structure may enter the cavity structure through a leaking structure of the cavity structure, which is equivalent to providing a secondary sound source B' at the leaking structure. The intensity of the secondary sound source B' may be significantly smaller than that of the sound source B and also significantly smaller than that of the sound source A. The sound generated by the secondary sound source B' may have a weak cancellation effect on the sound source A in the cavity such that the listening volume at the listening position is significantly increased.

For the sound leakage, as shown in FIG. 10, the sound source A radiates a sound to the outside through the leaking structure of the cavity, which is equivalent to providing a secondary sound source A' at the leaking structure. Since almost all the sound radiated by the sound source A is output from the leaking structure, and a structural scale of the cavity is much smaller than a spatial scale for evaluating the sound leakage (a difference may be at least one order of magnitude), the intensity of the secondary sound source A' may be considered as comparable to that of the sound source A. For the external space, the cancellation effect between sounds produced by the secondary sound source A' and the sound source B may be comparable to the cancellation effect between sounds produced by the sound source A and the sound source B. That is, the cavity structure still maintains a comparable sound leakage reduction effect.

It should be understood that the above leaking structure with one opening is only an example, and the leaking structure of the cavity structure may include one or more openings, which may also achieve a superior listening index, wherein the listening index may refer to the reciprocal of a leakage index a (1/a). Taking the leaking structure with two openings as an example, the cases of equal opening and equal opening ratio are analyzed separately below. Taking the structure with only one opening as a comparison, the "equal opening" here means setting two openings each of which has the same dimension as the opening in the leaking structure with only one opening, and the "equal opening ratio" means setting two openings, a total area of which is the same as that of the structure with only one opening. The equal opening is equivalent to doubling the relative opening dimension (i.e., a ratio of an opening area S of the leaking structure on the cavity structure to an area S0 of the cavity structure subject to a direct action of the sound source in the cavity structure) of the leaking structure with only one opening, which may reduce the overall listening index. In the case of the equal opening ratio, even though S/S0 is the same as that of the structure with only one opening, the distances from the two openings to the external sound source are different, which may result in different listening indexes.

Figure 11:
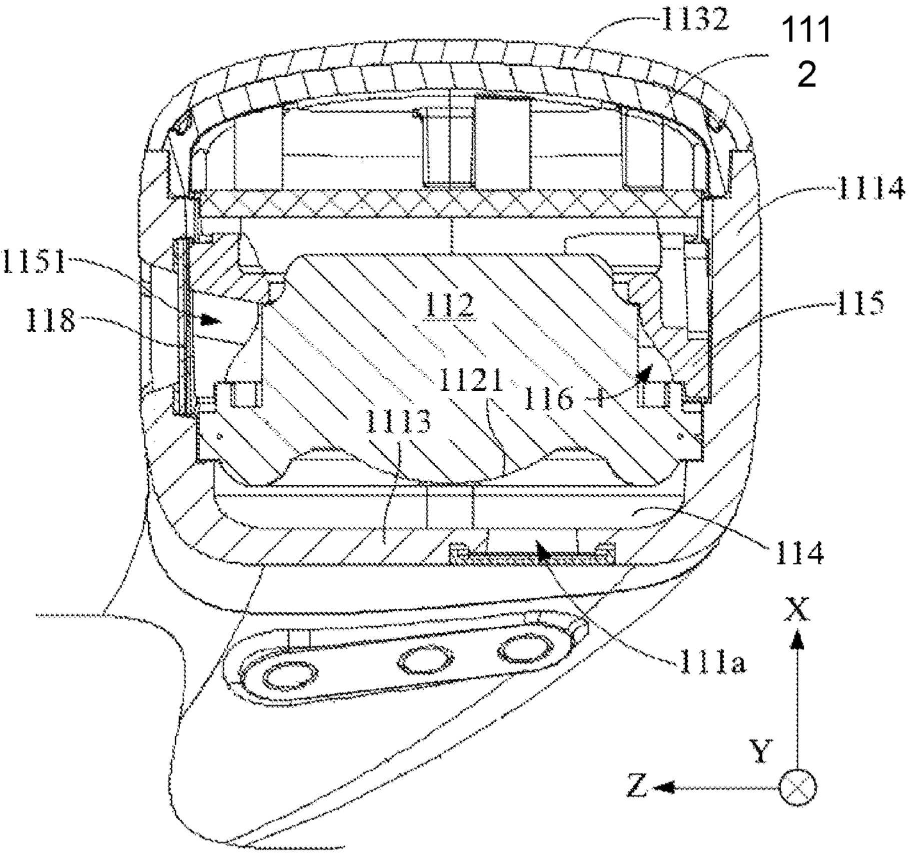
FIG. 11 is a schematic diagram illustrating an exemplary internal structure of a sound production component according to some embodiments of the present disclosure.

FIG. 11 is a schematic diagram illustrating an exemplary internal structure of a sound production component according to some embodiments of the present disclosure. As shown in FIG. 11, in some embodiments, the transducer 112 may include a diaphragm 1121. A first acoustic cavity may be formed between the diaphragm 1121 and the housing 111, and the sound guiding hole **111*a* may be provided in a region of the housing 111 surrounding the first acoustic cavity, and the first acoustic cavity may communicate with the exterior of the housing 111 through the sound guiding hole 111*a*. In some embodiments, the first acoustic cavity may be located on a front side of the diaphragm 1121, i.e., the first acoustic cavity may be regarded as a front cavity 114**.

In some embodiments, the cavity of the housing 111 may include a support 115. A second acoustic cavity may be formed between the support 115 and the transducer 112 and the second acoustic cavity may be separated from other structures in the housing 111 (e.g., a main control circuit board, etc.), which may improve the acoustic output of the sound production component 11. In some embodiments, the second acoustic cavity may be regarded as a rear cavity 116. In some embodiments, an acoustic cavity formed between the support 115 and the transducer 112, along with an acoustic cavity inside the transducer 112, may form a second acoustic cavity. In some embodiments, the second acoustic cavity may be located on a rear side of the diaphragm 1121. The housing 111 may be provided with an acoustic hole (e.g., a first pressure relief hole **111*c* and/or a second pressure relief hole 111*d*), and the support 115 may be provided with an acoustic channel 1151 connecting the acoustic hole to the rear cavity 116 to facilitate communication between the rear cavity 116 and the external environment. That is, air may freely enter and exit the rear cavity 116 such that the resistance of the diaphragm 1121 of the transducer 112** during large amplitudes at low frequencies may be reduced, which may improve the output of the transducer in the low frequency.

Figure 12:
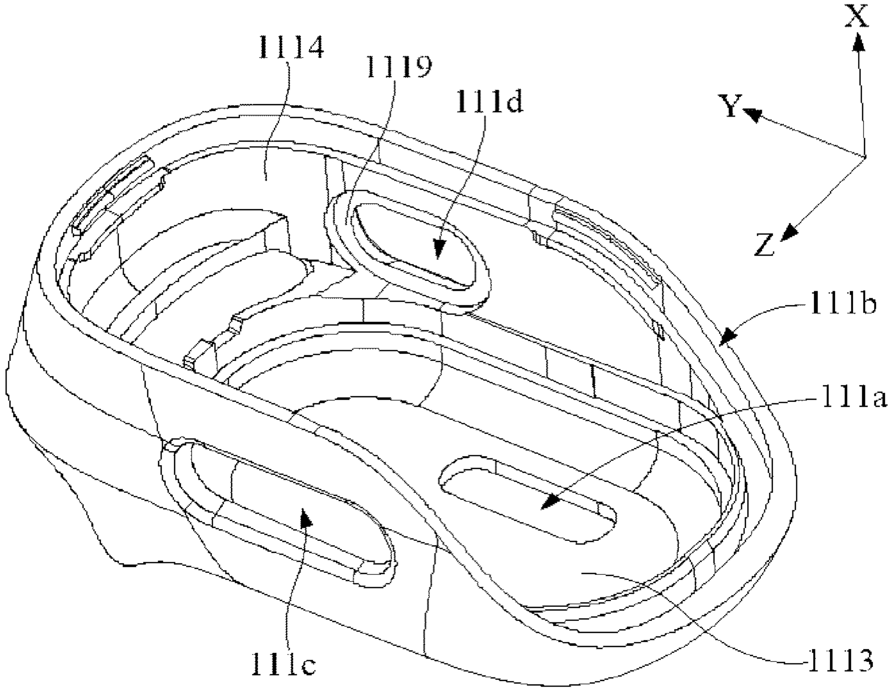
FIG. 12 is a schematic diagram illustrating an exemplary structure of an inner housing of a sound production component of an open earphone according to some embodiments of the present disclosure.

FIG. 12 is a schematic diagram illustrating an exemplary structure of an inner housing of the sound production component of the open earphone according to some embodiments of the present disclosure. In some embodiments, the inner housing 1111 may include a bottom wall 1113 and a first side wall 1114 connected to the bottom wall 1113. When viewed in the short-axis direction Z, in a reference direction from the connection end CE to the free end FE (e.g., in an opposite direction of an arrow Y in FIG. 11 and FIG. 12), a portion of the first side wall 1114 near the free end FE gradually approaches the bottom wall 1113 in the thickness direction X such that in a direction towards the free end FE, a parting surface **111*b* slopes towards the inner housing 1111. In some embodiments, the sound guiding hole 111*a* may be provided on the bottom wall 1113. In some embodiments, the sound guiding hole 111*a* may also be provided on a side of the first side wall 1114 corresponding to the lower side surface LS, or may be provided at a corner between the first side wall 1114 and the bottom wall 1113. In a direction of an arrow Z in FIG. 12, the first pressure relief hole 111***c* is provided on a side of the first side wall 1114 corresponding to the upper side surface US of the housing 111, and the second pressure relief hole 111*d* is provided on a side of the first side wall 1114 corresponding to the lower side surface LS of the housing 111.

In some embodiments, the first pressure relief hole 111*c* has a first center, the second pressure relief hole 111*d* has a second center, and the sound guiding hole 111*a* has a third center. In the long-axis direction Y, the second center may be farther away from the third center than the first center. In some embodiments, the third center of the sound guiding hole 111*a* may be located on or near a mid-plumb plane of a line connecting the first center of the first pressure relief hole 111*c* and the second center of the second pressure relief hole 111*d*, which may maximize the distance from the first pressure relief hole 111*c* or the second pressure relief hole 111*d* to the sound guiding hole 111*a*. It should be known that since the acoustic holes such as the sound guiding hole 111*a*, the first pressure relief hole 111*c*, and the second pressure relief hole 111*d* are provided in the housing 111 and each side wall of the housing 111 has a certain thickness, each of the acoustic holes may have a certain depth. In such cases, each acoustic hole has an inner opening and an outer opening. For description, in the present disclosure, a center of the sound guiding hole may refer to a center of an outer opening of the sound guiding hole, a center of the first pressure relief outlet may refer to a center of an outer opening of the first pressure relief hole, and a center of the second pressure relief outlet may refer to a center of an outer opening of the second pressure relief hole.

In some embodiments, the first pressure relief hole 111*c* and the second pressure relief hole 111*d* may be staggered in the Y-direction such that the first pressure relief hole 111*c* and the second pressure relief hole 111*d* are not obscured by the tragus. In some embodiments, the first pressure relief hole 111*c* may be farther away from the connection end CE than the second pressure relief hole 111*d*. The third center of the sound guiding hole 111*a* may be located on a mid-plumb plane of the line connecting the first center of the first pressure relief hole 111*c* and the second center of the second pressure relief hole 111*d* such that each of the pressure relief holes may be as far away from the sound guiding hole as possible. In some embodiments, to make the sound guiding hole 111*a* closer to the ear canal, the sound guiding hole 111*a* may be located on a side of the housing 111 close to the second pressure relief hole 111*d* rather than in the middle in the Z-direction, as shown in FIG. 12.

Figure 13A:
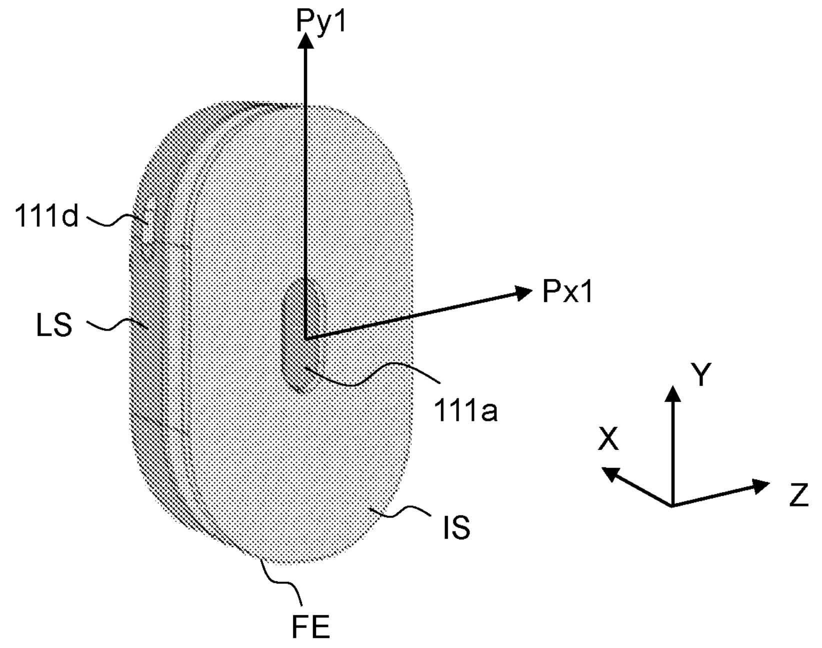
FIG. 13A is a schematic diagram illustrating an exemplary position of a sound guiding hole according to some embodiments of the present disclosure.
Figure 13B:
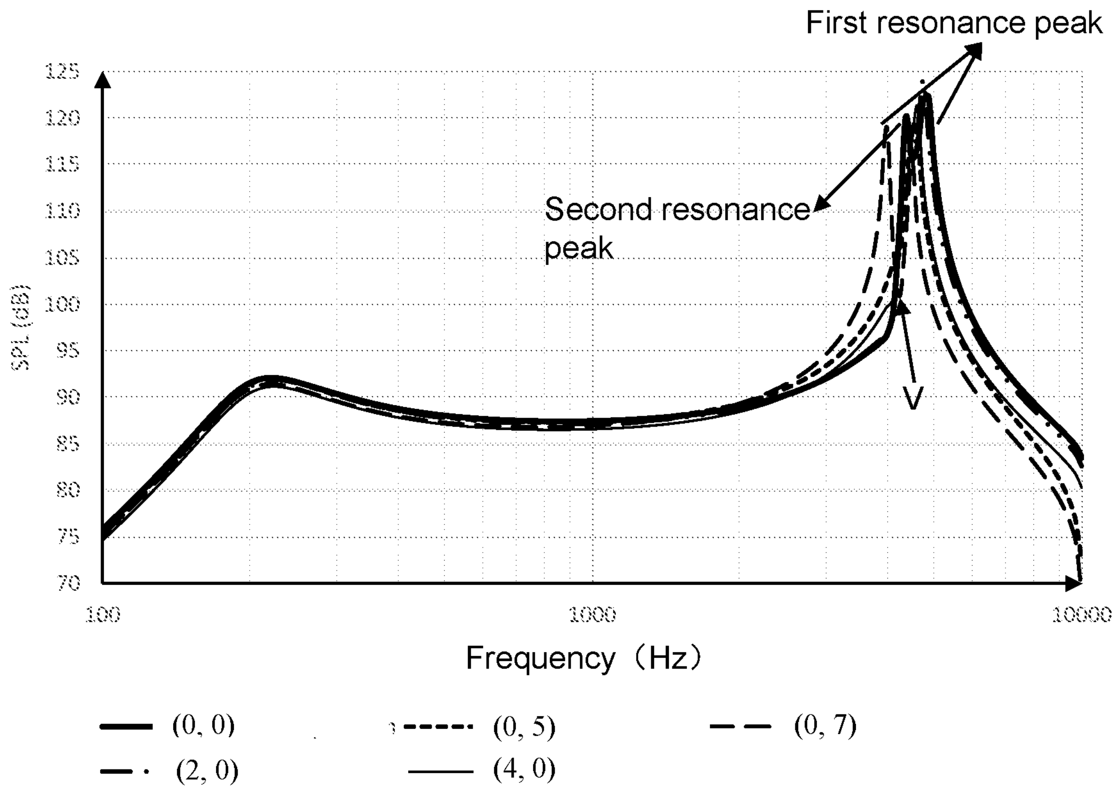
FIG. 13B is a graph illustrating frequency response curves corresponding to different positions of a sound guiding hole according to some embodiments of the present disclosure.

FIG. 13A is a schematic diagram illustrating an exemplary position of a sound guiding hole according to some embodiments of the present disclosure, FIG. 13B is a graph illustrating frequency response curves corresponding to different positions of a sound guiding hole according to some embodiments of the present disclosure. In some embodiments, the frequency response curve shown in FIG. 13B are simulation curves. Referring to FIG. 13A, on the inner side surface IS of the sound production component 11, a coordinate system is established with a center of the inner side surface IS (i.e. a midpoint of the inner side surface IS in the Y-direction and the Z-direction) as the origin, a positive direction of the Z-direction as a positive direction of a Px1 axis, and a positive direction of the Y-direction as a positive direction of a Py1 axis. The position of the third center of the sound guiding hole 111*a* on the inner side surface IS may be expressed as (Px1, Py1) in mm. For example, (0, −4) means that in the positive direction of the Px1 axis, the third center of the sound guiding hole 111*a* is at a distance of 0 mm from the center of the inner side surface IS, and that in the opposite direction of the Py1 axis, the third center is at a distance of 4 mm from the center of the inner side surface IS. In some embodiments, based on the coordinates of the third center of the sound guiding hole 111*a*, a distance between the third center of the sound guiding hole 111*a* and the lower side surface LS (or upper side surface US) and the free end FE (or connection end CE) of the sound production component 11 may be determined. The distance between the third center and the lower side surface LS (or upper side surface US) refers to the farthest distance between the third center and the lower side surface LS (or upper side surface US) in the direction of the Px1 axis; the distance between the third center and the free end FE (or the connection end CE) refers to the farthest distance between the third center and the free end FE (or the connection end CE) in the direction of the Py1 axis.

FIG. 13B is a graph illustrating simulated frequency response curves at 15 mm directly in front of the sound guiding holes 111*a* (i.e. in the opposite direction of the X-direction) when the sound guiding hole 111*a* is located at different positions on the inner side surface IS and other structures (e.g., first relief hole 111*c*, second relief hole 111*d*, etc.) are fixed (e.g., the first relief hole 111*c* is in the center of the upper side surface US, the second pressure relief hole 111*d* is on the lower side surface LS near the connection end CE (e.g., in the long-axis direction Y of the sound production component 11, a distance between the second pressure relief hole 111*d* and the connection end CE is not greater than ⅓ of a total length of the sound production component 11)). Referring to FIG. 13B, when the sound guiding hole 111*a* is located at different positions on the inner side surface IS, the frequency response curve(s) of the sound production component 11 has a first resonance peak(s) in a range of 4 kHz to 6 kHz and a second resonance peak at around 4.5 kHz. The first resonance peak may be generated by a resonance of the front cavity 114 and the second resonance peak may be generated by a resonance of the rear cavity 116. According to the frequency response curves at positions (0, 0), (0, 5), and (0, 7), when the position of the sound guiding hole 111*a* moves to the positive direction of the Py1 axis, the first resonance peak of the sound production component 11 shifts from high frequency to low frequency and the frequency response curve decreases in amplitude at low and medium frequencies (e.g., 100 Hz-1500 Hz). Since the parameters such as the position and structure of the pressure relief hole remain unchanged, a vibration property of the rear cavity 116 remains approximately unchanged and the second resonance peak shown in FIG. 13B is approximately unchanged. In addition, when the position of the sound guiding hole 111*a* moves to the positive direction of the Py1 axis, for example, when the position of the sound guiding hole 111*a* is (0, 7), the frequency response curve of the sound production component 11 has a lower resonance valley V in a range of 4 kHz to 6 kHz. Thus, to make the frequency of the first resonance peak as high as possible and the frequency response of the front cavity have a higher amplitude at low and medium frequencies, the sound guiding hole 111*a* may be located on a side of the center of the inner side surface IS that is away from the positive direction of the Py1 axis. For example, the sound guiding hole 111*a* may be closer to the free end FE of the sound production component 11. By setting a distance between the sound guiding hole 111*a* and the free end FE of the sound production component 11, the amplitude of the sound production component 11 at low and medium frequencies may be increased and the sound production component 11 may have a smooth frequency response curve in a wide frequency range, which may improve the overall (e.g., in a range of 100 Hz to 10,000 Hz) output effect of the sound production component 11. In some embodiments, a distance between the third center of the sound guiding hole 111*a* and the rear side surface RS (or free end FE) may be in a range of 8 mm to 12 mm. In some embodiments, the distance between the third center of the sound guiding hole 111*a* and the rear side surface RS (free end FE) may be in a range of 9 mm to 11 mm. In some embodiments, the distance between the third center of the sound guiding hole 111*a* and the rear side surface RS (free end FE) may be in a range of 10 mm to 11 mm. In some embodiments, to improve the aesthetics and wearing comfort of the earphone, the rear side surface RS of the sound production component 11 may be curved. When the rear side surface RS is curved, the distance between a certain position (e.g., the third center of the sound guiding hole 112) and the rear side surface RS may refer to a distance between the position and a tangent of the rear side surface RS farthest from the center of the sound production component 11 and parallel to the short-axis of the sound production component 11. According to the frequency response curves of positions (0, 0), (2, 0), and (4, 0), the resonance peak of the sound production component 11 shifts from the high frequency to the low frequency when the position of the sound guiding hole 111*a* moves to the positive direction of the Px1 axis, and the frequency response curve decreases in amplitude at low and medium frequencies (e.g., 100 Hz-1500 Hz). Thus, to make the frequency of the first resonance peak as high as possible and the frequency response of the front cavity have a higher amplitude at low and medium frequencies, the sound guiding hole 111*a* may be located on a side of the center of the inner side surface IS that is away from the positive direction of the Px1 axis. For example, the sound guiding hole 111*a* may be closer to the lower side surface LS of the sound production component 11. By setting the distance between the sound guiding hole 111*a* and the lower side surface LS, the amplitude of the sound production component 11 at low and medium frequencies may be increased and the sound production component 11 may have a smooth frequency response curve in a wide frequency range, which improves the overall (e.g., in a range of 100 Hz to 10,000 Hz) output effect of the sound production component 11. In some embodiments, the distance between the third center of the sound guiding hole 111*a* and the lower side surface LS of the sound production component 11 may be in a range of 3 mm to 8 mm. In some embodiments, the distance between the third center of the sound guiding hole 111*a* and the lower side surface LS of the sound production component 11 may be in a range of 4 mm to 6 mm. In some embodiments, the distance between the third center of the sound guiding hole 111*a* and the lower side surface LS of the sound production component 11 may be in a range of 4.5 mm to 5.5 mm.

Figure 14A:
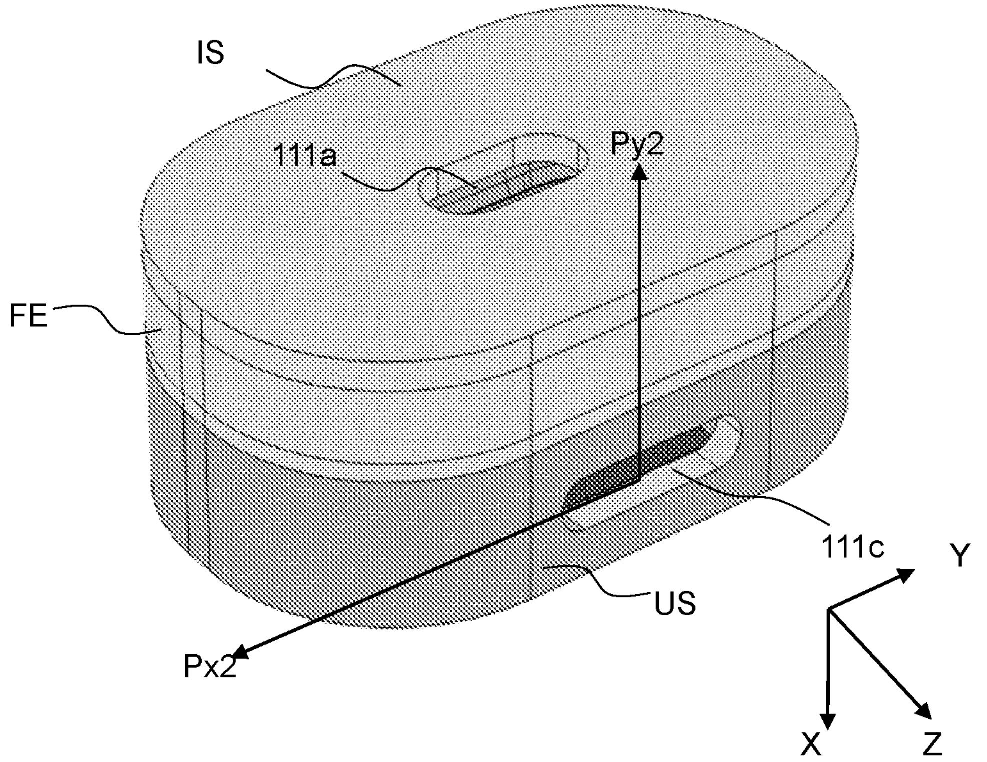
FIG. 14A is a schematic diagram illustrating an exemplary position of a first pressure relief hole according to some embodiments of the present disclosure.
Figure 14B:
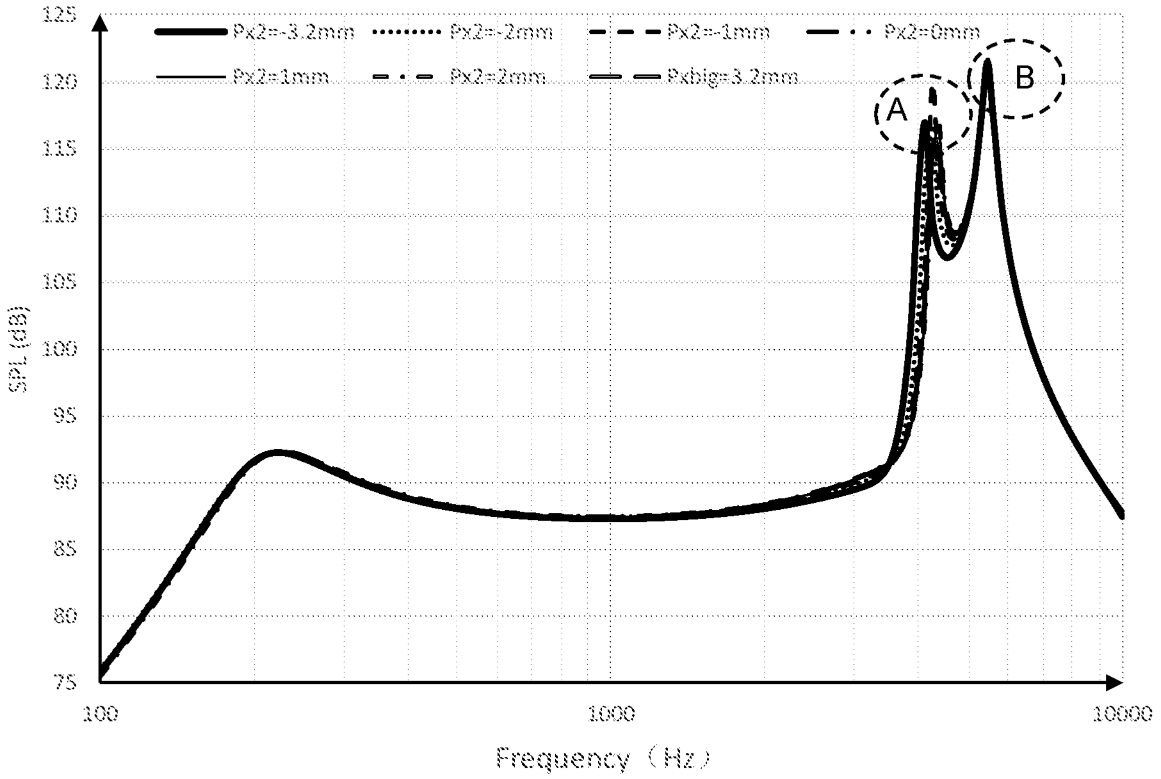
FIG. 14B is a graph illustrating frequency response curves corresponding to different positions of a first pressure relief hole according to some embodiments of the present disclosure.

FIG. 14A is a schematic diagram illustrating an exemplary position of a first pressure relief hole according to some embodiments of the present disclosure, FIG. 14B is a graph illustrating frequency response curves corresponding to different positions of a first pressure relief hole according to some embodiments of the present disclosure. In some embodiments, the frequency response curves shown in FIG. 14B are simulation curves. In some embodiments, the first pressure relief hole 111*c* and the second pressure relief hole 111*d* may be provided in a region of the housing 111 corresponding to the rear cavity 116. In such cases, the position of the first pressure relief hole 111*c* and the second pressure relief hole 111*d* in the X-direction is related to a dimension of the rear cavity 116. In some embodiments, a distance between the first center of the first pressure relief hole 111*c* (or the second center of the second pressure relief hole 111*d*) and the inner side surface IS may be in a range of 4 mm to 8 mm. In some embodiments, the distance between the first center of the first pressure relief hole 111*c* and the inner side surface IS may be in a range of 5 mm to 7 mm. In some embodiments, the distance between the first center of the first pressure relief hole 111*c* and the inner side surface IS may be in a range of 5 mm to 6 mm. In some embodiments, in the X-direction, the position of the first center of the first pressure relief hole 111*c* and the second center of the second pressure relief hole 111*d* may be considered relatively fixed, and only the different positions of the first center of the first pressure relief hole 111*c* and the second center of the second pressure relief hole 111*d* in the Y-direction are considered. Correspondingly, the positions of the first pressure relief hole 111*c* and the second pressure relief hole 111*d* described in FIGS. 14A and 14B may refer to different positions of the first pressure relief hole 111*c* and the second pressure relief hole 111*d* along the Y-direction.

Referring to FIG. 14A, on the upper side surface US, a coordinate system is established with a midpoint of a dimension of the upper side surface US in the Y-direction as the origin, the opposite direction of the Y-direction as a positive direction of a Px2 axis, and the opposite direction of the X-direction as a positive direction of the Py2 axis. The Py2 of the first center of the first pressure relief hole 111*c* is considered as a fixed value, and only the different positions corresponding to different Px2 are considered. The position of the first center of the first pressure relief hole 111*c* on the upper side surface US may be expressed as (Px2, Py2) in mm. For example, (4, Py2) means that the first center of the first pressure relief hole 111*c* is at a distance of 4 mm from the origin in the positive direction of the Px2 axis. In some embodiments, a distance between the first center of the first pressure relief hole 111*c* and the free end FE of the sound emitting part 11 may be determined based on the Px2 of the first center of the first pressure relief hole 111*c*.

FIG. 14B is a graph illustrating simulated frequency response curves at 15 mm directly in front of the sound guiding hole 111*a* (i.e. in the opposite direction of the X-direction) when the first pressure relief hole 111*c* is located at different positions on the upper side surface US and other structures (e.g., the sound guiding hole 111*a*, the second pressure relief hole 111*d*, etc.) are fixed (e.g., the sound guiding hole 111*a* is located in the center of the inner side surface IS and the second pressure relief hole 111*d* is located on the lower side surface LS near the connection end CE). As shown in FIG. 14B, the frequency response curve(s) of the sound production component 11 has a first resonance peak(s) around 4.5 kHz (as shown in dashed coil A in FIG. 14B) and a second resonance peak(s) around 5.5 kHz (as shown in dashed coil B in FIG. 14B) when the first pressure relief hole 111*c* is located at different positions on the upper side surface US. The first resonance peak is generated by a resonance of the rear cavity 116 and the second resonance peak is generated by a resonance of the front cavity 114. When the Px2 of the first pressure relief hole 111*c* gradually increases from −3.2 mm to 3.2 mm (i.e., the first pressure relief hole 111*c* moves to the opposite direction of the Y-direction), the first resonance peak of the frequency response curve of the sound production component 11 has a relatively small shift from a low frequency to a high frequency. Since the position of the sound guiding hole 111*a* remains unchanged, the vibration property of the front cavity 114 remains approximately unchanged and the second resonance peak does not change much. In such cases, to make the frequency of the first resonance peak as high as possible, the first relief hole 111*c* may be located on a side of the center of the upper side surface US facing the positive direction of Px2. For example, the first relief hole 111*c* may be located at a midpoint of a dimension of the upper side surface US in the Y-direction or closer to the free end FE of the sound production component 11 such that the sound production component 11 may have a smooth frequency response curve in a wide frequency range, which improves the overall (e.g., in the range of 100 Hz-10,000 Hz) output effect of the sound production component 11. In some embodiments, the distance between the first center of the first pressure relief hole 111*c* and the rear side surface RS (free end FE) may be in a range of 11 mm to 15 mm. In some embodiments, the distance between the first center of the first pressure relief hole 111*c* and the rear side surface RS (free end FE) may be in a range of 12 mm to 14 mm. In some embodiments, the distance between the first center of the first pressure relief hole 111*c* and the rear side surface RS (free end FE) may be in a range of 13 mm to 14 mm.

Figure 15A:
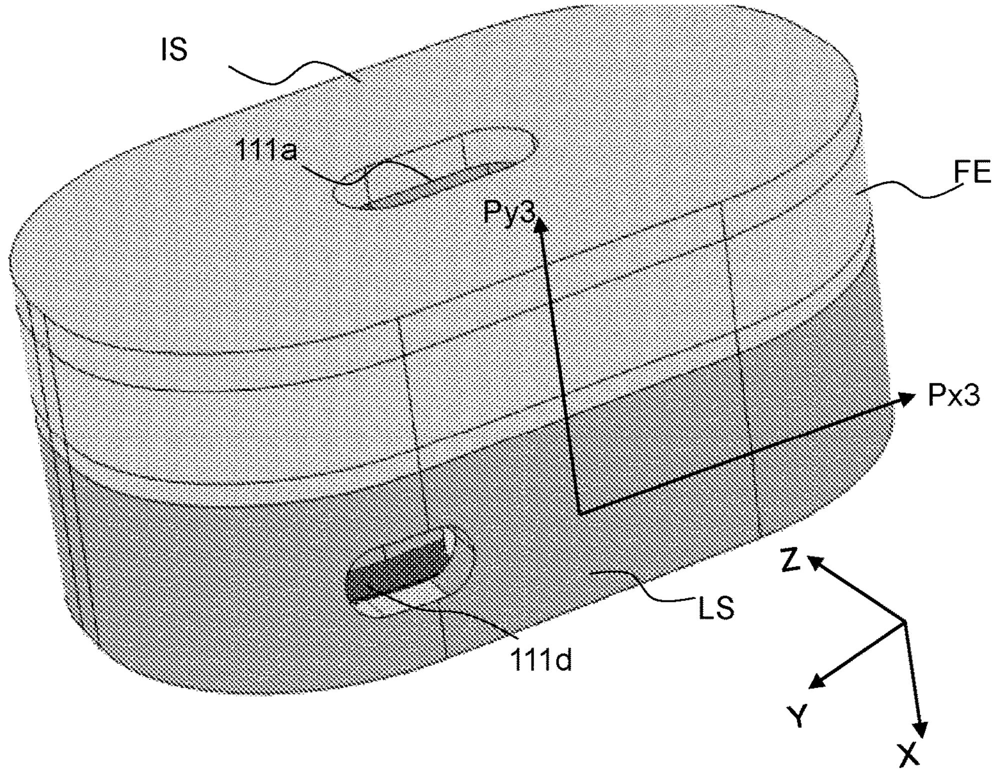
FIG. 15A is a schematic diagram illustrating an exemplary position of a second pressure relief hole according to some embodiments of the present disclosure.
Figure 15B:
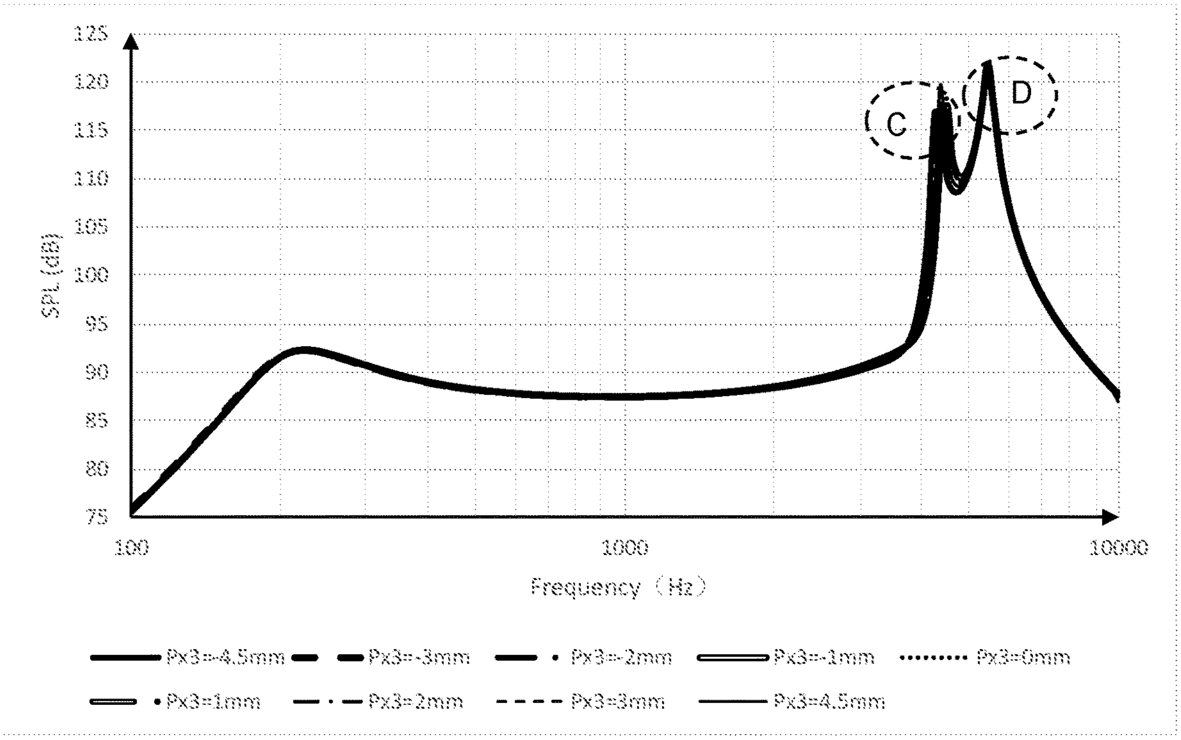
FIG. 15B is a graph illustrating frequency response curves corresponding to different positions of a second pressure relief hole according to some embodiments of the present disclosure.

FIG. 15A is a schematic diagram illustrating an exemplary position of a second pressure relief hole according to some embodiments of the present disclosure, FIG. 15B is a graph illustrating frequency response curves corresponding to different positions of the second pressure relief hole according to some embodiments of the present disclosure. In some embodiments, the frequency response curves shown in FIG. 15B are simulation curves.

Referring to FIG. 15A, on the lower side surface LS, a coordinate system is established with a midpoint of a dimension of the lower side surface LS in the Y-direction as the origin, the opposite direction of the Y-direction as a positive direction of a Px3 axis, and the opposite direction of the X-direction as a positive direction of the Py3 axis. The Py3 of the second center of the second pressure relief hole 111*d* may be considered as a fixed value, and only the different positions corresponding to different Px3 are considered. The position of the second center of the second pressure relief hole 111*d* on the lower side surface LS may be expressed as (Px3, Py3) in mm. For example, (−2, Py2) means that the second center of the second pressure relief hole 111*d* is 2 mm from the origin in the negative direction of the Px3 axis. In some embodiments, the distance between the second center of the second pressure relief hole 111*d* and the free end FE of the sound production component 11 may be determined based on the Px3 of the second center of the second pressure relief hole 111*d*.

FIG. 15B a graph illustrating simulated frequency response curves at 15 mm directly in front of the sound guiding hole 111*a* (i.e. in the opposite direction of the X-direction) when the second pressure relief hole 111*d* is located at different positions on the lower side surface LS and other structures (e.g., the sound guiding hole 111*a*, the first pressure relief hole 111*c*, etc.) are fixed (e.g., the sound guiding hole 111*a* is located at the center of the inner side surface IS and the first pressure relief hole 111*c* is located at the center of the upper side surface US). As shown in FIG. 15B, when the second pressure relief hole 111*d* is located at different positions on the lower side surface LS, the frequency response curve(s) of the sound production component 11 has a first resonance peak(s) around 4.5 kHz (as shown in dashed coil C in FIG. 15B) and a second resonance peak(s) around 5.5 kHz (as shown in dashed coil D in FIG. 15B). When the Px3 of the second center of the second pressure relief hole 111*d* gradually increases from −4.5 mm to −1 mm (i.e., the second pressure relief hole 111*d* moves to the opposite direction of the Y-direction), the first resonance peak of the frequency response curve of the sound production component 11 has a relatively small shift from a low frequency to a high frequency, and the second peak does not change much. When the Px3 of the second center of the second pressure relief hole 111*d* gradually increases from −1 mm to 4.5 mm (i.e., the second pressure relief hole 111*d* continues to move to the opposite direction of the Y-direction), the first resonance peak of the frequency response curve of the sound production component 11 has a relatively small shift from the high frequency to the low frequency, and the second peak does not change much. In some embodiments, according to FIGS. 11 and 12 and the description thereof, the first pressure relief hole 111*c* may be farther away from the connection end CE than the second pressure relief hole 111*d*. That is, the second pressure relief hole 111*d* may be farther away from the free end FE than the first pressure relief hole 111*c*. The overall (e.g., in the range 100 Hz-10,000 Hz) output effect of the sound production component 11 may thus be improved by setting the distance between the second pressure relief hole 111*d* and the free end FE while satisfying the structural design. For example, the first pressure relief hole 111*c* may be located at the midpoint of the dimension of the upper side surface US in the Y-direction or closer to the connection end CE of the sound production component 11. In some embodiments, a distance between the second center of the second pressure relief hole 111*d* and the rear side surface RS (free end FE) may be in a range of 15 mm to 18 mm. In some embodiments, the distance between the second center of the second pressure relief hole 111*d* and the rear side surface RS (free end FE) may be in a range of 16 mm to 17.5 mm. In some embodiments, the distance between the second center of the second pressure relief hole 111*d* and the rear side surface RS (free end FE) may be in a range of 16 mm to 17 mm.

In some embodiments, the front cavity 114 with the sound guiding hole 111*a* (or the rear cavity 116 with the first pressure relief hole 111*c* and/or the second pressure relief hole 111*d*) may be approximated as a Helmholtz resonance cavity model. Taking the front cavity 114 as an example, the front cavity 114 may be a cavity of the Helmholtz resonance cavity model and the sound guiding hole 111*a* is a neck of the Helmholtz resonance cavity model. A resonance frequency of the Helmholtz resonance cavity model is a resonance frequency f1 of the front cavity 114.

In the Helmholtz resonance cavity model, a dimension of the neck (e.g., the sound guiding hole 112) may affect the resonance frequency f of the cavity (e.g., the front cavity 114), and the specific relationship is shown in Equation (1):

$$f = \frac{c}{2\pi}\sqrt{\frac{S}{VL}} \tag{1}$$

where c represents the speed of sound, S represents an opening area (also referred to as a cross-sectional area) of the neck (e.g., the sound guiding hole 112), V represents a volume of the cavity (e.g., the front cavity 114), and L represents a depth of the neck (e.g., the sound guiding hole 112). For the front cavity 114, which has the resonance frequency $f_1$, the opening area of the sound guiding hole 111*a* may be $S_1$, the volume of the front cavity 114 may be V1, and the depth of the sound guiding hole 111*a* may be $L_1$.

It should be noted that a side wall of the housing 111 has a certain thickness, thus the acoustic holes are all holes with certain depths. In such cases, each acoustic hole has an inner opening and an outer opening. For description, in the present disclosure, the opening area of the sound guiding hole may refer to an area of the inner opening of the sound guiding hole and the area of the pressure relief hole may refer to an area of the inner opening of the pressure relief hole.

To improve the sound output effect of the open earphone 10, the frequency response curve of the sound production component 11 may have a wide flat region, and the resonance frequency $f_1$ of the front cavity 114 may be relatively high to increase a range of the flat region of the frequency response curve of the front cavity 114. In some embodiments, the resonance frequency $f_1$ of the front cavity 114 may be in a range of 1 kHz to 10 kHz. In some embodiments, the resonance frequency $f_1$ of the front cavity 114 may be in a range of 4 kHz to 7 kHz. In some embodiments, the resonance frequency $f_1$ of the front cavity 114 may be above 6 kHz.

According to Equation (1), the resonance frequency $f_1$ of the front cavity 114 shifts towards the high frequency when the opening area $S_1$ of the sound guiding hole 111*a* is increased or the depth $L_1$ of the sound guiding hole 111*a* is reduced.

During the vibration of the diaphragm 1121, the air in the front cavity 114 is compressed or expanded as the diaphragm 1121 vibrates, the compressed or expanded air may drive an air column in the sound guiding hole back and forth, which causes the air column to radiate sound outwards. In some embodiments, the air column in the sound guiding hole 111*a* has a mass, the mass may correspond to a sound mass of the sound guiding hole 111*a*. The sound mass may be used as part of an acoustic impedance and thus influence the acoustic output of the sound production component 11. Thus, a dimension of the sound guiding hole 111*a* may influence the sound mass Ma of the sound guiding hole 111*a*, the specific relationship is shown in Equation (2):

$$M_a = \frac{\rho L}{S} \tag{2}$$

where ρ represents air density.

According to equation (2), when the opening area $S_1$ of the sound guiding hole 112 is increased or the depth $L_1$ is reduced, the sound mass Ma of the sound guiding hole 112 decreases.

Figure 16:
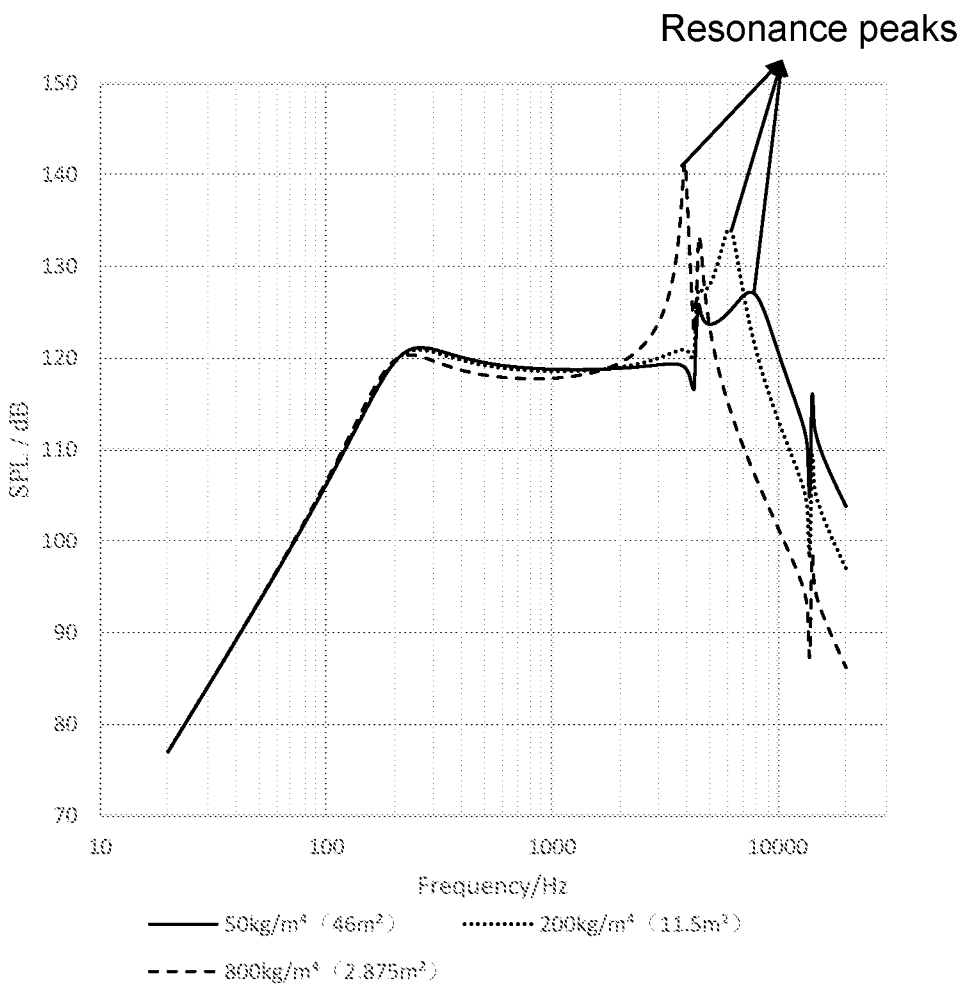
FIG. 16 is a graph illustrating frequency response curves of a sound production component corresponding to different cross-sectional areas of a sound guiding hole according to some embodiments of the present disclosure.

FIG. 16 is a graph illustrating frequency response curves of the sound production component 11 corresponding to different cross-sectional areas of a sound guiding hole according to some embodiments of the present disclosure. As shown in FIG. 16, as the cross-sectional area S of the sound guiding hole 111*a* increases from 2.875 $mm^2$ to 46 $mm^2$, the sound mass Ma of the sound guiding hole 111*a* decreases from 800 $kg/m^4$ to 50 $kg/m^4$ and the resonance frequency $f_1$ of the front cavity 114 gradually increases from around 4 kHz to around 8 kHz. It should be noted that the parameters shown in FIG. 16, such as 200 $kg/m^4$ and 800 $kg/m^4$, only represent a theoretical sound mass of the sound guiding hole 111*a* and may be inaccurate in relation to an actual sound mass of the sound guiding hole 111*a*.

To increase the resonance frequency $f_1$ of the front cavity 114 and improve the sound mass Ma of the sound guiding hole 111*a*, the opening area $S_1$ of the sound guiding hole 111*a* may be in a suitable range of values. In addition, a too large opening area of the sound guiding hole 111*a* may have an impact on other aspects such as the appearance, structural strength, etc. of the open earphone 100. Thus, in some embodiments, the opening area $S_1$ of the sound guiding hole 111*a* may be in a range of 2.875 $mm^2$ to 46 $mm^2$. In some embodiments, the opening area $S_1$ of the sound guiding hole 111*a* may be in a range of 8 $mm^2$ to 30 $mm^2$. In some embodiments, the opening area $S_1$ of the sound guiding hole 111*a* may be in a range of 10 $mm^2$ to 26 mm2. Merely by way of example, the opening area $S_1$ of the sound guiding hole 111*a* may be in a range of 11 $mm^2$ to 15 $mm^2$ (e.g., 11.49 $mm^2$). As another example, the opening area $S_1$ of the sound guiding hole 111*a* may be in a range of 25 $mm^2$ to 26 $mm^2$ (e.g., 25.29 $mm^2$).

Figure 17:
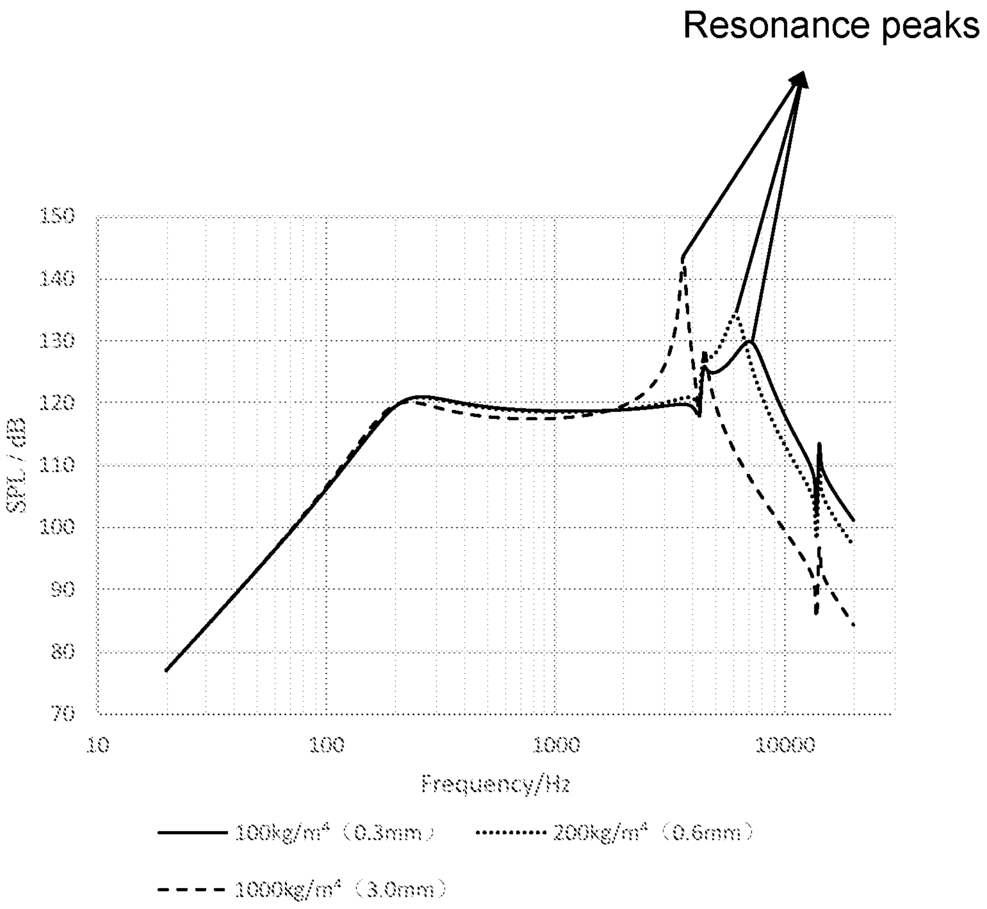
FIG. 17 is a graph illustrating frequency response curves of a front cavity corresponding to different depths of a sound guiding hole according to some embodiments of the present disclosure.

FIG. 17 is a graph illustrating frequency response curves of a front cavity 114 corresponding to different depths of the sound guiding hole according to some embodiments of the present disclosure. As shown in FIG. 17, when the depth $L_1$ of the sound guiding hole 111*a* increases from 0.3 mm to 3 mm, the sound mass Ma of the sound guiding hole 111*a* increases from 100 $kg/m^4$ to 1000 kg/m4 and the resonance frequency $f_1$ of the front cavity 114 decreases from about 7 kHz to about 3.7 kHz.

To ensure that the front cavity 114 has a sufficiently large resonance frequency, the depth $L_1$ of the sound guiding hole 111*a* may be as small as possible. However, since the sound guiding hole 111*a* is provided on the housing 111, the depth of the sound guiding hole 111*a* is the thickness of the housing 111. The small thickness of the housing 111 may have an impact on the structural strength of the open earphone 10 and the corresponding machining process may be more difficult. In some embodiments, the depth $L_1$ of the sound guiding hole 111*a* may be in a range of 0.3 mm to 3 mm. In some embodiments, the depth $L_1$ of the sound guiding hole 111*a* may be in a range of 0.3 mm to 2 mm. In some embodiments, the depth $L_1$ of the sound guiding hole 111*a* may be in a range of 0.3 mm to 1 mm.

In some embodiments, when the cross-sectional area $S_1$ of the sound guiding hole 111*a* is in a range of 2.875 $mm^2$-46 $mm^2$, and the depth $L_1$ of the sound guiding hole 111*a* is in a range of 0.3 mm-3 mm, a ratio of the cross-sectional area $S_1$ of the sound guiding hole 111*a* to a square of the depth $L_1$ may be in a range of 0.31-512.2. In some embodiments, the ratio of the cross-sectional area $S_1$ of the sound guiding hole 111*a* to the square of the depth $L_1$ may be in a range of 1 to 400. In some embodiments, the ratio of the cross-sectional area $S_1$ of the sound guiding hole 111*a* to the square of the depth $L_1$ may be in a range of 3 to 300. In some embodiments, the ratio of the cross-sectional area $S_1$ of the sound guiding hole 111*a* to the square of the depth $L_1$ may be in a range of 5 to 200. In some embodiments, the ratio of the cross-sectional area S1 of the sound guiding hole 111*a* to the square of the depth $L_1$ may be in a range of 10 to 50.

In some embodiments, a shape of the sound guiding hole 111*a* may affect the acoustic impedance of the sound guiding hole 111*a*. For example, the narrower the sound guiding hole 111*a*, the greater the acoustic impedance of the sound guiding hole 111*a*, which is detrimental to the acoustic output of the front cavity 114. Therefore, to improve low frequency output and the sound volume of the sound guiding hole 111*a*, a ratio of a long-axis dimension of the sound guiding hole 111*a* (i.e. a length $L_f$ of the cross-section of the sound guiding hole 111*a*) to a short-axis dimension (i.e. a width $W_f$ of the cross-section of the sound guiding hole 111*a*) (also referred to as length to width ratio of the sound guiding hole 111*a*) may be within a preset range. In some embodiments, the shape of the sound guiding hole 112 may include, but is not limited to, a circle, an oval, a runway shape, etc. In some embodiments, the sound guiding hole 112 may have the runway shape (as shown in FIG. 12), wherein two ends of the runway shape may be minor arced or semicircular. In this case, the long-axis dimension of the sound guiding hole 112 may be a maximum dimension of the sound guiding hole 112 along the X-direction, and the short-axis dimension of the sound guiding hole 112 may be a maximum dimension of the sound guiding hole 112 along the Y-direction.

Figure 18:
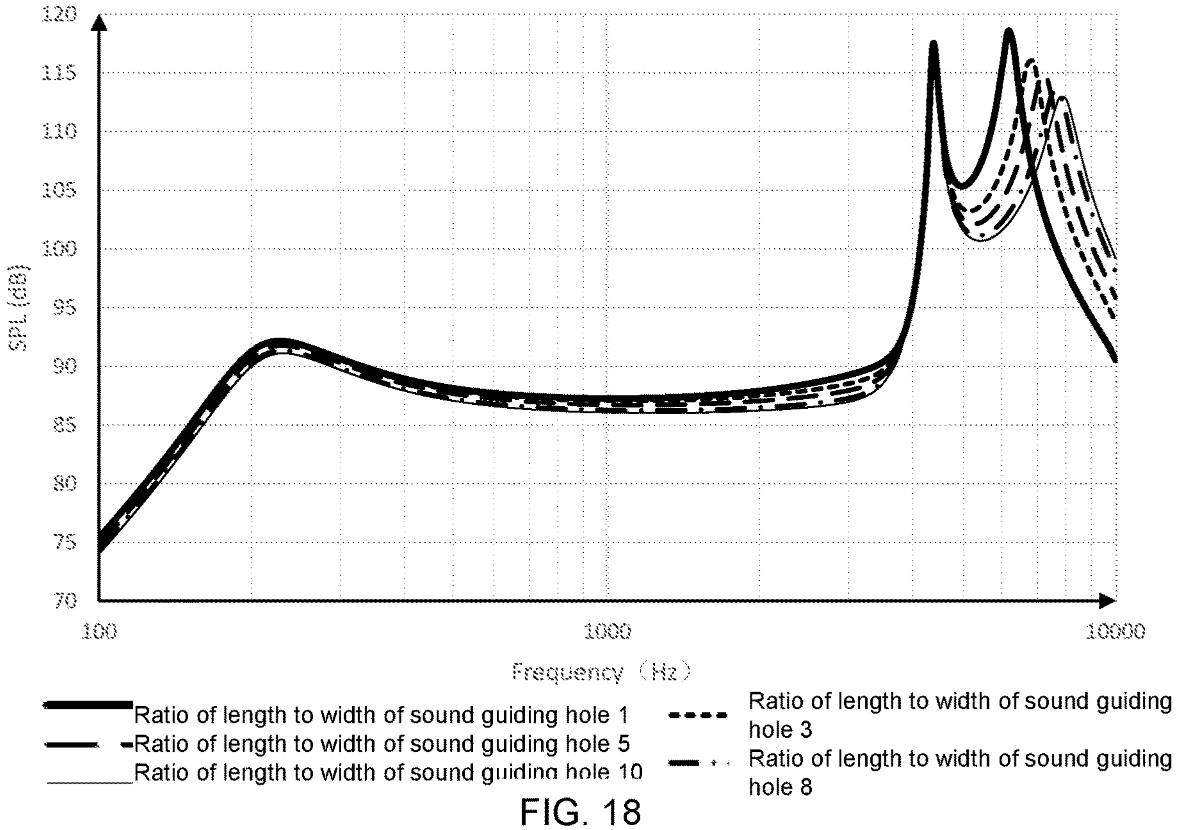
FIG. 18 is a graph illustrating frequency response curves corresponding to different length to width ratios of a sound guiding hole according to some embodiments of the present disclosure.

FIG. 18 is a graph illustrating frequency response curves corresponding to different length to width ratios of a sound guiding hole according to some embodiments of the present disclosure. FIG. 18 illustrates the frequency response curves when sound guiding holes 111*a* with a same cross-sectional area (e.g., $S_1$=22.5 $mm^2$) have different length to width ratios. The frequency response curves shown in FIG. 18 are simulation curves. In some embodiments, as shown in FIG. 18, for different values of the length to width ratio ($L_f/W_f$) of the sound guiding hole 111*a*, as the length to width ratio gradually increases from 1 to 10, the frequency response curve of the front cavity 114 gradually decreases in the low frequency and the medium and high frequency (e.g., 100 Hz to 3.5 kHz) range (e.g., the sound pressure at 3 kHz corresponding to a length to width ratio of 10 is 2.3 dB lower than the sound pressure at 3 kHz corresponding to a length to width ratio of 1). The resonance frequency at the high frequency gradually shifts towards higher frequencies and the amplitude of the resonance peak gradually decreases. In some embodiments, when the area of the cross-section of the sound guiding hole 111*a* is a certain size, to ensure that the frequency response curve of the front cavity 114 has a relatively high frequency response at the low frequency, a ratio of the length $L_f$ to the width $W_f$ of the cross-section of the sound guiding hole 111*a* may be in a range of 1 to 10. In some embodiments, the ratio of the length $L_f$ to the width $W_f$ of the cross-section of the sound guiding hole 111*a* may be 2 to 7. In some embodiments, the ratio of the length $L_f$ to the width $W_f$ of the cross-section of the sound guiding hole 111*a* may be 2 to 3. In some embodiments, the ratio of the length $L_f$ to the width $W_f$ of the cross-section of the sound guiding hole 111*a* may be 2.

Figure 19:
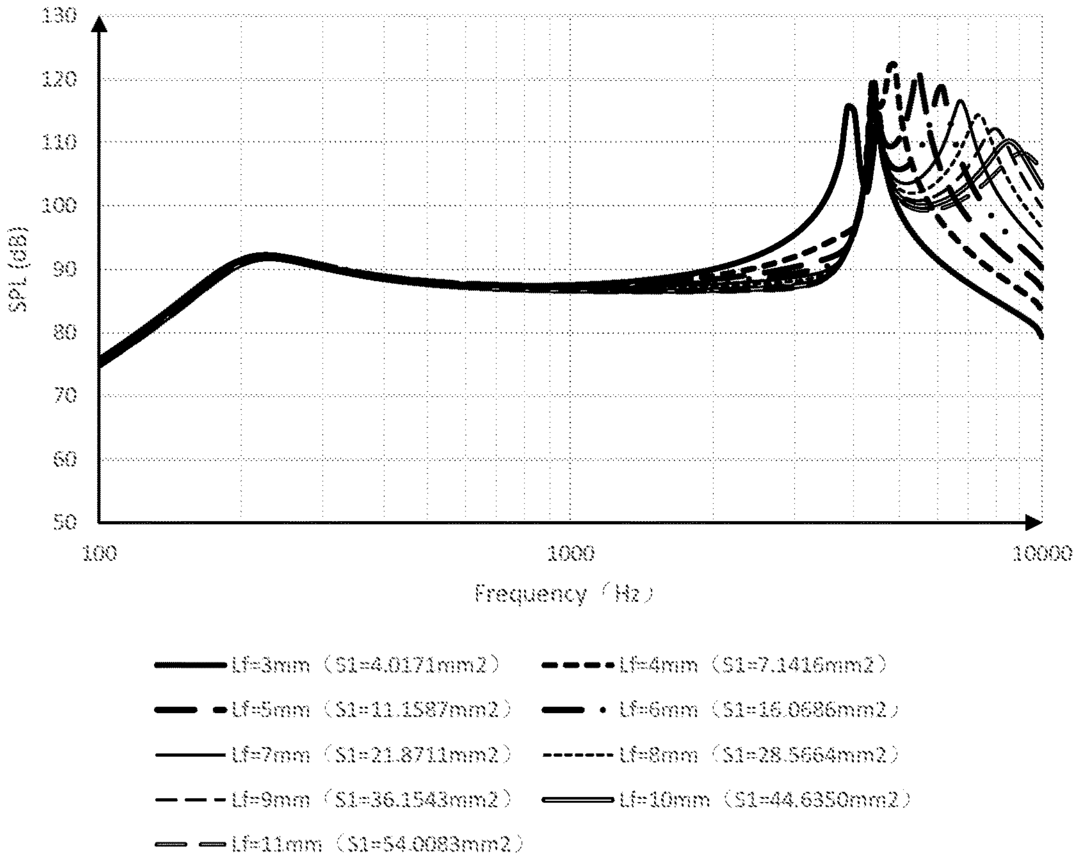
FIG. 19 is a graph illustrating frequency response curves corresponding to different lengths of a sound guiding hole according to some embodiments of the present disclosure.

FIG. 19 is a graph illustrating frequency response curves corresponding to different lengths of a sound guiding hole according to some embodiments of the present disclosure. For illustration, the ratio of the length $L_f$ to the width $W_f$ of the cross-section of the sound guiding hole 111*a* is set as 2, and the sound guiding hole 111*a* has a runway shape. When the width of the sound guiding hole 111*a* is fixed, the opening area $S_1$ may be determined based on the length $L_f$ of the sound guiding hole 111*a*. According to FIG. 19, the frequency response curve of the sound production component 11 has a first resonance peak at around 4.5 kHz and a second resonance peak that varies in a range of 3.5 kHz to 10 kHz. The first resonance peak corresponds to a resonance peak generated by the rear cavity 116 and the second resonance peak corresponds to a resonance peak generated by the front cavity 114. As the length $L_f$ of the sound guiding hole 111*a* gradually increases from 3 mm to 11 mm (and the opening area $S_1$ of the sound guiding hole 111*a* also increases), the second resonance peak of the frequency response curve gradually moves towards the high frequencies, and the first resonance peak remains approximately unchanged. When the length $L_f$ of the sound guiding hole 111*a* is increased to 4 mm (the opening area $S_1$ of the sound guiding hole 111*a* is increased to 7.1416 $mm^2$) and the length $L_f$ of the sound guiding hole 111*a* is increased (the opening area $S_1$ of the sound guiding hole 111*a* is increased), the peak of the second resonance peak of the frequency response curve decreases and the peak of the first resonance peak remains at around 4.5 kHz. In some embodiments, the shift of the resonance peak towards the high frequencies may increase the range of a flat region of the frequency response curve. In addition, the resonance peaks with large peaks may provide more sufficient high frequencies for the open earphone 10 such that the open earphone 10 may have better sound quality. In some embodiments, to make the frequency of the second resonance peak as high as possible, the length $L_f$ of the sound guiding hole 111*a* may have a relatively large value, while in order not to reduce the high frequency output of the second resonance peak and to take into account the structural stability of the sound production component 11, the length $L_f$ of the sound guiding hole 111*a* may be not greater than 17 mm and the width $W_f$ of the sound guiding hole 111*a* may be not greater than 10 mm. In some embodiments, the length $L_f$ of the sound guiding hole 111*a* may be 2 mm to 11 mm. In some embodiments, the length $L_f$ of the sound guiding hole 111*a* may be 3 mm to 11 mm. In some embodiments, the length $L_f$ of the sound guiding hole 111*a* may be 3 mm to 16 mm. In some embodiments, the length $L_f$ of the sound guiding hole 111*a* may be 5 mm to 13 mm. In some embodiments, the length $L_f$ of the sound guiding hole 111*a* may be 6 mm to 9 mm.

In some embodiments, the width $W_f$ of the sound guiding hole 111*a* may be determined based on the length $L_f$ and the ratio of the length $L_f$ to the width $W_f$. For example, the ratio of the length $L_f$ to the width $W_f$ of the cross-section of the sound guiding hole 111*a* may be 2, and the width $W_f$ of the sound guiding hole 111*a* may be 1.5 mm to 5.5 mm. The area of the runway-shaped sound guiding hole 111*a* may be 4.02 $mm^2$ to 54 $mm^2$. By setting the range of the length $L_f$ of the sound guiding hole 111*a*, the range of the flat region of the frequency response curve may be increased such that the sound quality of the open earphone 10 is improved, which also takes into account the structural design of the sound production component 11. Merely by way of example, the area of the runway-shaped sound guiding hole 111*a* is approximately 11.5 $mm^2$ and accordingly the length $L_f$ of the sound guiding hole 111*a* may be 5 mm to 6 mm and the width $W_f$ of the sound guiding hole 111*a* to be 2.5 mm to 3 mm. According to FIG. 19, in the aforementioned size range, the open earphone 10 may have a flat frequency response curve in a wide frequency range as well as sufficient high frequency output; in addition, the area is relatively small, which is conducive to the stability of the structure.

Figure 20:
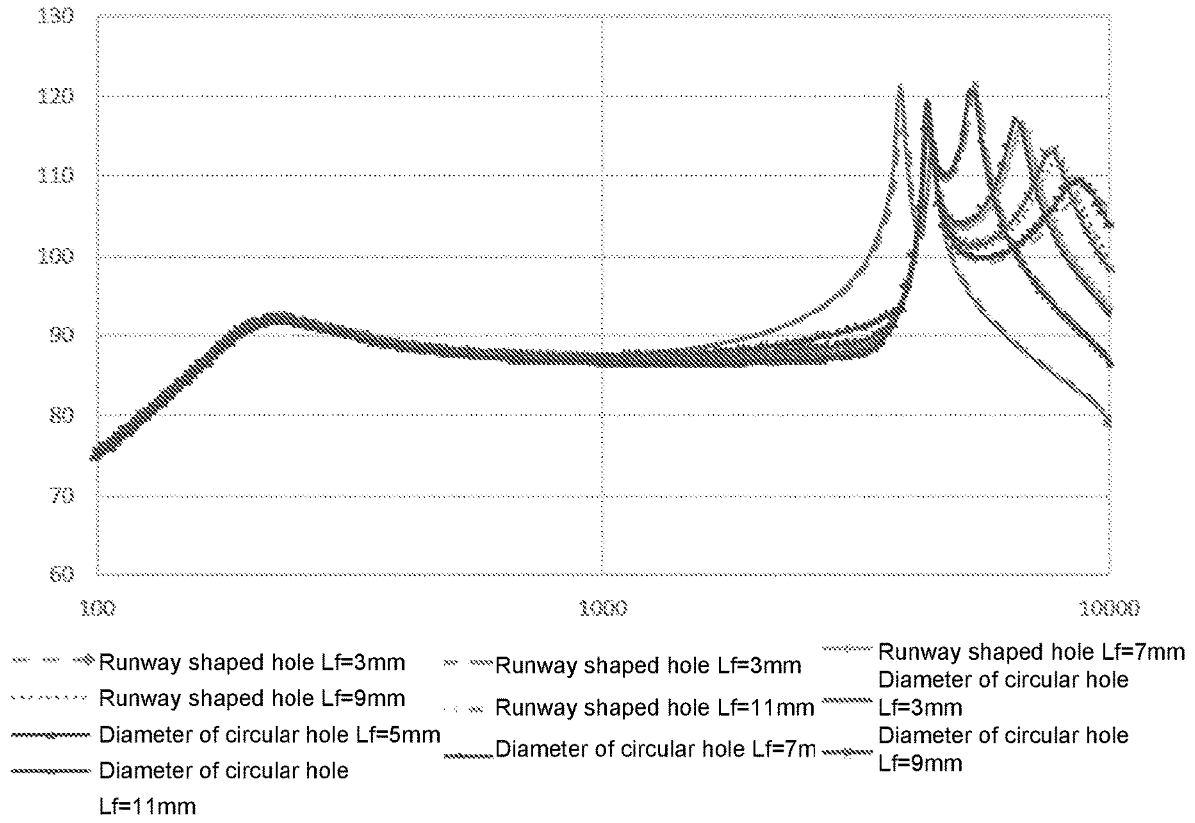
FIG. 20 is a graph illustrating frequency response curves corresponding to different lengths of a runway-shaped sound guiding hole and a circular sound guiding hole according to some embodiments of the present disclosure.

FIG. 20 is a graph illustrating frequency response curves corresponding to different lengths of a runway-shaped sound guiding hole and a circular sound guiding hole according to some embodiments of the present disclosure. The length of the circular sound guiding hole shown in FIG. 20 may refer to a diameter of a circle. According to FIG. 20, a trend of the frequency response curve corresponding to the circular sound guiding hole is similar to that of the runway-shaped sound guiding hole. Thus, to increase the range of the flat region of the frequency response curve and to take into account the structural design of the sound production component 11, the length of the circular sound guiding hole may be 2 mm to 17 mm. In some embodiments, the length of the circular sound guiding hole may be 3 mm to 16 mm. In some embodiments, the length of the circular sound guiding hole may be 5 mm to 13 mm. In some embodiments, the length of the circular sound guiding hole may be 6 mm to 9 mm. Referring to FIG. 20, when the lengths are the same, compared to the runway-shaped sound guiding hole, the frequency response curve of the circular sound guiding hole is shifted towards the lower frequency and the amplitude of a sound pressure corresponding to the circular sound guiding hole is slightly greater than a sound pressure corresponding to the runway-shaped sound guiding hole. In some embodiments, to make the open earphone 10 have a flat frequency response curve in a wide frequency range, the sound guiding hole may have a runway shape. In addition, the width of the runway-shaped sound guiding hole is narrower than that of the circular sound guiding hole, which is more convenient to design the appearance and structure of the sound production component 11.

Figure 21:
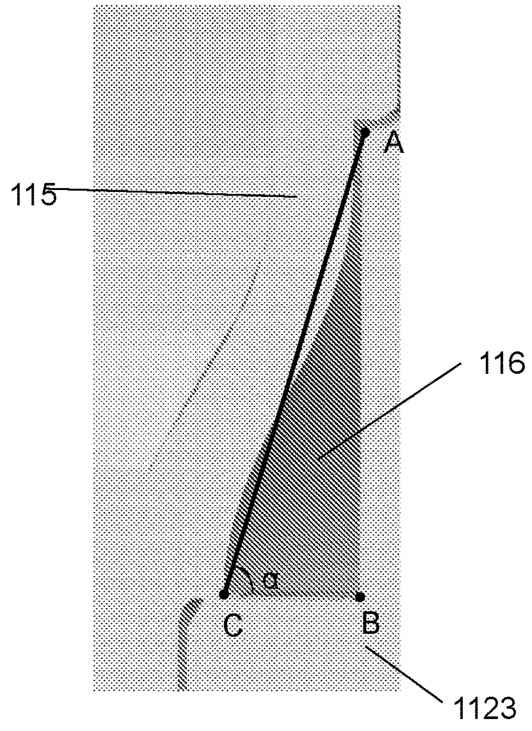
FIG. 21 is a structural diagram illustrating an exemplary part of a structure of a rear cavity according to some embodiments of the present disclosure.

FIG. 21 is a structural diagram illustrating an exemplary part of a structure of a rear cavity according to some embodiments of the present disclosure. Referring to FIG. 11 and FIG. 21, in some embodiments, a second acoustic cavity may be formed between the holder 115 and the transducer 112, and the second acoustic cavity may be the rear cavity 116.

In some embodiments, to improve the acoustic output performance of the open earphone 10, the frequency response curve of the rear cavity 116 needs to have a wide flat region. Thus a resonance frequency $f_2$ of the rear cavity 116 may be relatively large. In some embodiments, the resonance frequency $f_2$ of the rear cavity 116 may be in a range of 2 kHz to 8 kHz. In some embodiments, the resonance frequency $f_2$ of the rear cavity 116 may be in a range of 2 kHz to 6 kHz. In some embodiments, the resonance frequency $f_2$ of the rear cavity 116 may be in a range of 3 kHz to 5 kHz. In some embodiments, the resonance frequency $f_2$ of the rear cavity 116 may be 4.5 kHz. In some embodiments, to make the second leakage formed by the acoustic hole better cancel the first leakage formed by the sound guiding hole 111*a* in the far field, the resonance frequency $f_2$ of the rear cavity 116 may be close to or equal to the resonance frequency $f_1$ of the front cavity 114. In some embodiments, a difference between the resonance frequency $f_2$ of the rear cavity 116 and the resonance frequency $f_1$ of the front cavity 114 may be not greater than 2 kHz. In some embodiments, a difference between the resonance frequency f2 of the rear cavity 116 and the resonance frequency $f_1$ of the front cavity 114 may be not greater than 1 kHz. In some embodiments, a difference between the resonance frequency $f_1$ of the rear cavity 116 and the resonance frequency $f_1$ of the front cavity 114 may be not greater than 500 kHz. In some embodiments, a difference between the resonance frequency $f_2$ of the rear cavity 116 and the resonance frequency $f_1$ of the front cavity 114 may be not greater than 200 kHz.

In some embodiments, a combination of the rear cavity 116 and the acoustic holes (e.g., the first pressure relief hole 111*c* and/or the second pressure relief hole 111*d*) provided on the housing 111 may be considered as a Helmholtz resonance cavity model. The rear cavity 116 may serve as a cavity of the Helmholtz resonance cavity model and the acoustic hole may serve as a neck for the Helmholtz resonance cavity model. The resonance frequency of the Helmholtz resonance cavity model is the resonance frequency $f_2$ of the rear cavity 116, the opening area of the acoustic hole may be $S_2$, the volume of the rear cavity may be $V_2$, and the depth of the acoustic hole may be $L_2$. $S_2$ may relate to the opening areas of the first pressure relief hole 111*c* and the second pressure relief hole 111*d*, and $L_2$ may relate to the depths of the first pressure relief hole 111*c* and the second pressure relief hole 111*d*.

According to Equation (1), as the volume V of the rear cavity 116 decreases, the resonance frequency $f_2$ of the rear cavity 116 increases. To make the rear cavity 116 have a large resonance frequency $f_2$, the volume of the rear cavity 116 may be relatively small.

However, the volume of the rear cavity 116 also affects the sound capacity Ca of the rear cavity 116. A change in the sound capacity Ca of the rear cavity 116 leads to a change in a capacitive resistance property of the rear cavity 116, which affects a vibration property of the rear cavity 116. The relationship between the volume of the rear cavity 116 and the sound capacity Ca of the rear cavity 116 is shown in Equation (3):

$$C_a = \frac{V}{\rho c^2} \tag{3}$$

where ρ represents air density, c represents sound velocity, and V represents the volume of the rear cavity 116.

According to Equation (1) and Equation (3), when the volume V of the rear cavity 116 increases, the sound capacity Ca of the rear cavity 116 increases and the resonance frequency $f_2$ of the rear cavity 116 decreases. To make the resonance frequency $f_2$ of the rear cavity 116 relatively large, the volume and sound capacity of the rear cavity 116 may be relatively small, i.e., the volume V of the rear cavity 116 may be in a suitable range.

As shown in FIG. 21, in some embodiments, a cross-section of the rear cavity 116 may include two perpendicular sides and a curved edge. Connecting two end points of the curved edge, the cross-section may be approximated as a triangle (e.g., section ABC). A line connecting two end points formed by a contact between the curved surface formed on the support 115 and two straight edges may be a beveled edge AC, and the two straight edges AB and BC are formed by a cone holder 1123 of the transducer 112. The beveled edge AC and the straight edge BC form an angle α. In some embodiments, since the cone holder 1123 of the transducer 112 includes a sound transmission hole (not shown) in a region where the straight edge BC is located, and to ensure the acoustic performance, the length of the straight edge BC may be considered constant, and the volume of the rear cavity 116 may be adjusted by adjusting the length of the straight edge AB to adjust the angle α and thus adjusting the area of the triangle ABC. In some embodiments, the length of the straight edge BC is not less than 0.67 mm due to the limitation of the sound transmission hole. In some embodiments, the length of the straight edge BC may be not less than 0.7 mm. In some embodiments, since the angle α is in a restricted range, the volume V of the rear cavity 116 is in a restricted range.

Figure 22:
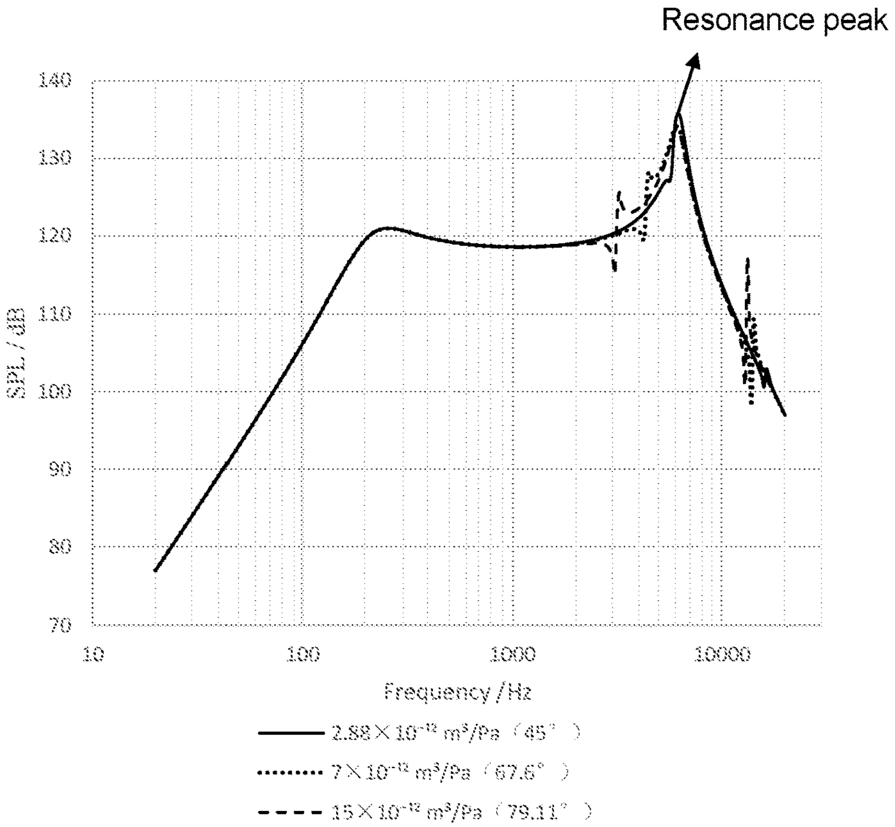
FIG. 22 is a graph illustrating frequency response curves of a rear cavity corresponding to different angles α according to some embodiments of the present disclosure.

FIG. 22 is a graph illustrating frequency response curves of a rear cavity corresponding to different angles α according to some embodiments of the present disclosure. As shown in FIG. 22, when the length of the straight edge AB is reduced such that the angle α is reduced from 67.6° to 45°, the volume V of the rear cavity 116 decreases, the sound capacity Ca of the rear cavity 116 decreases from 7×10−12 $m^3$/Pa to 2.88×10−12 $m^3$/Pa, and the resonance frequency $f_2$ of the rear cavity 116 increases from about 4.5 kHz to about 6 kHz. When the length of the straight edge AB is increased such that the angle α increases from 67.6° to 79.11°, the volume V of the rear cavity 116 increases, the sound capacity Ca of the rear cavity 116 increases from 7×10−12 $m^3$/Pa to 15×10−12 $m^3$/Pa, and the resonance frequency $f_2$ of the rear cavity 116 decreases from around 4.5 kHz to around 3 kHz. It should be noted that the parameters $7\times10-12$ $m^3$/Pa and $15\times10-12$ $m^3$/Pa shown in FIG. 22 only represent theoretical sound capacities corresponding to the volume of the rear cavity 116 and may be inaccurate in relation to the actual data. In some embodiments, to make the rear cavity 116 have a relatively large resonance frequency $f_2$, the angle $\alpha$ in the rear cavity 116 may be in a range of 45° to 80°. In some embodiments, the angle $\alpha$ in the rear cavity 116 may be in a range of 60° to 70°. In some embodiments, the angle $\alpha$ in the rear cavity 116 may be in a range of 67° to 68°.

In some embodiments, according to FIGS. 11 and 12 and the descriptions thereof, the third center of the sound guiding hole 111*a* is located on or near the mid-plumb plane of the line connecting the first center of the first pressure relief hole 111*c* and the second center of the second pressure relief hole 111*d*, with the sound guiding hole 111*a* being located on the side of the housing 111 near the second pressure relief hole 111*d* rather than in the middle in the Z-direction. Since the sound guiding hole 111*a* is disposed close to the external ear canal, the second pressure relief hole 111*d* is closer to the external ear canal and the first pressure relief hole 111*c* is farther away from the external ear canal. Compared to the first pressure relief hole 111*c*, the sound wave from the second pressure relief hole 111*d* is more likely to cancel the sound wave from the sound guiding hole 111*a* in the near field. Thus, the amplitude of the sound pressure at the second pressure relief hole 111*d* may be less than the amplitude of the sound pressure at the first pressure relief hole 111*c*, thereby increasing the listening volume at the ear canal. In some embodiments, the acoustic impedance of the second pressure relief hole 111*d* may be larger than the first pressure relief hole 111*c*. For example, a size of the second pressure relief hole 111*d* may be smaller than a size of the first pressure relief hole 111*c* such that the second pressure relief hole 111*d* may have a relatively larger acoustic impedance. For example, the area of the first pressure relief hole 111*c* may be larger than the area of the second pressure relief hole 111*d*.

Figure 23A:
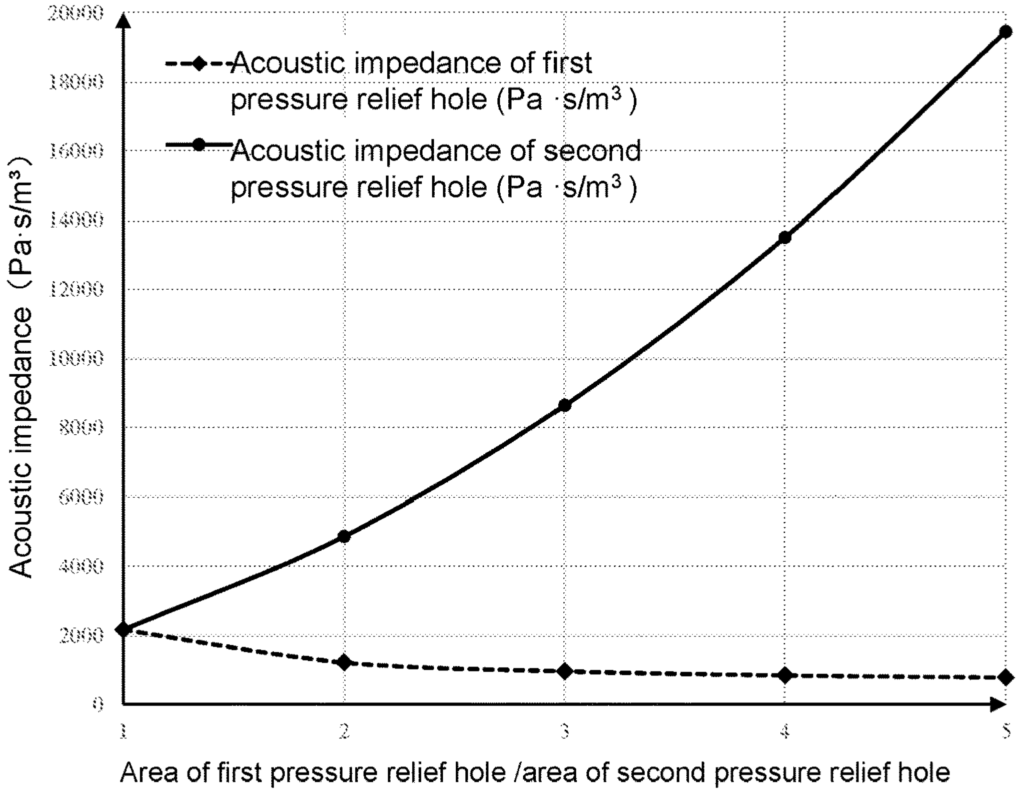
FIG. 23A is a schematic diagram illustrating acoustic impedances corresponding to different ratios of an area of a first pressure relief hole to an area of a second pressure relief hole according to some embodiments of the present disclosure.
Figure 23B:
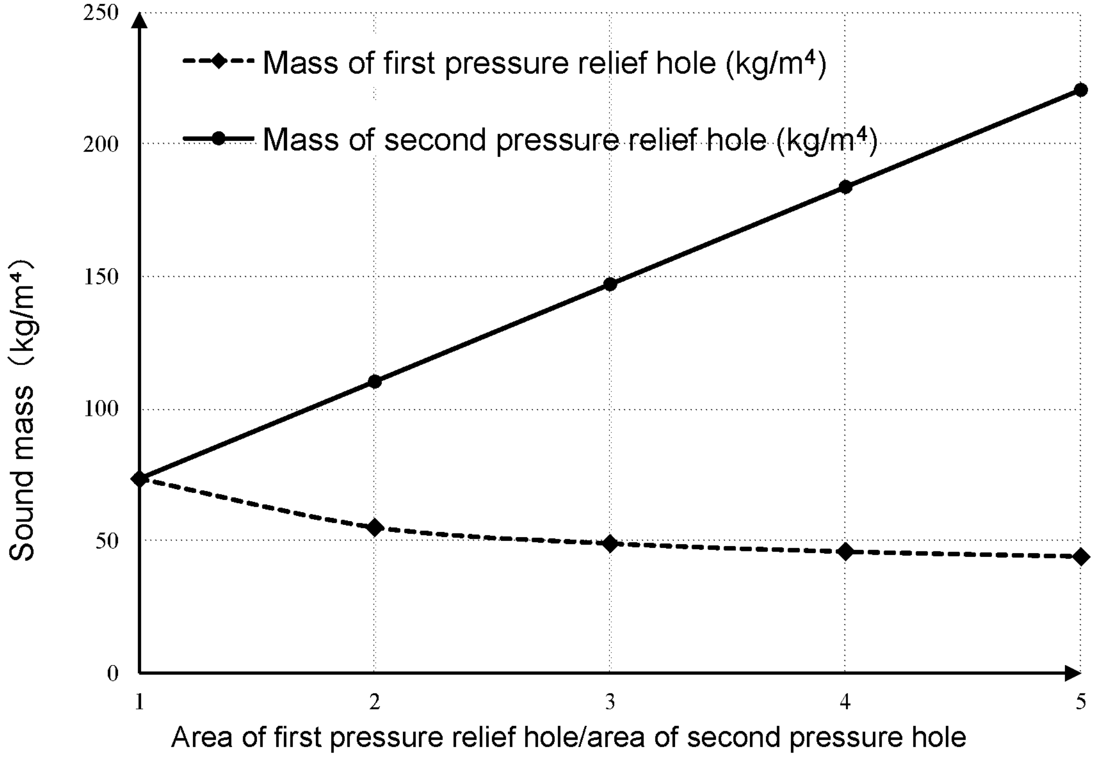
FIG. 23B is a schematic diagram illustrating sound mass corresponding to different ratios of an area of a first pressure relief hole to an area of a second pressure relief hole according to some embodiments of the present disclosure.
Figure 23C:
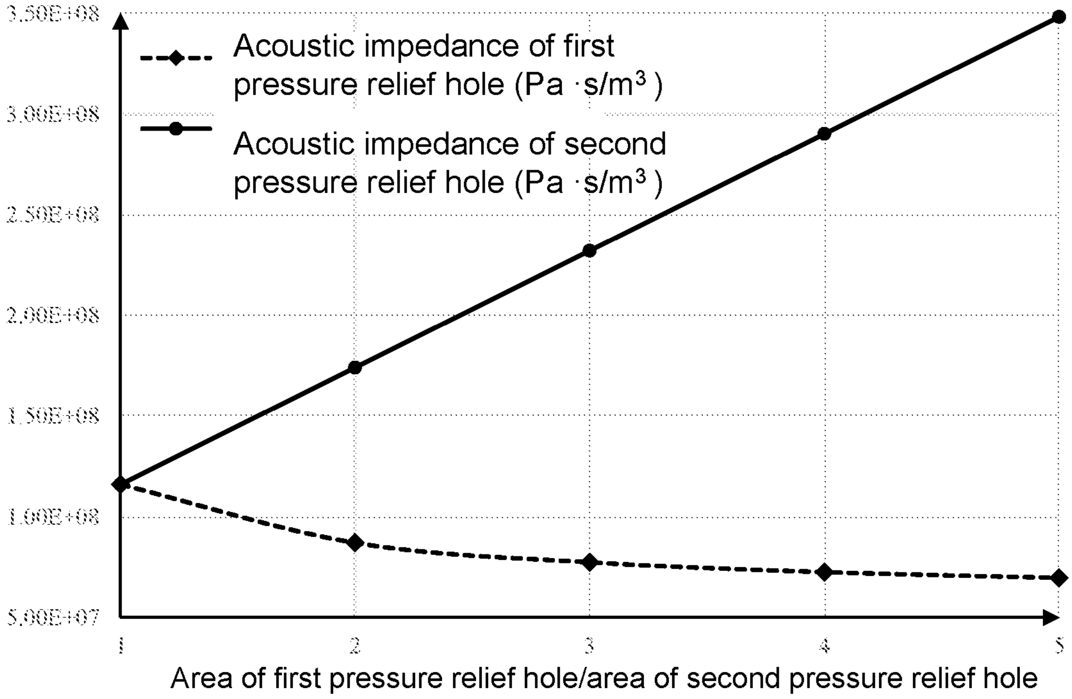
FIG. 23C is a schematic diagram illustrating radiation acoustic impedances corresponding to different ratios of an area of a first pressure relief hole to an area of a second pressure relief hole according to some embodiments of the present disclosure.
Figure 23D:
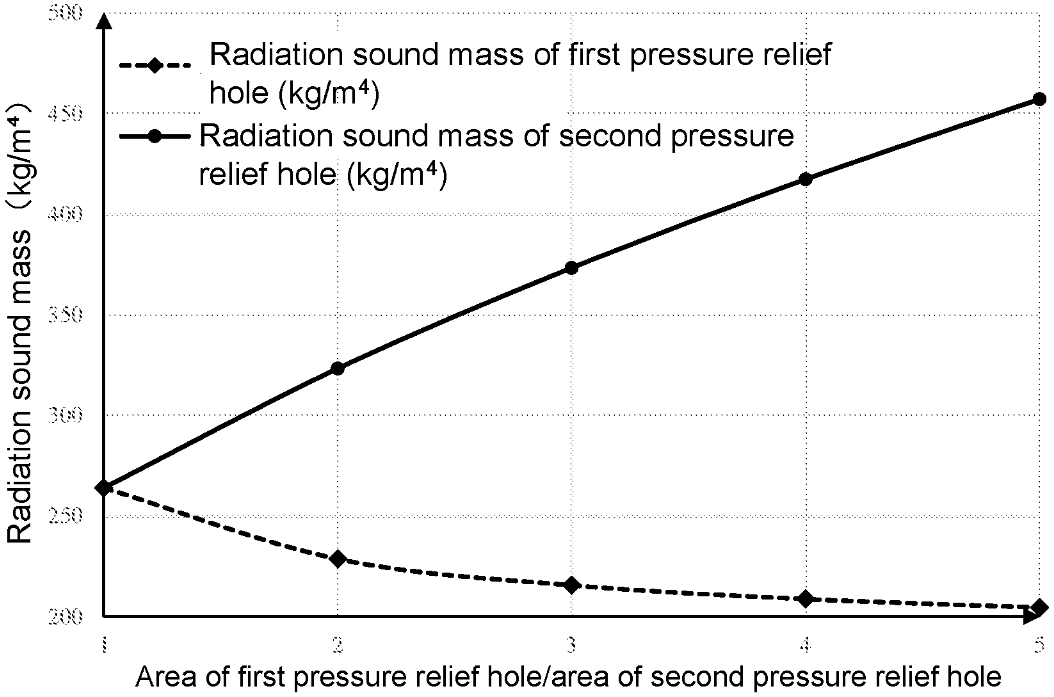
FIG. 23D is a schematic diagram illustrating radiation sound mass corresponding to different ratios of an area of a first pressure relief hole to an area of a second pressure relief hole according to some embodiments of the present disclosure.
Figure 24A:
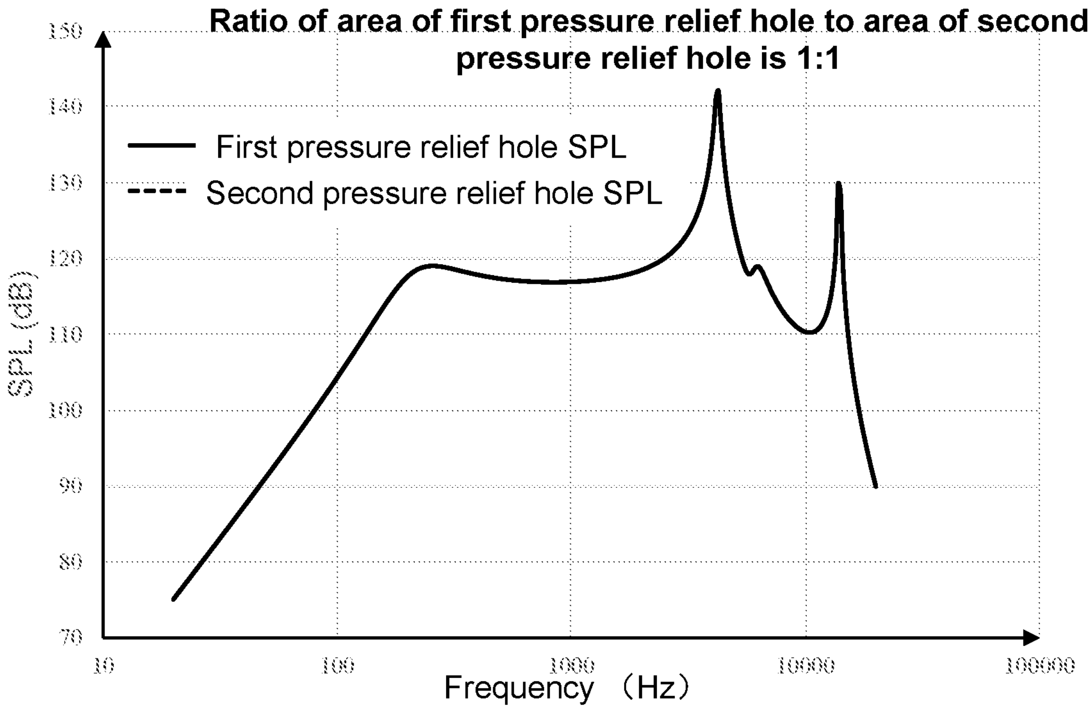
FIG. 24A-FIG. 24E are graphs illustrating frequency response curves of a rear cavity corresponding to different ratios of an area of a first pressure relief hole to an area of a second pressure relief hole according to some embodiments of the present disclosure.
Figure 24B:
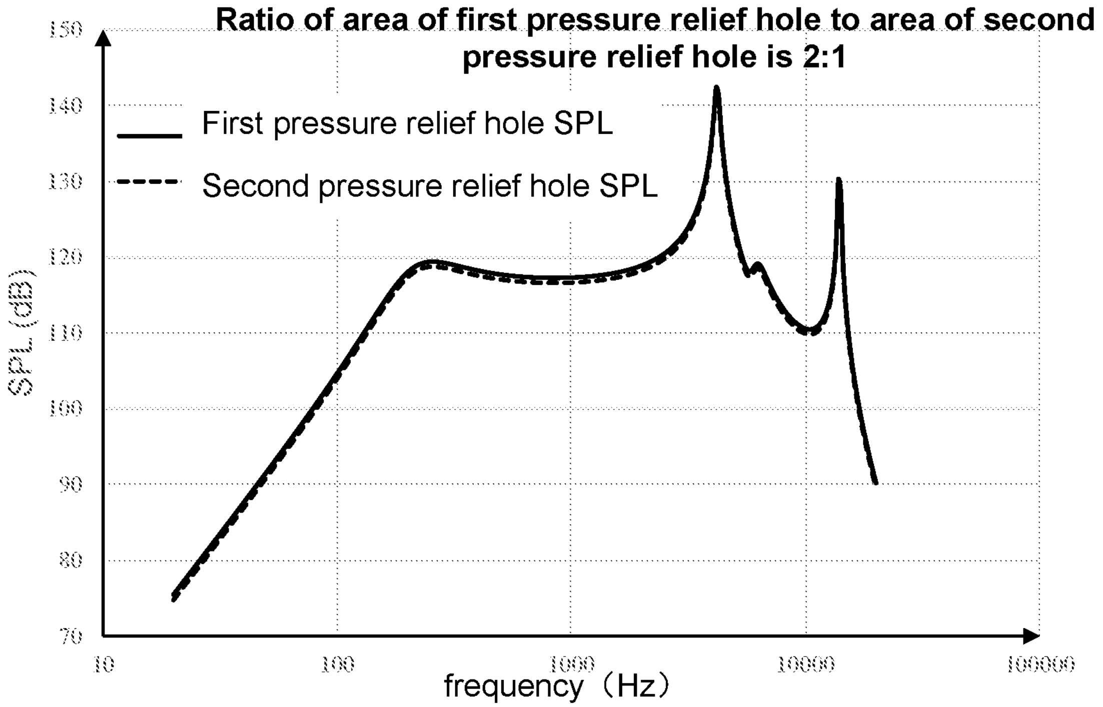
Figure 24C:
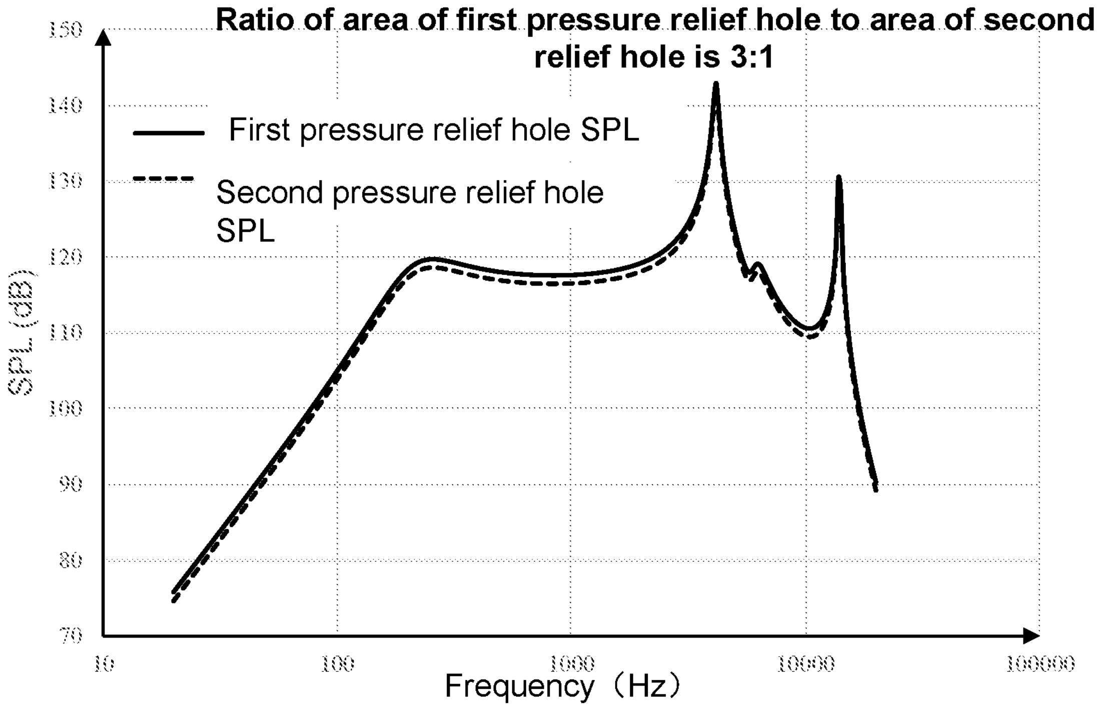
Figure 24D:
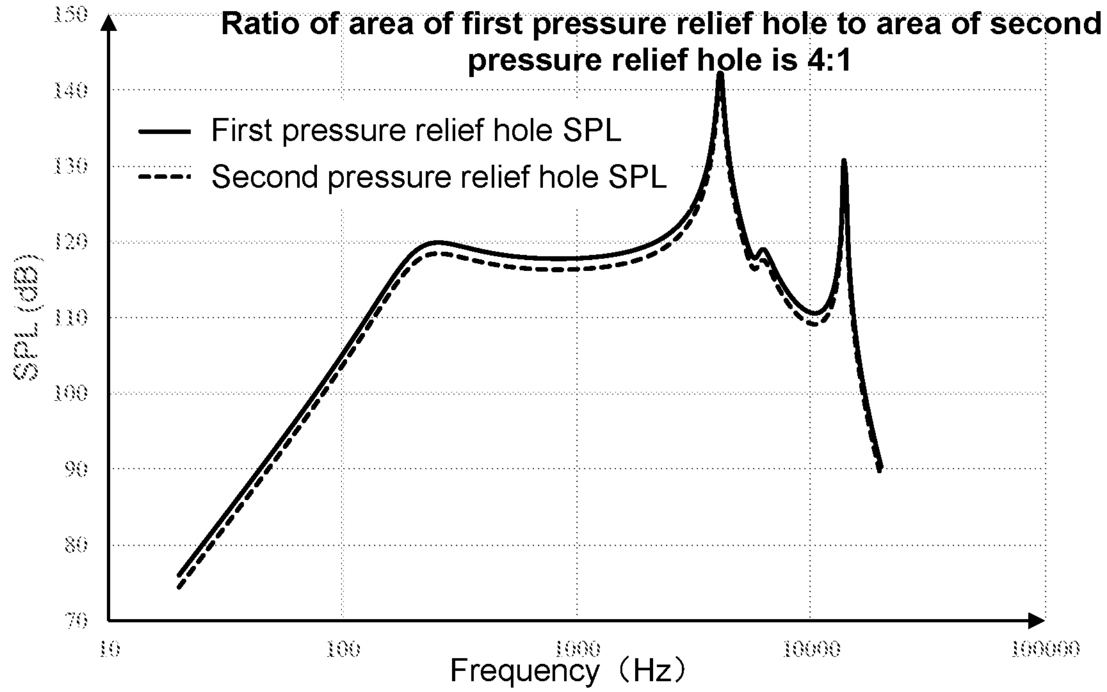
Figure 24E:
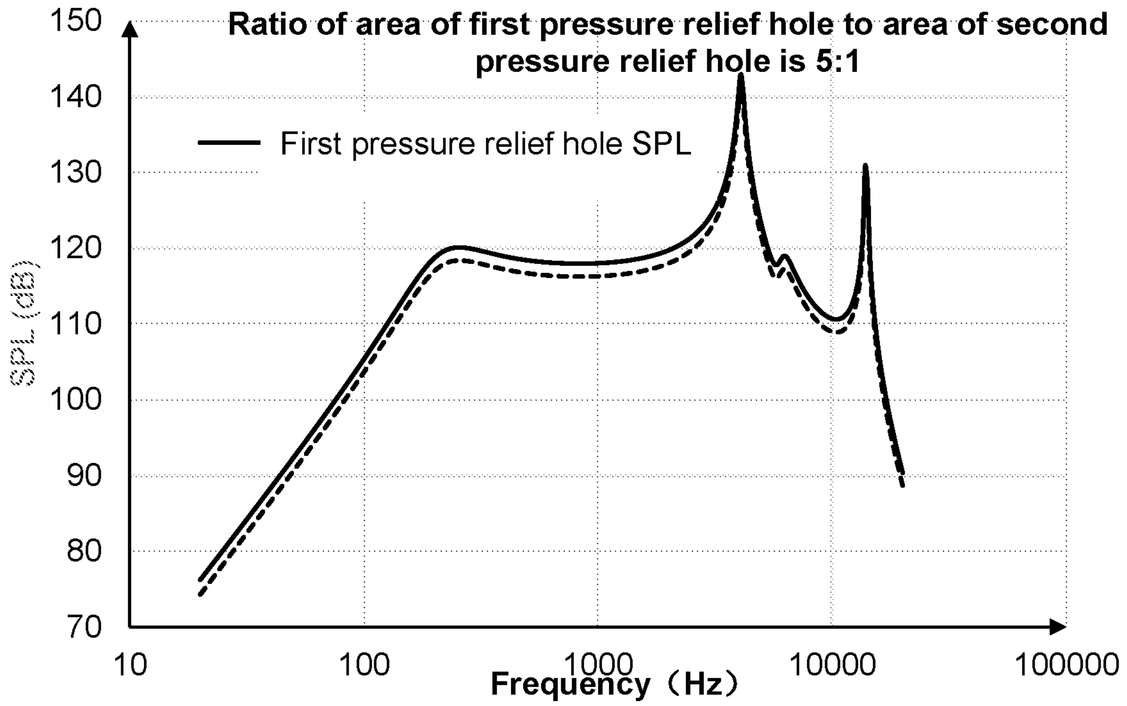

FIG. 23A is a schematic diagram illustrating acoustic impedances corresponding to different ratios of an area of the first pressure relief hole to an area of the second pressure relief hole according to some embodiments of the present disclosure, FIG. 23B is a schematic diagram illustrating sound mass corresponding to different ratios of an area of the first pressure relief hole to an area of the second pressure relief hole according to some embodiments of the present disclosure, FIG. 23C is a schematic diagram illustrating radiation acoustic impedances corresponding to different ratios of an area of the first pressure relief hole to an area of the second pressure relief hole according to some embodiments of the present disclosure, FIG. 23D is a schematic diagram illustrating radiation sound mass corresponding to different ratios of an area of the first pressure relief hole to an area of the second pressure relief hole according to some embodiments of the present disclosure, FIG. 24A-FIG. 24E are graphs illustrating frequency response curves of a rear cavity corresponding to different ratios of an area of the first pressure relief hole to an area of the second pressure relief hole according to some embodiments of the present disclosure. It should be noted that the acoustic impedance, the sound mass, the radiation acoustic impedance, and the radiation sound mass in FIG. 23A-FIG. 23D also varies with frequency, and the values shown in FIG. 23A-FIG. 23D are the acoustic impedance, sound mass, radiation acoustic impedance, and radiation sound mass at 1 kHz. In FIG. 23A-FIG. 23D and FIG. 24A-FIG. 24E, a ratio of the area of the first pressure relief hole 111*c* to the area of the second pressure relief hole 111*d* is changed, but a total area of the first pressure relief hole 111*c* and the second pressure relief hole 111*d* remains unchanged. The radiation acoustic impedance may refer to an impedance of the sound source (e.g., the first pressure relief hole 111*c* and/or the second pressure relief hole 111*d*) due to outward radiation of sound, and may be used to indicate a radiative property of the sound source. The radiation acoustic impedance may include a radiation impedance and a radiation resistance, wherein the radiation impedance increases a damping effect and energy consumption of the sound source when radiating sound, and the radiation resistance may be equivalent to adding of a radiation mass to a surface mass of the sound source, i.e., the radiation acoustic mass. In some embodiments, the greater the radiation acoustic impedance and/or the radiation acoustic mass, the greater a resistance overcome and/or the energy consumed by a source in radiating sound. In some embodiments, the radiation acoustic impedance and the radiation acoustic mass may be shown in Equation (5) and Equation (6):

$$Z = \frac{\rho c}{S} \tag{5}$$

$$M = \frac{0.56}{\sqrt{S}} \tag{6}$$

where Z represents the radiation acoustic impedance, p represents the air density, c represents the sound velocity, S represents an area corresponding to the sound source (e.g., the area of the first pressure relief hole 111*c* and/or the second pressure relief hole 111*d*), and M represents the radiation acoustic mass. According to Equation (5) and Equation (6), the radiation acoustic impedance and the radiation acoustic mass may be related (e.g., negatively) to the area corresponding to the sound source.

According to FIG. 23A-FIG. 23D, as the ratio of the area of the first pressure relief hole 111*c* to the area of the second pressure relief hole 111*d* gradually increases from 1 to 5, a total acoustic impedance (i.e. a sum of the acoustic impedance of the first pressure relief hole 111*c* and the acoustic impedance of the second pressure relief hole 111*d*), a total acoustic mass, a total radiation acoustic impedance, and a total radiation acoustic mass of the first pressure relief hole 111*c* and the second pressure relief hole 111*d* all gradually increase. The total acoustic impedance when the ratio of the area of the first pressure relief hole to the area of the second pressure relief hole 111*d* is 5 is much greater than the total acoustic impedance when the ratio is 2.

According to FIG. 24A-FIG. 24E, when the area of the first pressure relief hole 111*c* is larger than the area of the second pressure relief hole 111*d* (e.g., when the ratio of the area of the first pressure relief hole 111*c* to the area of the second pressure relief hole 111*d* is greater than 1), the amplitude of the sound pressure at the second pressure relief hole 111*d* is smaller than the amplitude of the sound pressure at the first pressure relief hole 111*c*. In addition, as the ratio of the area of the first pressure relief hole 111*c* to the second pressure relief hole 111*d* gradually increases from 1 to 5, the frequency response curve at the second pressure relief hole 111*d* gradually shifts downward and lies below the frequency response curve at the first pressure relief hole 111*c*, and a distance between the two curves gradually increases. That is, the difference between the amplitude of the sound pressure of the second pressure relief hole 111*d* and the amplitude of the sound pressure of the first pressure relief hole 111*c* gradually increases as the ratio of the area of the first pressure relief hole 111*c* to the area of the second pressure relief hole 111*d* increases. Thus, the range of the difference between the amplitude of the sound pressure of the second pressure relief hole 111*d* and the amplitude of the first pressure relief hole 111*c* may be adjusted by adjusting the ratio of the area of the first pressure relief hole 111*c* to the area of the second pressure relief hole 111*d*.

According to FIGS. 23A-24E, the area of the first pressure relief hole 111*c* may be set larger than the area of the second pressure relief hole 111*d*, such that the acoustic impedance at the second pressure relief hole 111*d* is larger than the acoustic impedance at the first pressure relief hole 111*c*, and the amplitude of the sound pressure at the second pressure relief hole 111*d* is smaller than the amplitude of the sound pressure at the first pressure relief hole 111*c*, which may reduce the sound leakage at the second pressure relief hole 111*d* and increase the listening volume at the ear canal. In some embodiments, when the difference between the acoustic impedance at the first pressure relief hole 111*c* and the acoustic impedance at the second pressure relief hole 111*d* is too large, the sound pressure at the second pressure relief hole 111*d* may be too small, which may affect the sound leakage reduction effect of sound waves propagating from the second pressure relief hole 111*d* in the far field. Further, when the difference between the acoustic impedance at the first pressure relief hole 111*c* and the acoustic impedance at the second pressure relief hole 111*d* is too large, it may be unfavorable to the destroy the standing waves in the rear cavity, which is not conducive to improving the resonance frequency of the sound exported from the two pressure relief holes to the exterior of the housing 111. Therefore, the ratio of the area of the first pressure relief hole 111*c* to the area of the second pressure relief hole 111*d* may not be too large. In some embodiments, to make the frequency response curve of the rear cavity 116 have a large range of flat region and improve the listening volume at the ear canal, the ratio of the area of the first pressure relief hole 111*c* to the area of the second pressure relief hole 111*d* may be less than 5. In some embodiments, the ratio of the area of the first pressure relief hole 111*c* to the area of the second pressure relief hole 111*d* may be in a range of 1 to 4. In some embodiments, the ratio of the area of the first pressure relief hole 111*c* to the area of the second pressure relief hole 111*d* may be in a range of 1 to 3. In some embodiments, the ratio of the area of the first pressure relief hole 111*c* to the area of the second pressure relief hole 111*d* may be in a range of 1.2 to 1.9. In some embodiments, the ratio of the area of the first pressure relief hole 111*c* to the area of the second pressure relief hole 111*d* may be in a range of 1.4 to 1.7.

In some embodiments, the area of the first pressure relief hole 111*c* may be equal to the area of the second pressure relief hole 111*d*. For example, as shown in FIG. 3, in the wearing state, the free end FE of the sound production component 11 may not protrude into the concha cavity. The ratio of the area of the first pressure relief hole 111*c* to the area of the second pressure relief hole 111*d* of the sound production component 11 may be 1.

In some embodiments, a shape of the pressure relief holes (e.g., the first pressure relief hole 111*c* and the second pressure relief hole 111*d*) may also have an impact on the sound quality of the pressure relief holes. On the other hand, the pressure relief hole with a narrow shape may have a higher acoustic impedance, which is not conducive to the acoustic output of the rear cavity 116. Therefore, a ratio of the long-axis dimension to the short-axis dimension of the pressure relief hole may be within a preset range. In some embodiments, the shape of the first pressure relief hole 111*c* and the second pressure relief hole 111*d* may include, but is not limited to, a circular, an oval, a runway shape, etc. In some embodiments, the first pressure relief hole 111*c* and the second pressure relief hole 111*d* may have a runway shape (as shown in FIG. 12), whereon two ends of the runway shape may be minor arced or semicircular. In this case, a long-axis dimension (i.e., a length of a cross-section) of the first pressure relief hole 111*c* and a long-axis dimension of the second pressure relief hole 111*d* may refer to dimensions of the first pressure relief hole 111*c* and the second pressure relief hole 111*d* in the Y-direction, and a short-axis dimension (i.e. a width of a cross-section) of the first pressure relief hole 111*c* and a short-axis dimension of the second pressure relief hole 111*d* may refer to dimensions of the first pressure relief hole 111*c* and the second pressure relief hole 111*d* in the Z-direction.

In some embodiments, the first pressure relief hole 111*c* and the second pressure relief hole 111*d* are in communication with the rear cavity 116. According to Equation (1), a too large volume of the rear cavity 116 is not conducive to increasing the resonance frequency of the rear cavity 116. And due to a limitation of a volume of the rear cavity 116, the width of the pressure relief hole may not be too large. In some embodiments, the width $W_m$ of the first pressure relief hole 111*c* may be in a range of 1 mm to 3 mm and the width $W_m$ of the second pressure relief hole 111*d* may be in a range of 1 mm to 3 mm.

Figure 25:
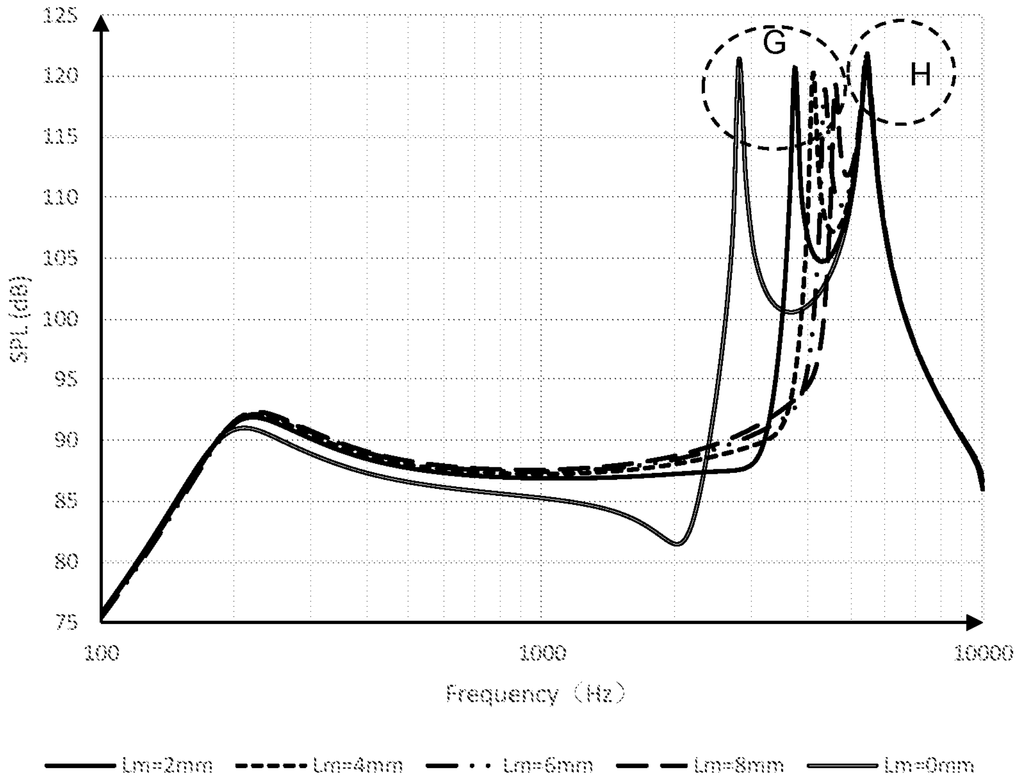
FIG. 25 is a graph illustrating frequency response curves of different lengths of a first pressure relief hole according to some embodiments of the present disclosure.

FIG. 25 is a graph illustrating frequency response curves of different lengths of a first pressure relief hole according to some embodiments of the present disclosure. As shown in FIG. 25, when the length $L_m$ of the first pressure relief hole 111*c* is 0 mm, indicating that the first pressure relief hole 111*c* is blocked, the first resonance peak of the frequency response curve corresponding to the sound production component 11 (as shown by the dashed coil G in FIG. 25) has a frequency around 3 kHz, a flat region of the frequency response curve has a relatively small range and the flat region (e.g., 300 Hz-2500 Hz) corresponds to a relatively small amplitude, and the second resonance peak (as shown in dashed coil H in FIG. 25) is around 5.5 kHz. The first resonance peak is generated by the resonance of the rear cavity 116 and the second resonance peak is generated by the resonance of the front cavity 114. When the length $L_m$ of the first pressure relief hole 111*c* is gradually increased from 2 mm to 8 mm, the first resonance peak gradually moves towards the high frequency, for example from around 3.8 kHz to around 4.7 kHz, while the position of the second resonance peak remains approximately unchanged.

In some embodiments, the resonance frequency f2 of the rear cavity 116 may have a relatively large value so that the frequency response curve has a relatively large range of flat region, which may improve the output performance of the open earphone 10. In some embodiments, the length $L_m$ of the first pressure relief hole 111*c* may be greater than 4 mm. When the length $L_m$ of the first pressure relief hole 111*c* increases to 8 mm, the resonance frequency of the frequency response curve moves slowly towards the high frequency and does not change significantly. In some embodiments, to improve the stability of the housing 111 and the waterproof and dustproof performances of the first pressure relief hole, the length $L_m$ of the first pressure relief hole 111*c* may be less than 8 mm. In some embodiments, the length $L_m$ of the first pressure relief hole 111*c* may be in a range of 4 mm to 8 mm. In some embodiments, the length $L_m$ of the first pressure relief hole 111*c* may be in a range of 5 mm to 7 mm. In some embodiments, the length $L_m$ of the first pressure relief hole 111*c* may be in a range of 5 mm to 6 mm. In some embodiments, by making the resonance frequency f2 of the rear cavity 116 (i.e., the frequency corresponding to the first resonance peak in FIG. 25) have a relatively large value, the resonance frequency $f_2$ of the rear cavity 116 may be close to the resonance frequency $f_1$ of the front cavity (i.e., the frequency corresponding to the second resonance peak in FIG. 25), which on the one hand achieves a better sound leakage reduction effect in the far field, and on the other hand avoids more peaks and valleys in the frequency response of the sound production component 11, thereby improving the sound output performance of the open earphone 10.

According to the above-mentioned ranges of the length $L_m$ and the width $W_m$ of the first pressure relief hole 111*c*, the ratio of the length $L_m$ to the width $W_m$ of the first pressure relief hole 111*c* may be determined such that the frequency response curve corresponding to the rear cavity 116 has a wide range of flat region, thereby improving the sound output performance of the open earphone 10. In some embodiments, the ratio of the length $L_m$ to the width $W_m$ of the first pressure relief hole 111*c* may be in a range of 1.3 to 8. In some embodiments, the ratio of the length $L_m$ to the width $W_m$ of the first pressure relief hole 111*c* may be in a range of 2 to 7. In some embodiments, the ratio of the length $L_m$ to the width $W_m$ of the first pressure relief hole 111*c* may be in a range of 3 to 6.

In some embodiments, a range of the opening area of the first pressure relief hole 111*c* may be determined based on the range of the length $L_m$ and the width $W_m$ of the first pressure relief hole 111*c*. In some embodiments, the opening area of the first pressure relief hole 111*c* may be in a range of 3.7 $mm^2$ to 23 $mm^2$. In some embodiments, the opening area of the first pressure relief hole 111*c* may be in a range of 4 $mm^2$ to 22 $mm^2$. In some embodiments, the opening area of the first pressure relief hole 111*c* may be in a range of 10 $mm^2$ to 20 $mm^2$.

Figure 26:
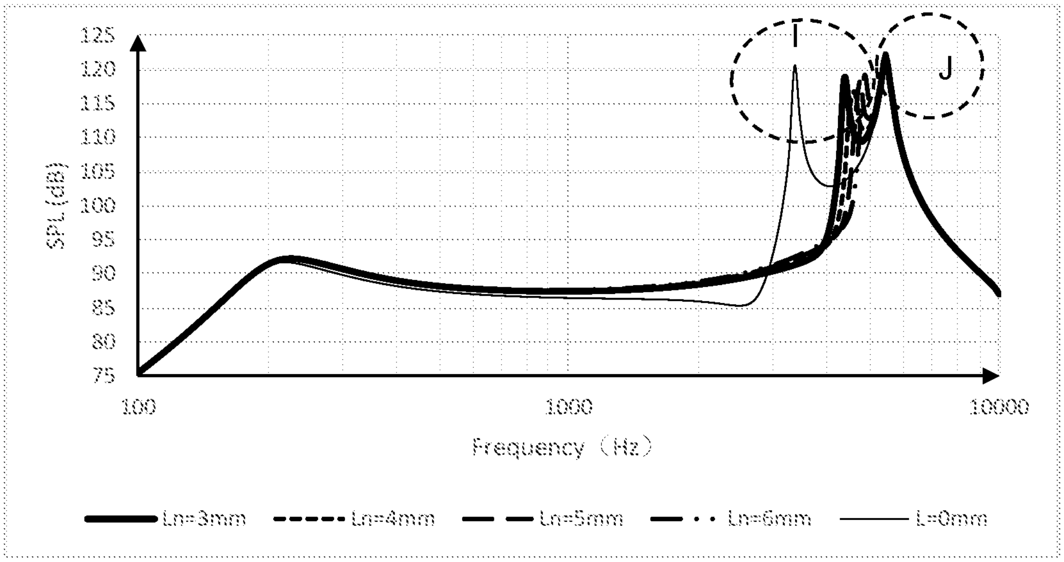
FIG. 26 is a graph illustrating frequency response curves of different lengths of a second pressure relief hole according to some embodiments of the present disclosure.

FIG. 26 is a graph illustrating frequency response curves of different lengths of a second pressure relief hole according to some embodiments of the present disclosure. As shown in FIG. 26, when the length $L_n$ of the second pressure relief hole 111*d* is 0 mm, indicating that the second pressure relief hole 111*d* is blocked, the first resonance peak of the frequency response curve corresponding to the sound production component 11 (as shown by dashed coil I in FIG. 26) has a frequency around 2.4 kHz, the flat region of the frequency response curve has a relatively small range and the flat region (e.g., 300 Hz-2500 Hz) corresponds to a relatively small amplitude, and the second resonance peak (as shown by dashed coil J in FIG. 26) is around 5.5 kHz. The first resonance peak is generated by the resonance of the rear cavity 116 and the second resonance peak is generated by the resonance of the front cavity 114. When the length $L_n$ of the second pressure relief hole 111*d* is gradually increased from 3 mm to 6 mm, the first resonance peak gradually moves towards the high frequency from around 4.4 kHz to around 4.9 kHz, while the position of the second resonance peak remains approximately unchanged.

To make the first resonant frequency have a relatively large value and the frequency response curve have a relatively large range of flat region, thereby improving the output performance of the open earphone 10, in some embodiments, the length $L_n$ of the second pressure relief hole 111*d* may be greater than 3 mm. When the length $L_n$ of the second pressure relief hole 111*d* is increased to 6 mm, the resonance frequency of the frequency response curve moves slowly towards the high frequency and does not change significantly. In some embodiments, to improve the stability of the housing 111 and the waterproof and dustproof performance of the second pressure relief hole, the length $L_n$ of the second pressure relief hole 111*d* may be less than 6 mm. In some embodiments, the length $L_n$ of the second pressure relief hole 111*d* may be in a range of 2 mm to 6 mm. In some embodiments, the length $L_n$ of the second pressure relief hole 111*d* may be in a range of 3 mm to 6 mm. In some embodiments, the length $L_n$ of the second pressure relief hole 111*d* may be in a range of 4 mm to 5 mm. In some embodiments, by making the resonance frequency $f_2$ of the rear cavity 116 (i.e., the frequency corresponding to the first resonance peak in FIG. 26) have a relatively large value, the resonance frequency $f_2$ of the rear cavity 116 may be close to the resonance frequency $f_1$ of the front cavity (i.e., the frequency corresponding to the second resonance peak in FIG. 26), which on the one hand achieves a better sound leakage reduction effect in the far field, and on the other hand avoids more peaks and valleys in the frequency response of the sound production component 11, thereby improving the sound output performance of the open earphone 10.

According to the above-mentioned ranges of the length $L_n$ and the width $W_n$ of the second pressure relief hole 111*d*, the ratio of the length $L_n$ to the width $W_n$ of the second pressure relief hole 111*d* may be determined such that the frequency response curve corresponding to the rear cavity 116 has a wide range of flat region, which may improve the sound output performance of the open earphone 10. In some embodiments, the ratio of the length $L_n$ to the width $W_n$ of the second pressure relief hole 111*d* may be in a range of 1 to 6. In some embodiments, the ratio of the length $L_n$ to the width $W_n$ of the second pressure relief hole 111*d* may be in a range of 2 to 5. In some embodiments, the ratio of the length $L_n$ to the width $W_n$ of the second pressure relief hole 111*d* may be in a range of 3 to 4.

In some embodiments, based on the range of the length $L_n$ and the width $W_n$ of the second pressure relief hole 111*d*, a range of the opening area of the second pressure relief hole 111*d* may be determined. In some embodiments, the opening area of the second pressure relief hole 111*d* may be in a range of 2.5 mm2 to 17 $mm^2$. In some embodiments, the opening area of the second pressure relief hole 111*d* may be in a range of 2 $mm^2$ to 16 $mm^2$. In some embodiments, the opening area of the second pressure relief hole 111*d* may be in a range of 4 $mm^2$ to 14 $mm^2$. In some embodiments, the opening area of the second pressure relief hole 111*d* may be in a range of 6 $mm^2$ to 10 $mm^2$.

In some embodiments, the ratio of the length $L_m$ to the width $W_m$ of the first pressure relief hole 111*c* may be greater than the ratio of the length $L_n$ to the width $W_n$ of the second pressure relief hole 111*d*. For example, when the width $W_m$ of the first pressure relief hole 111*c* is close to the width $W_n$ of the second pressure relief hole 111*d*, the ratio of the length L m to the width $W_m$ of the first pressure relief hole 111*c* may be greater than the ratio of the length $L_n$ to the width $W_n$ of the second pressure relief hole 111*d* such that the area of the first pressure relief hole 111*c* may be greater than the area of the second pressure relief hole 111*d*. In such cases, the first pressure relief hole 111*c* may have a relatively smaller acoustic impedance. Correspondingly, the amplitude of the sound pressure at the second pressure relief hole 111*d* may be less than the amplitude of the sound pressure at the first pressure relief hole 111*c*, which may reduce the sound leakage from the second pressure relief hole 111*d* and increase the listening volume at the ear canal.

In some embodiments, the ratio of the length $L_m$ to the width $W_m$ of the first pressure relief hole 111c may be less than the ratio between the length $L_n$ and the width $W_n$ of the second pressure relief hole 111d. For example, when the length $L_m$ of the first pressure relief hole 111c is close to the length $L_n$ of the second pressure relief hole 111d, the ratio of the length $L_m$ to the width $W_m$ of the first pressure relief hole 111c may be less than the ratio of the length $L_n$ to the width $W_n$ of the second pressure relief hole 111d such that the area of the first pressure relief hole 111c may be larger than the area of the second pressure relief hole 111d. In such cases, the first pressure relief hole 111c may have a relatively smaller acoustic impedance. Correspondingly, the amplitude of the sound pressure at the second pressure relief hole 111d may be less than the amplitude of the sound pressure at the first pressure relief hole 111c, which may reduce the sound leakage from the second pressure relief hole 111d and increase the listening volume at the ear canal.

In some embodiments, the ratio of the length $L_m$ to the width $W_m$ of the first pressure relief hole 111c may be equal to the ratio of the length $L_n$ to the width $W_n$ of the second pressure relief hole 111d. For example, as shown in FIG. 3, in the wearing state, the free end FE of the sound production component 11 may not protrude into the concha cavity. The ratio of the length $L_m$ to the width $W_m$ of the first pressure relief hole 111c of the sound production component 11 may be equal to the ratio of the length $L_n$ to the width $W_n$ of the second pressure relief hole 111d. Correspondingly, the acoustic impedance of the first pressure relief hole 111c may be equal to the acoustic impedance of the second pressure relief hole 111d.

In some embodiments, to make the second leakage formed by the acoustic hole better cancel the first leakage formed by the sound guiding hole 111a in the far field, the resonance frequency $f_2$ of the rear cavity 116 may be close to or equal to the resonance frequency $f_1$ of the front cavity 114. According to Equation (1), the ratio $$\frac{f_1}{f_2}$$

of the resonance frequency $f_1$ of the front cavity 114 to the resonance frequency $f_2$ of the rear cavity 116 is:

$$\frac{f_1}{f_2} = \frac{\frac{c}{2\pi}\sqrt{\frac{S_1}{V_1 L_1}}}{\frac{c}{2\pi}\sqrt{\frac{S_2}{V_2 L_2}}} = \sqrt{\frac{S_1}{V_1 L_1} \cdot \frac{V_2 L_2}{S_2}} = \sqrt{\frac{S_1}{S_2} \cdot \frac{V_2}{V_1} \cdot \frac{L_2}{L_1}} \tag{4}$$

According to Equation (4), the ratio of the resonance frequency $f_1$ of the front cavity 114 to the resonance frequency $f_2$ of the rear cavity 116 may be related to a ratio of the volume of the front cavity to the volume of the rear cavity, a ratio of the opening area of the sound guiding hole to the opening area of the acoustic hole, and a ratio of the depth of the sound guiding hole to the depth of the acoustic hole. A range of other parameters (e.g., the ratio of the volume of the front and rear cavities) may be set based on some of the parameters (e.g., the ratio of the opening area of the sound guiding hole to the opening area of the acoustic hole) such that the second leakage formed by the acoustic hole may better cancel the first leakage formed by the sound guiding hole 111a in the far field, thereby improving the output effect of the open earphone 10.

Figure 27:
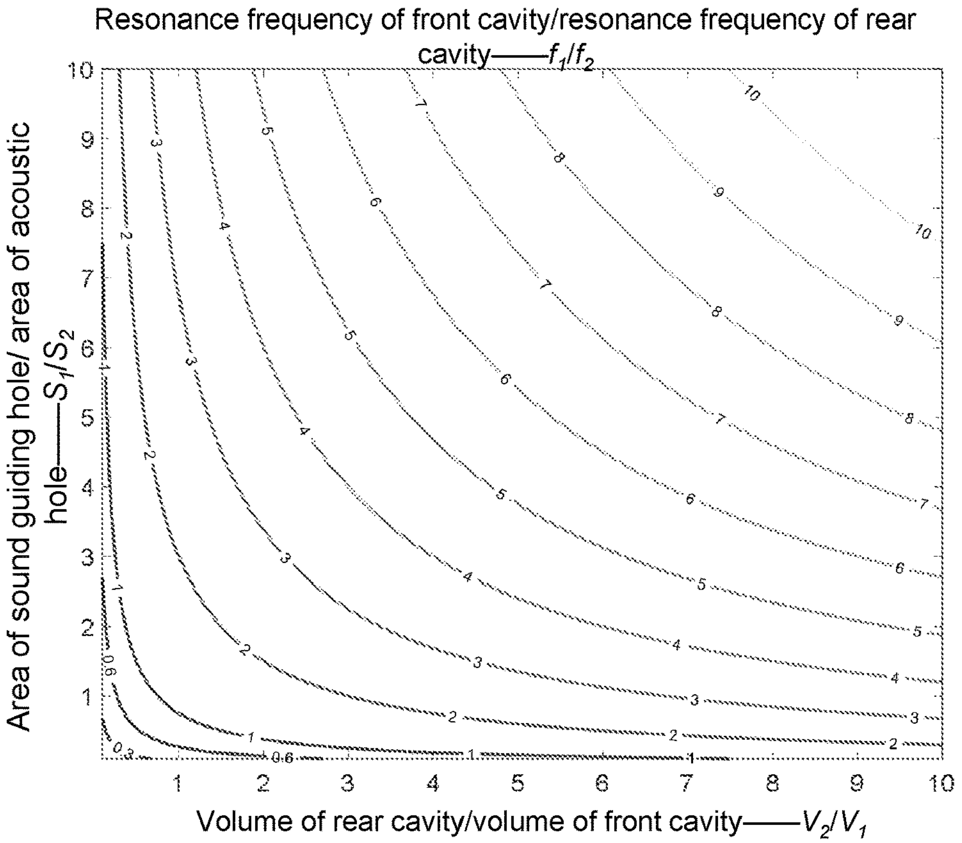
FIG. 27 is a contour diagram illustrating a ratio of a volume of a front cavity to a volume of a rear cavity and a ratio of an opening area of a sound guiding hole to an opening area of an acoustic hole according to some embodiments of the present disclosure.

FIG. 27 is a contour diagram illustrating a ratio of a volume of a front cavity to a volume of a rear cavity and a ratio of an opening area of a sound guiding hole to an opening area of an acoustic hole according to some embodiments of the present disclosure. In some embodiments, as shown in FIG. 27, a range of a ratio of a resonance frequency of the front cavity to a resonance frequency of a rear cavity may be related to the ratio of the opening area of the sound guiding hole to the opening area of the pressure relief hole and the ratio of the volume of the front cavity to the volume of the rear cavity. In such cases, the ratio of the opening area of the sound guiding hole to the opening area of the pressure relief hole and the ratio of the volume of the front cavity to the volume of the rear cavity may be set such that the ratio of the resonance frequency of the front cavity to a resonance frequency of a rear cavity is within a target range. For example, referring to FIG. 27, to make the ratio $f_1/f_2$ of the resonance frequency $f_1$ of the front cavity 114 to the resonance frequency $f_2$ of the rear cavity 116 in a range of 0.3 to 3, the opening area $S_1$ of the sound guiding hole 111a may be smaller than a total opening area of the first pressure relief hole 111c and the second pressure relief hole 111d. For example, the ratio $S_1/S_2$ of the opening area $S_1$ of the sound guiding hole 111a to the total opening area $S_2$ of the first pressure relief hole 111c and the second pressure relief hole 111d may be in a range of 0.1 to 0.99, and the ratio $V_2/V_1$ of the volume $V_2$ of the rear cavity 116 to the volume $V_1$ of the front cavity 114 may be in a range of 0.1 to 10. As another example, to make the ratio $f_1/f_2$ of the resonance frequency $f_1$ of the front cavity 114 to the resonance frequency $f_2$ of the rear cavity 116 in a range of 0.5 to 2, the ratio $S_1/S_2$ of the opening area $S_1$ of the sound guiding hole 111a to the total opening area $S_2$ of the first pressure relief hole 111c and the second pressure relief hole 111d may be in a range of 0.2 to 0.7, the ratio $V_2/V_1$ of the volume $V_2$ of the rear cavity 116 to the volume $V_1$ of the front cavity 114 may be in a range of 1 to 7.

In some embodiments, the opening area $S_1$ of the sound guiding hole 111a may be larger than the total opening area of the first pressure relief hole 111c and the second pressure relief hole 111d. For example, the ratio $S_1/S_2$ of the opening area $S_1$ of the sound guiding hole 111a to the total opening area $S_2$ of the first pressure relief hole 111c and the second pressure relief hole 111d may be in a range of 1 to 10, the ratio $V_2/V_1$ of the volume $V_2$ of the rear cavity 116 to the volume $V_1$ of the front cavity 114 may be in a range of 0.1 to 10, and according to FIG. 27, the resonance frequency of the front cavity 114 $f_1$ to the resonance frequency $f_2$ of the rear cavity 116 may be in a range of 0.5 to 10. As another example, the ratio $S_1/S_2$ of the opening area $S_1$ of the sound guiding hole 111a to the total opening area $S_2$ of the first pressure relief hole 111c and the second pressure relief hole 111d may be in a range of 3 to 9, the ratio $V_2/V_1$ of the volume $V_2$ of the rear cavity 116 to the volume $V_1$ of the front cavity 114 may be in a range of 2 to 6, and according to FIG. 27, the ratio $f_1/f_2$ of the resonance frequency f1 of the front cavity 114 to the resonance frequency $f_2$ of the rear cavity 116 may be in a range of 1 to 8.

In some embodiments, according to the contours shown in FIG. 27, a range of $S_1/S_2$ may be determined based on $V_2/V_1$, alternatively, a range of $V_2/V_1$ may be determined based on $S_1/S_2$ such that the resonance frequency $f_2$ of the rear cavity 116 may be close to or equal to the resonance frequency $f_1$ of the front cavity 114, which allows the second leakage formed by the acoustic hole to better cancel the first leakage formed by the sound guiding hole 111$a$ in the far field, thereby improving the output effect of the open earphone 10. For example, according to Equation (1), to make the rear cavity 116 have a sufficiently large resonance frequency $f_2$, the volume $V_2$ of the rear cavity 116 may be relatively small, e.g., $V_2/V_1$ may be less than 1. According to FIG. 27, to make the resonance frequency $f_2$ of the rear cavity 116 close to or equal to the resonance frequency $f_1$ of the front cavity 114 (e.g., the $f_1/f_2$ value is approximately 1), $S_1/S_2$ may be in a range of 1 to 2.5.

Merely by way of example, the volume $V_1$ of the front cavity 114 may be in a range of 190 $mm^3$ to 220 $mm^3$; the volume $V_2$ of the rear cavity 116 may be in a range of 60 $mm^3$ to 80 $mm^3$. Correspondingly, in some embodiments, the value of $V_2/V_1$ may be in a range of 0.2 to 0.4. In some embodiments, the value of $V_2/V_1$ may be in a range of 0.25 to 0.45.

In some embodiments, according to the relevant descriptions in FIG. 16-FIG. 26, the ratio $S_1/S_2$ of the opening area $S_1$ of the sound guiding hole 111$a$ to the total opening area $S_2$ of the first pressure relief hole 111$c$ and the second pressure relief hole 111$d$ may be adjusted such that the open earphone may have a better output effect. For example, the length $L_f$ of the sound guiding hole 111$a$ may be 3 mm to 11 mm, the ratio of the length $L_f$ to the width $W_f$ of the cross-section of the sound guiding hole 111$a$ is 2, and the area of the runway-shaped sound guiding hole 111$a$ may be 4.02 $mm^2$ to 54 $mm^2$. The length $L_m$ of the first pressure relief hole 111$c$ may be 6 mm, the width $W_m$ may be 1.5 mm, and the opening area of the first pressure relief hole 111$c$ may be 8.51 $mm^2$; and the length $L_n$ of the second pressure relief hole 111$d$ may be 3 mm, the width $W_n$ may be 1.5 mm, and the opening area of the second pressure relief hole 111$d$ may be 4.02 $mm^2$. The ratio $S_1/S_2$ of the opening area $S_1$ of the sound guiding hole a to the total opening area $S_2$ of the first pressure relief hole 111$c$ and the second pressure relief hole 111$d$ may be 0.32 to 4.31. As another example, the length $L_m$ of the first pressure relief hole 111$c$ may be 2 mm to 8 mm, the width $W_m$ may be 1.5 mm, and the area of the first pressure relief hole 111$c$ may be 2.517 $mm^2$ to 11.5171 $mm^2$; and the length $L_n$ of the second pressure relief hole 111$d$ may be 3 mm to 6 mm, the width $W_n$ may be 1.5 mm, and the opening area of the second pressure relief hole 111$d$ may be 4.017 $mm^2$ to 8.5171 $mm^2$. The length $L_f$ of the sound guiding hole 111$a$ may be 5 mm, the width $W_f$ may be 2.5 mm, and the opening area $S_1$ may be 11.16 $mm^2$. Thus, the ratio of the opening area $S_1$ of the sound guiding hole to the total opening area $S_2$ of the first pressure relief hole 111$c$ and the second pressure relief hole 111$d$ may be 0.56 to 1.71.

According to FIG. 27, when $V_2/V_1$ is in a range of 0.25 to 0.45 and $S_1/S_2$ is in a range of 0.32 to 4.31, $f_1/f_2$ may be in a range of 0.5 to 1.5; when $V_2/V_1$ is in a range of 0.25 to 0.45 and $S_1/S_2$ is in a range of 0.56-1.71, $f_1/f_2$ may be in a range of 0.5 to 0.9. In such cases, the ratio of the volumes and/or the ratio of the opening areas may be determined based on the aforementioned ranges such that the resonance frequency $f_2$ of the rear cavity 116 may be close to or equal to the resonance frequency $f_1$ of the front cavity 114.

Figure 28:
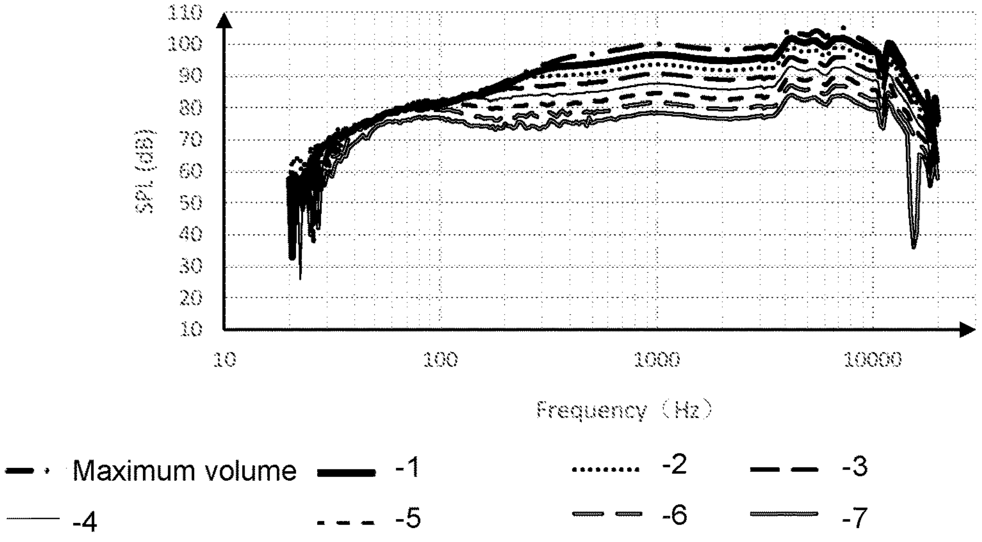
FIG. 28 is a graph illustrating frequency response curves corresponding to different volume levels of a sound guiding hole according to some embodiments of the present disclosure.
Figure 29:
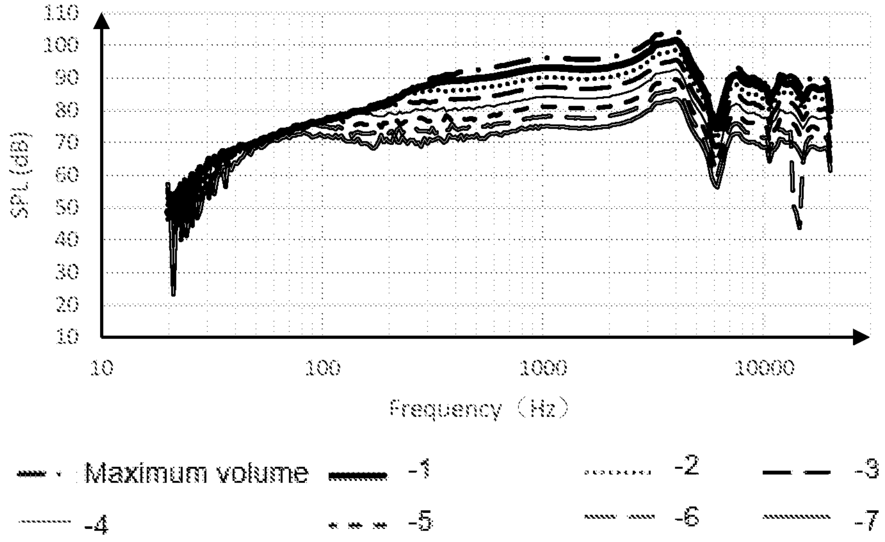
FIG. 29 is a graph illustrating frequency response curves corresponding to different volume levels of a first pressure relief hole according to some embodiments of the present disclosure.
Figure 30:
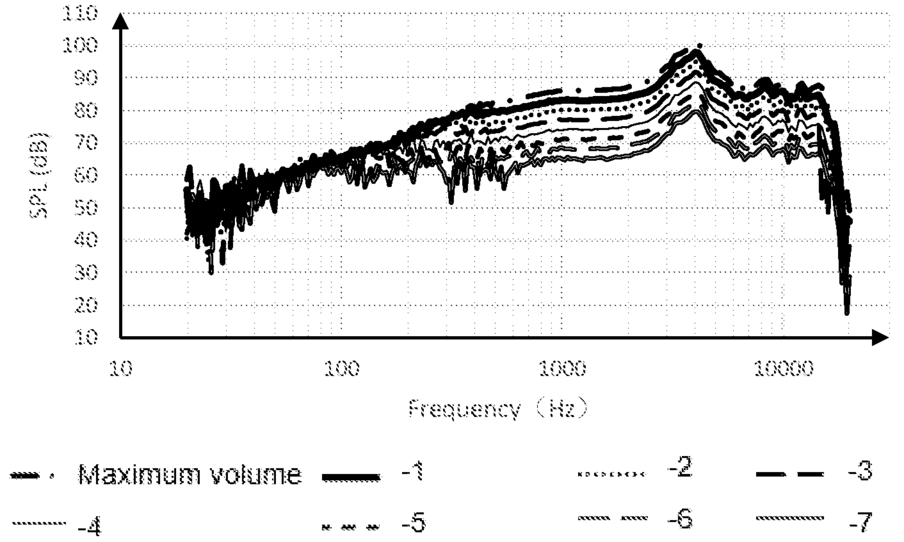
FIG. 30 is a graph illustrating frequency response curves corresponding to different volume levels of a second pressure relief hole according to some embodiments of the present disclosure.

FIG. 28 is a graph illustrating frequency response curves corresponding to different volume levels of a sound guiding hole according to some embodiments of the present disclosure; FIG. 29 is a graph illustrating frequency response curves corresponding to different volume levels of a first pressure relief hole according to some embodiments of the present disclosure; FIG. 30 is a graph illustrating frequency response curves corresponding to different volume levels of a second pressure relief hole according to some embodiments of the present disclosure. As shown in FIG. 28-FIG. 30, the sound pressure at the sound guiding hole 111$a$, the sound pressure at the first pressure relief hole 111$c$, and the sound pressure at the second pressure relief hole 111$d$ all gradually decrease as the volume level gradually decreases from a maximum volume.

It should be noted that the sound pressure at the sound guiding hole 111$a$, the sound pressure at the first pressure relief hole 111$c$, and the sound pressure at the second pressure relief hole 111$d$ refers to the sound pressures at a distance of 4 mm from the sound guiding hole 111$a$, at a distance of 4 mm from the first pressure relief hole 111$c$, and at a distance of 4 mm from the second pressure relief hole 111$d$, respectively. The sound pressure of each hole is measured without blocking other holes. For example, the first pressure relief hole 111$c$ and the second pressure relief hole 111$d$ are not obscured or blocked when measuring the sound pressure at the sound guiding hole 111$a$.

In some embodiments, according to FIGS. 8-FIG. 10 and the descriptions thereof, by providing a cavity-like structure, the sound wave generated by the pressure relief hole (the first pressure relief hole 111$c$ or second pressure relief hole 111$d$) may cancel the sound leakage generated by the sound guiding hole 111$a$ in the far field, which may reduce the sound leakage in the far field, and the sound wave emitted from the pressure relief hole has less impact on listening sound in the near field. In such cases, in some embodiments, the amplitude of the sound pressure at the pressure relief hole (the first pressure relief hole 111$c$ or second pressure relief hole 111$d$) may be close to the amplitude of the sound pressure at the sound guiding hole 111$a$ such that sound leakage in the far field may be effectively reduced without affecting the listening sound in the near field. In some embodiments, to effectively reduce the sound leakage in the far field, the ratio of the sound pressure at the sound guiding hole 111$a$ to the sound pressure at the first pressure relief hole 111$c$ may be in a range of 0.8 to 1.2 in a particular frequency range (e.g., in a range of 3.5 kHz to 4.5 kHz). In some embodiments, the ratio of the sound pressure at the sound guiding hole 111$a$ to the sound pressure at the first pressure relief hole 111$c$ may be in a range of 0.9 to 1.1. In some embodiments, the ratio of the sound pressure at the sound guiding hole 111$a$ to the sound pressure at the first pressure relief hole 111$c$ may be in a range of 0.95 to 1.05. In some embodiments, to effectively reduce the sound leakage in the far field, the ratio of the sound pressure at the sound guiding hole 111$a$ to the sound pressure at the second pressure relief hole 111$d$ may be in a range of 0.8 to 1.2. In some embodiments, the ratio of the sound pressure at the sound guiding hole 111$a$ to the sound pressure at the second pressure relief hole 111$d$ may be in a range of 0.9 to 1.1. In some embodiments, the ratio of the sound pressure at the sound guiding hole 111$a$ to the sound pressure at the second pressure relief hole 111$d$ may be in a range of 0.95 to 1.05. In some embodiments, to effectively reduce the sound leakage in the far field, a ratio of the sound pressure at the sound guiding hole 111$a$ to a total sound pressure at the first pressure relief hole 111$c$ and the second pressure relief hole 111$d$ may be in a range of 0.4 to 0.6. In some embodiments, the ratio of the sound pressure at the sound guiding hole 111$a$ to the total sound pressure at the first pressure relief hole 111$c$ and the second pressure relief hole 111$d$ may be in a range of 0.45 to 0.55. It should be noted that the sound pressure at the sound guiding hole 111$a$, and the sound pressure at the first pressure relief hole 111$c$, and the sound pressure at the second pressure relief hole 111$d$ refer to sound pressures of the sound guiding hole 111$a$, the first pressure relief hole 111*c*, and the second pressure relief hole 111*d*, respectively at a corresponding frequency at the same volume level.

According to FIGS. 28-30, at the maximum volume and at 4000 Hz, the sound pressure is 103.54 dB, 104.5 dB for the first pressure relief hole 111*c*, and 100.74 dB for the second pressure relief hole 111*d*. In this case, the sound pressure at the sound guiding hole 111*a* is close to the sound pressure at the first pressure relief hole 111*c* and the sound pressure at the second pressure relief hole 111*d*, respectively, thereby effectively reducing the sound leakage in the far field.

Referring to FIGS. 11 and 12, in some embodiments, an inner side of the housing 111 may be provided with one or more recessed regions 1119, and the first pressure relief hole 111*c* and/or the second pressure relief hole 111*d* and/or the sound guiding hole 111*a* may be provided at the bottom of the recessed region 1119, respectively. In some embodiments, an acoustic resistance net 118 may be provided within the recessed region 1119. The acoustic resistance net 118 disposed in the front cavity 114 (i.e., at the recessed region 1119 corresponding to the sound guiding hole 111*a*) may be used to adjust an amplitude of a resonance peak in the front cavity 114, and the acoustic resistance net 118 installed in the rear cavity 116 (i.e., at the recessed region 1119 corresponding to the first pressure relief hole 111*c* and the second pressure relief hole 111*d*) may be used to adjust an amplitude of a resonance peak in the rear cavity 116. In some embodiments, the acoustic resistance net 118 may have a waterproof and dustproof effect r. For the acoustic resistance net 118 disposed in the rear cavity 116, the holder 115 may hold the acoustic resistance net 118 on the bottom of the recessed region 1119, which not only prevents the holder 115 from scratching the acoustic resistance net 118 during the assembly process, but also reduces an assembly gap between the holder 115, the acoustic resistance net 118, and the housing 111 to prevent shaking of the acoustic resistance net 118. In some embodiments, the acoustic resistance net 118 may include a gauze mesh, a steel mesh, or a combination thereof. In some embodiments, the acoustic resistance net 118 may be pre-fixed to the bottom of the recessed region 1119 by means such as gluing. In some embodiments, the acoustic resistance net 118 provided in the front cavity 114 may have a same acoustic impedance rate as the acoustic resistance net 118 provided in the rear cavity 116, i.e., the acoustic resistance net 118 provided at the sound guiding hole 111*a* may have the same acoustic impedance rate as the acoustic resistance net 118 provided at at least two pressure relief holes (e.g., the first pressure relief hole 111*c* and the second pressure relief hole 111*d*). For example, to facilitate structural assembly (e.g., to reduce material types and/or avoid mixing) and to increase consistency of appearance, the same acoustic resistance net 118 may be provided at the sound guiding hole 111*a* and the at least two pressure relief holes. In some embodiments, the acoustic impedance rate of the acoustic resistance net 118 provided in the front cavity 114 may differ from the acoustic impedance rate of the acoustic resistance net 118 provided in the rear cavity 116. That is, the acoustic impedance rate of the acoustic resistance net 118 provided at the sound guiding hole 111*a* may differ from the acoustic impedance rate of the acoustic resistance net 118 provided at at least two pressure relief holes (e.g., the first pressure relief hole 111*c* and the second pressure relief hole 111*d*). For example, a preset output effect may be achieved by setting the acoustic resistance net 118 at the front cavity 114 and the rear cavity 116 with different acoustic impedance rates based on other parameters (e.g., the areas (or ratio of areas) of the sound guiding hole 111*a* and/or the pressure relief hole, the depth of each hole, the ratio of length to width, etc.) of the front cavity 114 and the rear cavity 116. For example, by setting the acoustic resistance nets 118 with different acoustic impedance rates, the sound pressure at the sound guiding hole 111*a* and the sound pressure at the pressure relief hole may be close to each other, which may reduce the sound leakage in the far field effectively).

In some embodiments, different acoustic resistance nets 118 may have different thicknesses. In some embodiments, the acoustic resistance net 118 may have a thickness to maintain structural stability between the acoustic resistance net 118 and the sound production component 11. When the thickness of the acoustic resistance net 118 is too large, the acoustic resistance is relatively large and the acoustic output performance of the corresponding acoustic holes (e.g., the sound guiding hole 111*a*, the first pressure relief hole 111*c*, and the second pressure relief hole 111*d*) is affected to a relatively great extent. Therefore, the thickness of the acoustic resistance net 118 may be within a certain range. Taking the rear cavity 116 as an example, in some embodiments, the thickness of the acoustic resistance net 118 provided at the first pressure relief hole 111*c* and at the second pressure relief hole 111*d* may be in a range of 35 μm to 300 μm. In some embodiments, the thickness of the acoustic resistance net 118 provided at the first pressure relief hole 111*c* and at the second pressure relief hole 111*d* may be in a range of 40 μm to 150 μm. In some embodiments, the thickness of the acoustic resistance net 118 provided at the first pressure relief hole 111*c* and at the second pressure relief hole 111*d* may be in a range of 50 μm to 65 μm. In some embodiments, the thickness of the acoustic resistance net 118 provided at the first pressure relief hole 111*c* and at the second pressure relief hole 111*d* may be in a range of 55 μm to 62 μm. In some embodiments, a distance between an upper surface of the acoustic resistance net 118 provided at the first pressure relief hole 111*c* and an outer surface of the housing 1111 may be 0.8 mm to 0.9 mm, and a distance between the upper surface of the acoustic resistance net 118 provided at the second pressure relief hole 111*d* and the outer surface of the housing 1111 may be 0.7 mm to 0.8 mm. In some embodiments, the distance between the upper surface of the acoustic resistance net 118 provided at the first pressure relief hole 111*c* and the outer surface of the housing 1111 may be 0.82 mm to 0.88 mm, and the distance between the upper surface of the acoustic resistance net 118 provided at the second pressure relief hole 111*d* and the outer surface of the housing 1111 may be 0.72 mm to 0.76 mm. In some embodiments, the distance between the upper surface of the acoustic resistance net 118 provided at the first pressure relief hole 111*c* and the outer surface of the housing 1111 may be 0.86 mm, and the distance between the upper surface of the acoustic resistance net 118 provided at the second pressure relief hole 111*d* and the outer surface of the housing 1111 may be 0.73 mm. In some embodiments, different types of acoustic resistance nets 118 may have different mesh densities, resulting in different acoustic resistances of the corresponding acoustic holes, which may influence the output of the corresponding acoustic cavities. Therefore, it is desirable to design the composition and type of the acoustic resistance net 118.

Figure 31A:
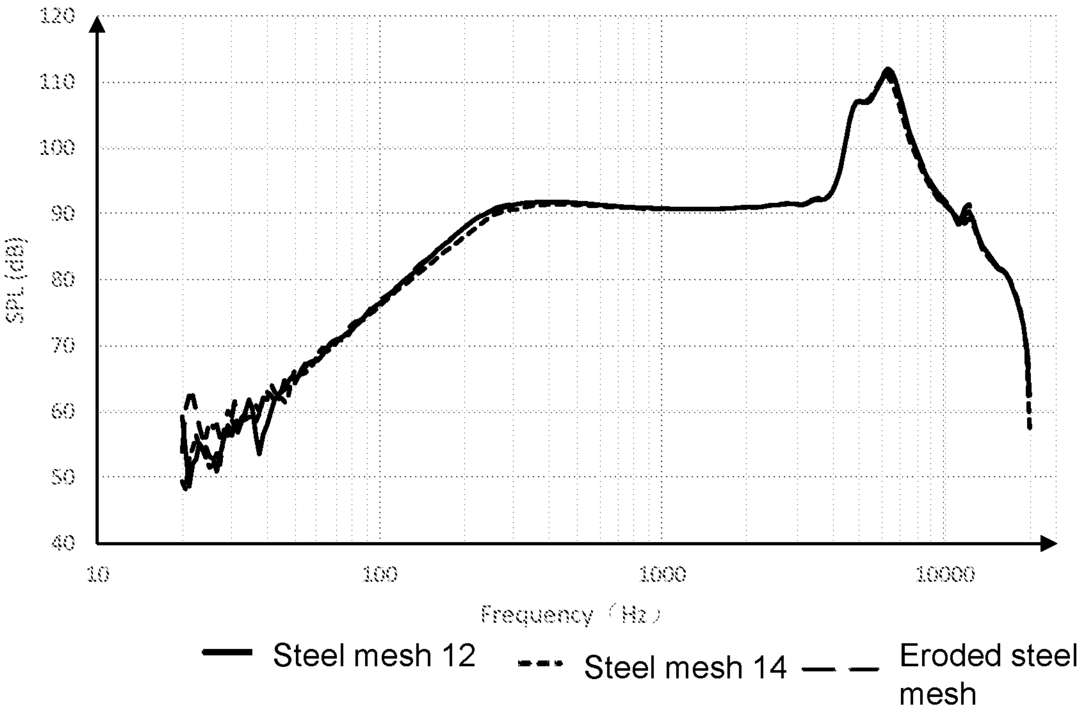
FIG. 31A-FIG. 31F are graphs illustrating frequency response curves corresponding to different acoustic resistance nets at a front cavity and a rear cavity respectively according to some embodiments of the present disclosure.
Figure 31B:
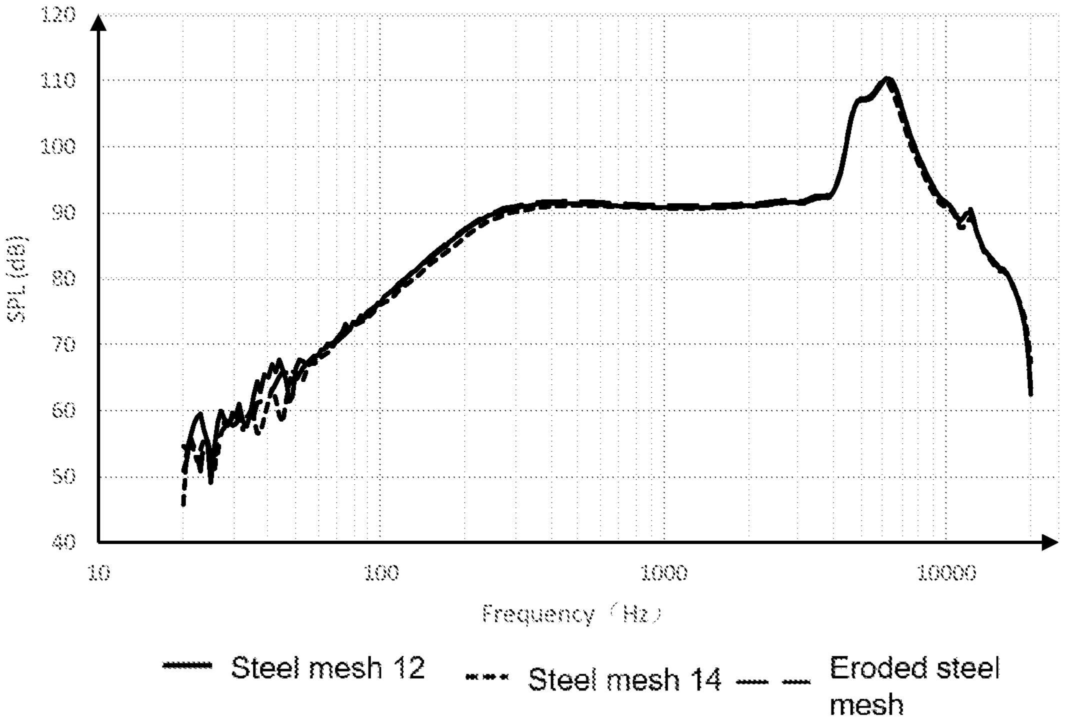
Figure 31C:
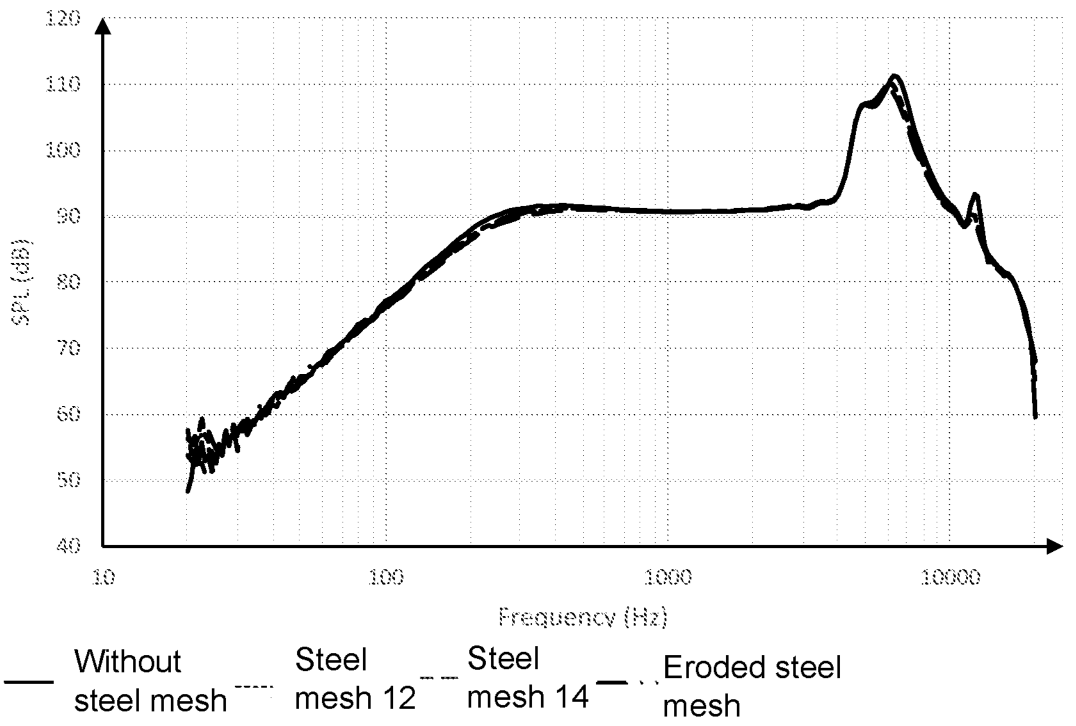
Figure 31D:
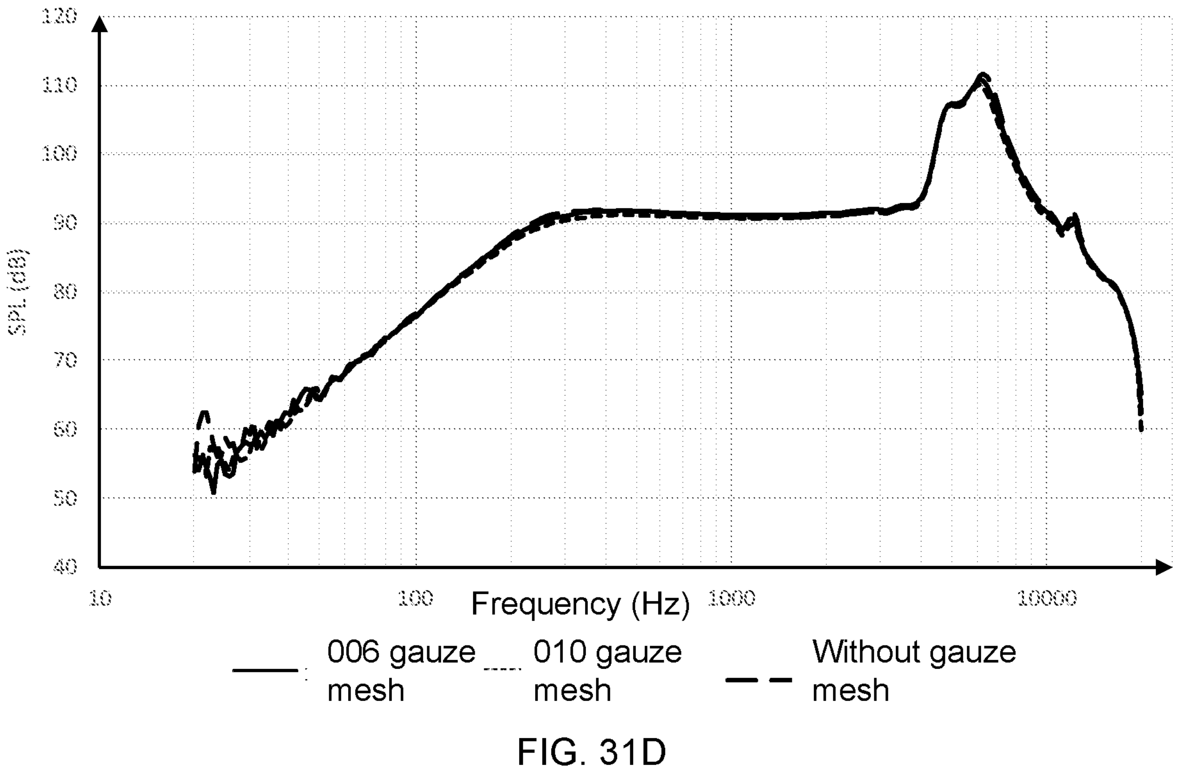
Figure 31E:
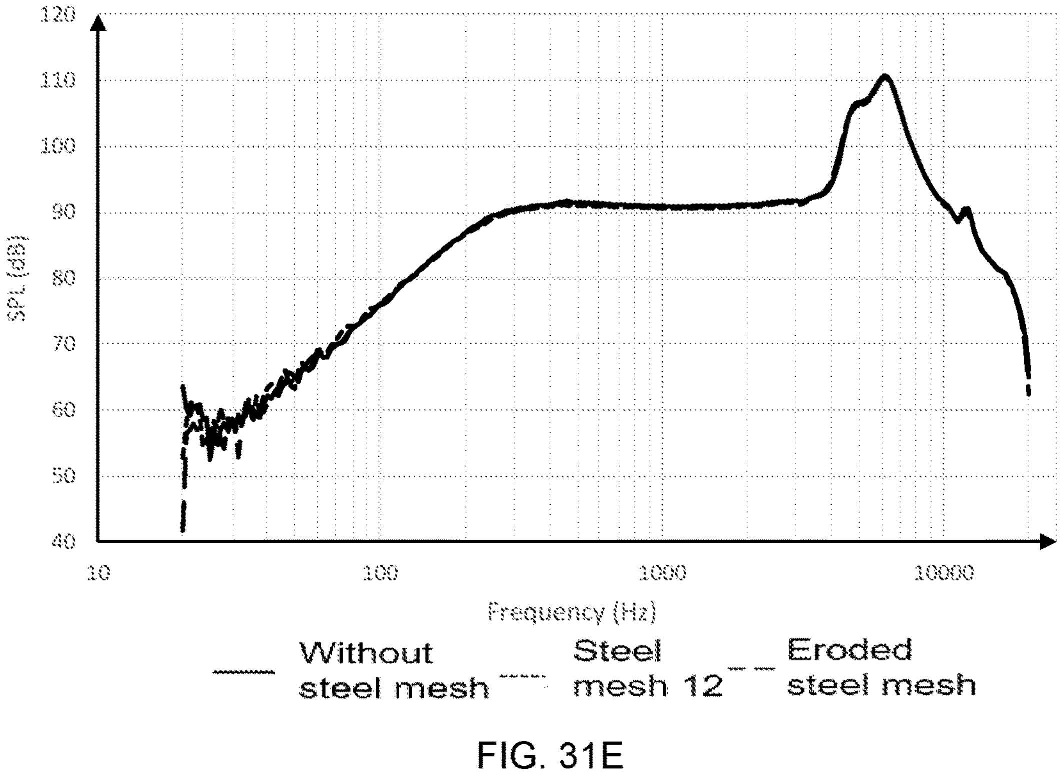
Figure 31F:
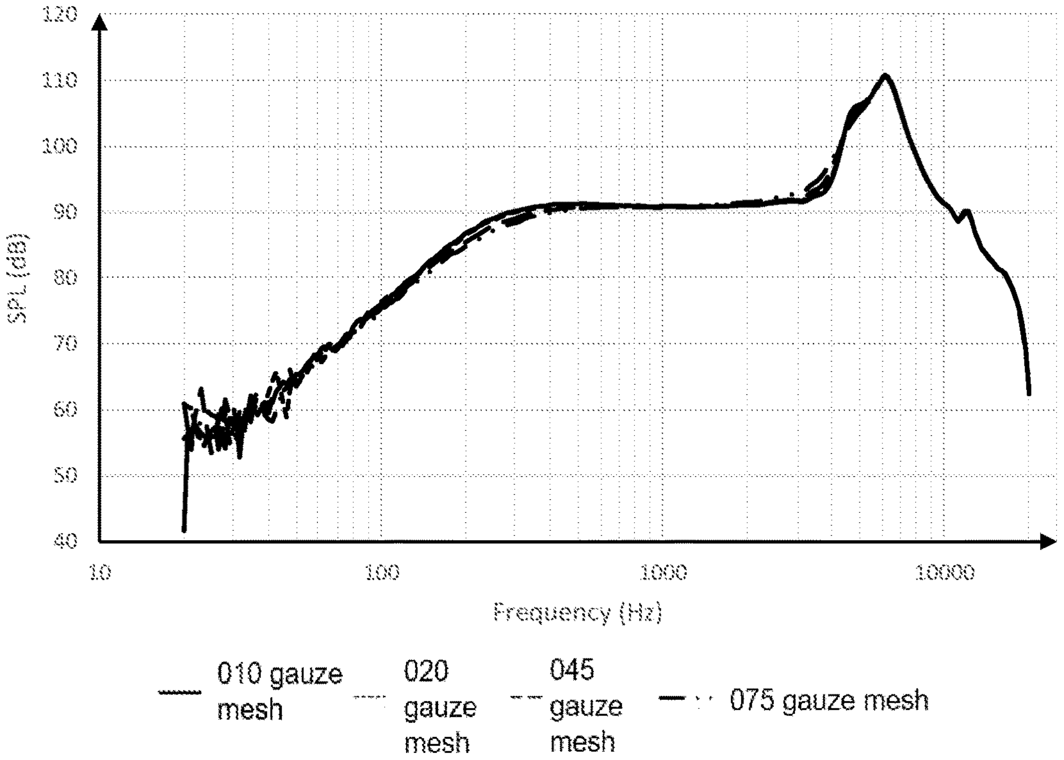

In some embodiments, to achieve waterproof and dustproof and improve structural stability, the steel mesh may be provided at the first pressure relief hole 111*c* and/or the second pressure relief hole 111*d* and/or the sound guiding hole 111*a*, or a combination of the gauze mesh and the steel mesh may be provided. FIG. 31A-FIG. 31F are graphs illustrating frequency response curves corresponding to different acoustic resistance nets at the front cavity and the rear cavity, respectively according to some embodiments of the present disclosure. FIG. 31A shows the frequency response curves of the open earphone with different steel meshes provided in the front cavity, FIG. 31B shows the frequency response curves of the open earphone with 006 gauze mesh and different steel meshes provided in the front cavity, FIG. 31C shows the frequency response curves of the open earphone with 010 gauze mesh and different steel meshes provided in the front cavity, and FIG. 31D shows the frequency response curves of the open earphone with etched steel mesh and different steel meshes provided in the front cavity, FIG. 31E shows the frequency response curves of the open earphone with 006 gauze mesh and etched steel mesh provided in the front cavity and 010 gauze mesh and different steel meshes provided in the rear cavity, and FIG. 31F shows the frequency response curves of the open earphone with 006 gauze mesh and etched steel mesh provided in the front cavity and etched steel mesh and different gauze meshes provided in the rear cavity. For the different gauze meshes, the corresponding nominal acoustic impedance rates in descending order are: 006 gauze mesh, 010 gauze mesh; for the steel meshes with a same mesh count and different types, the corresponding nominal acoustic impedance rates in descending order are: etched steel mesh, steel mesh 12, steel mesh 14. 006, 010 are acoustic resistance parameters, for example, 006 may indicate an acoustic impedance rate of around 6 MKS rayls; the mesh count may refer to a count of holes per unit area of the acoustic resistance net. For the same type of acoustic resistance nets, the higher the mesh count, the higher the corresponding acoustic impedance rate.

As shown in FIG. 31A-FIG. 31E, the frequency response curve gradually shifts downwards as the overall acoustic impedance rate of the acoustic resistance net 118 increases, i.e., the output sound pressure decreases with an insignificant magnitude. When the etched steel mesh is provided in the front cavity 114, the frequency response curve in the low frequency range has a small degree of undulation, few peaks and valleys, and a smooth curve. In addition, as shown in FIG. 31C or 31D, the frequency response curve in the low frequency range has a relatively small degree of undulation, relatively few peaks and valleys, and a relatively smooth curve when the etched steel mesh and 010 gauze mesh or 006 gauze mesh are provided in the front cavity 114. In some embodiments, to improve the smoothness of the frequency response curve of the sound production component 11 and make the sound production component 11 have a large output sound pressure, the acoustic resistance net 118 provided in the front cavity 114 may include a steel mesh (e.g., an etched steel mesh), the mesh count of the steel mesh may be in a range of 60 to 100. In some embodiments, the acoustic resistance net 118 provided in the front cavity 114 may include a steel mesh, the mesh count of the steel mesh may be in a range of 70 to 90. In some embodiments, to improve the smoothness of the frequency response curve of the sound production component 11 and make the sound production component 11 have a large output sound pressure, the acoustic resistance net 118 provided in the front cavity 114 may include a gauze mesh and a steel mesh (e.g. an etched steel mesh), the gauze mesh may have an acoustic impedance rate in a range of 2 MKS rayls to 50 MKS rayls and the mesh count of the steel mesh may be in a range of 60 to 100. In some embodiments, to improve the smoothness of the frequency response curve of the sound production component 11 and make the sound production component 11 have a large output sound pressure, the acoustic resistance net 118 provided in the front cavity 114 may include a gauze mesh and a steel mesh, the gauze mesh may have an acoustic impedance rate in a range of 5 MKS rayls to 20 MKS rayls and the mesh count of the steel mesh may be in a range of 70 to 90. In some embodiments, to improve the smoothness of the frequency response curve of the sound production component 11 and make the sound production component 11 have a large output sound pressure, the acoustic resistance net 118 provided in the front cavity 114 may include a gauze mesh and a steel mesh, the gauze mesh may have an acoustic impedance rate in a range of 6 MKS rayls to 10 MKS rayls and the mesh count of the steel mesh may be in a range of 75 to 85. In some embodiments, when the acoustic resistance net 118 provided in the front cavity 114 includes a steel mesh (e.g., an etched steel mesh) or a combination of a gauze mesh and a steel mesh, an acoustic impedance rate of the steel mesh may be in a range of 0.1 MKS rayls to 10 MKS rayls. In some embodiments, the acoustic impedance rate of the steel mesh may be in a range of 0.1 MKS rayls to 5 MKS rayls. In some embodiments, the acoustic impedance rate of the steel mesh may be in a range of 0.1 MKS rayls to 3 MKS rayls.

The present disclosure uses frequency response curves obtained from simulations to illustrate the acoustic properties of the sound production component 11 with different configurations. It should be noted that in some embodiments, the frequency response curves may also be obtained using a piece of test equipment (e.g., an electroacoustic tester). The test equipment may include a signal excitation device and a sound acquisition device (e.g., a microphone). The test equipment may be connected to the earphone by wired or wireless (e.g., Bluetooth, WiFi, etc.) manners, wherein the sound acquisition device may be disposed near the sound production component 11 (e.g., 15 mm directly in front of the sound guiding hole 111*a*). During a measurement, the test equipment may send an excitation signal to the earphone thereby causing the earphone to produce sound, and the sound is collected by the sound acquisition device.

The basic concepts have been described above and it is clear that the above detailed disclosure is intended as an example only and does not constitute a limitation of the present disclosure to those skilled in the art. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "an embodiment," "one embodiment," and/or "some embodiments" means a feature, structure or characteristic associated with at least one embodiment of the present disclosure. Therefore, it should be emphasized and noted that "an embodiment" or "one embodiment" or "an alternative embodiment" mentioned twice or more in different places in the present disclosure does not necessarily refer to the same embodiment. In addition, some features, structures, or features in the present disclosure of one or more embodiments may be appropriately combined.

Furthermore, it can be understood by those skilled in the art that aspects of the present disclosure can be illustrated and described by a number of patentable categories or situations, including any new and useful combination of processes, machines, products or substances, or any new and useful improvements to them. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

What is claimed is:

1. An open earphone, comprising:

a sound production component including:

a transducer including a diaphragm configured to generate a sound under an action of an excitation signal; and a housing, the housing forming a cavity used to accommodate the transducer, wherein in a wearing state, the housing is provided with a sound guiding hole on an inner side surface toward an auricle of a user for guiding a sound generated by a front side of the diaphragm out of the housing and into an ear canal of the user, and at least two pressure relief holes are provided on one or more other side surfaces of the housing, the at least two pressure relief holes including a first pressure relief hole away from the ear canal and a second pressure relief hole near the ear canal, and a sound pressure at the first pressure relief hole being greater than a sound pressure at the second pressure relief hole, wherein the at least two pressure relief holes are configured to guide sounds generated by a rear side of the diaphragm out of the housing.

2. The open earphone of claim 1, wherein the first pressure relief hole and the second pressure relief hole are respectively located on different side surfaces of the housing.

3. The open earphone of claim 2, wherein a ratio of an area of the first pressure relief hole to an area of the second pressure relief hole is in a range of 1 to 5.

4. The open earphone of claim 2, wherein a ratio of a long axis dimension to a short axis dimension of the first pressure relief hole is in a range of 1.3 to 8.

5. The open earphone of claim 4, wherein a ratio of a long axis dimension to a short axis dimension of the second pressure relief hole is in a range of 1 to 6.

6. The open earphone of claim 2, wherein a ratio of an area of the sound guiding hole to a total area of the first pressure relief hole and the second pressure relief hole is in a range of 0.1 to 0.99; and the diaphragm divides the cavity into a front cavity and a rear cavity corresponding to the front side and a rear side of the diaphragm, respectively, wherein a ratio of a volume of the rear cavity to a volume of the front cavity is in a range of 0.1 to 10.

7. The open earphone of claim 6, wherein the diaphragm divides the cavity into a front cavity and a rear cavity corresponding to the front side and a rear side of the diaphragm, respectively, wherein a ratio of a resonance frequency of the front cavity to a resonance frequency of the rear cavity is in a range of 0.1 to 5.

8. The open earphone of claim 2, wherein a ratio of an area of the sound guiding hole to a total area of the first pressure relief hole and the second pressure relief hole is in a range of 1 to 10; and the diaphragm divides the cavity into a front cavity and a rear cavity corresponding to the front side and the rear side of the diaphragm, respectively, wherein a ratio of a resonance frequency of the front cavity to a resonance frequency of the rear cavity is in a range of 0.5 to 10.

9. The open earphone of claim 2, wherein a ratio of an area of the sound guiding hole to a square of a depth of the sound guiding hole is in a range of 0.31 to 512.2.

10. The open earphone of claim 2, wherein a ratio of a long axis dimension to a short axis dimension of the sound guiding hole is in a range of 1 to 10.

11. The open earphone of claim 2, wherein in a range of 3.5 kHz to 4.5 kHz, a ratio of a sound pressure at the sound guiding hole to a total sound pressure at the first pressure relief hole and the second pressure relief hole is in a range of 0.4 to 0.6.

12. The open earphone of claim 2, wherein in a range of 3.5 kHz to 4.5 kHz, a ratio of a sound pressure at the sound guiding hole to the sound pressure at the first pressure relief hole is in a range of 0.9 to 1.1.

13. The open earphone of claim 2, wherein in a range 3.5 kHz to 4.5 kHz, a ratio of a sound pressure at the sound guiding hole to the sound pressure at the second pressure relief hole is in a range 0.9 to 1.1.

14. The open earphone of claim 1, wherein acoustic resistance nets are provided at the sound guiding hole and at the at least two pressure relief holes, respectively, wherein the acoustic resistance nets provided at the sound guiding hole or the at the at least two pressure relief holes include a gauze mesh or a steel mesh.

15. The open earphone of claim 14, wherein an acoustic impedance rate of the gauze mesh is in a range of 2 MKS rayls to 50 MKS rayls; and an acoustic impedance rate of the steel mesh is in a range of 0.1 MKS rayls to 10 MKS rayls.

16. The open earphone of claim 14, wherein a distance between an upper surface of the acoustic resistance net at the first pressure relief hole towards an exterior of the housing and an outer surface of the housing is in a range of 0.8 mm to 0.9 mm.

17. The open earphone of claim 14, wherein a distance between an upper surface of the acoustic resistance net at the second pressure relief hole towards an exterior of the housing and an outer surface of the housing is in a range of 0.7 mm to 0.8 mm.

18. The open earphone of claim 14, wherein thicknesses of the acoustic resistance nets at the at least two pressure relief holes are in a range of 40 μm to 150 μm.

19. The open earphone of claim 14, wherein the acoustic resistance net at the sound guiding hole includes a gauze mesh and an etched steel mesh.

20. The open earphone of claim 14, wherein an acoustic resistance net at the sound guiding hole and acoustic resistance nets at the at least two pressure relief holes have a same acoustic impedance rate.

* * * * *